United States Patent
Lim et al.

(10) Patent No.: US 12,192,912 B2
(45) Date of Patent: Jan. 7, 2025

(54) METHOD AND DEVICE FOR CONTROLLING UPLINK TRANSMISSION POWER FOR NETWORK COORDINATION COMMUNICATION SYSTEM

(71) Applicant: Samsung Electronics Co., Ltd., Suwon-si (KR)

(72) Inventors: Seongmok Lim, Suwon-si (KR); Youngrok Jang, Suwon-si (KR); Euichang Jung, Suwon-si (KR); Ameha Tsegaye Abebe, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 17/698,834

(22) Filed: Mar. 18, 2022

(65) Prior Publication Data

US 2022/0312337 A1    Sep. 29, 2022

(30) Foreign Application Priority Data

Mar. 19, 2021 (KR) .................. 10-2021-0036188
May 21, 2021 (KR) .................. 10-2021-0065802

(51) Int. Cl.
*H04W 52/14* (2009.01)
*H04L 5/00* (2006.01)
*H04W 52/10* (2009.01)
*H04W 52/36* (2009.01)
*H04W 52/54* (2009.01)
*H04W 72/14* (2009.01)

(52) U.S. Cl.
CPC ......... *H04W 52/146* (2013.01); *H04W 52/10* (2013.01); *H04W 52/54* (2013.01)

(58) Field of Classification Search
None
See application file for complete search history.

(56) References Cited

U.S. PATENT DOCUMENTS

| | | | |
|---|---|---|---|
| 2020/0252880 A1* | 8/2020 | Lei | H04W 52/36 |
| 2020/0337080 A1* | 10/2020 | Xu | H04W 52/146 |
| 2020/0389852 A1* | 12/2020 | Wang | H04W 52/10 |
| 2021/0068102 A1 | 3/2021 | Marinier et al. | |
| 2021/0219246 A1* | 7/2021 | Xu | H04W 52/146 |
| 2021/0266843 A1* | 8/2021 | Abedini | H04W 52/54 |
| 2022/0046552 A1* | 2/2022 | Xu | H04L 5/0094 |
| 2022/0167279 A1* | 5/2022 | Zhou | H04W 52/242 |
| 2022/0210748 A1* | 6/2022 | Huang | H04W 52/365 |
| 2022/0217653 A1* | 7/2022 | Kung | H04L 5/0048 |

(Continued)

OTHER PUBLICATIONS

Qualcomm Incorporated, "Enhancements on Multi-TRP for PDCCH, PUCCH and PUSCH", 3GPP TSG-RAN WG1 Meeting #104-e, Jan. 25-Feb. 5, 2021, R1-2101447, 28 pages.

(Continued)

*Primary Examiner* — Pablo N Tran

(57) ABSTRACT

The disclosure relates to a 5G or 6G communication system for supporting a higher data transmission rate. The disclosure provides a method and a device for controlling transmission power of an uplink signal in consideration of multiple transmission points/panels/beams by a terminal for cooperative communication between the multiple transmission points/panels/beams.

16 Claims, 29 Drawing Sheets

(56) References Cited

U.S. PATENT DOCUMENTS

2023/0354208 A1* 11/2023 Sun .................. H04W 52/06

OTHER PUBLICATIONS

Samsung, "Alignment CR for TS 38.213", Change Request, 3GPP TSG-RAN WG1 Meeting #103-e, Oct. 26-Nov. 13, 2020, R1-2009742, 172 pages.
Moderator (vivo), "Summary of email discussion [103-e-NR-L1enh-URLLC-06]", 3GPP TSG RAN WG1 #103-e, Oct. 26-Nov. 13, 2020, R1-2009462, 30 pages.
Moderator (Nokia, Nokia Shanghai Bell), "Summary of Multi-TRP for PUCCH and PUSCH", 3GPP TSG RAN WG1 #104-e, Jan. 25-Feb. 5, 2021, R1-2101784, 55 pages.
International Search Report dated Jun. 24, 2022 in connection with International Patent Application No. PCT/KR2022/003853, 3 pages.
Written Opinion of the International Searching Authority dated Jun. 24, 2022 in connection with International Patent Application No. PCT/KR2022/003853, 4 pages.
Supplementary European Search Report dated Jul. 8, 2024, in connection with European Application No. 22771829.3, 10 pages.
Nokia, et al., "Enhancements for Multi-TRP URLLC schemes," R1-2008904, 3GPP TSG RAN WG1 #103 Meeting, e-Meeting, Oct. 26-Nov. 13, 2020, 17 pages.

* cited by examiner

FIG. 18B
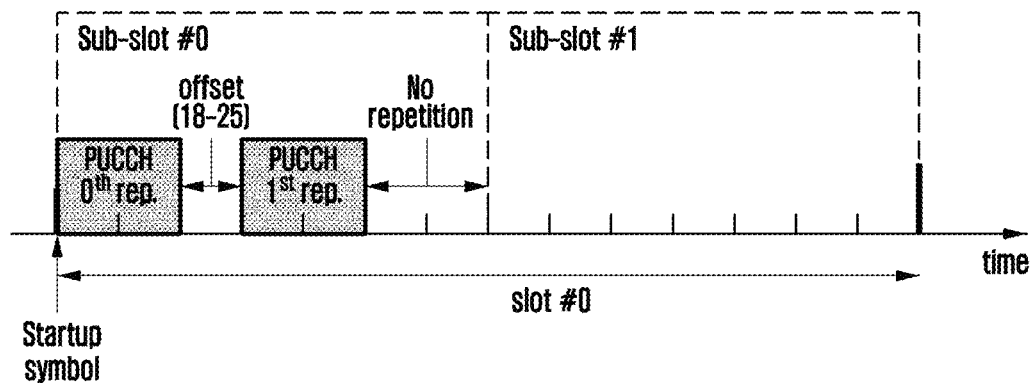
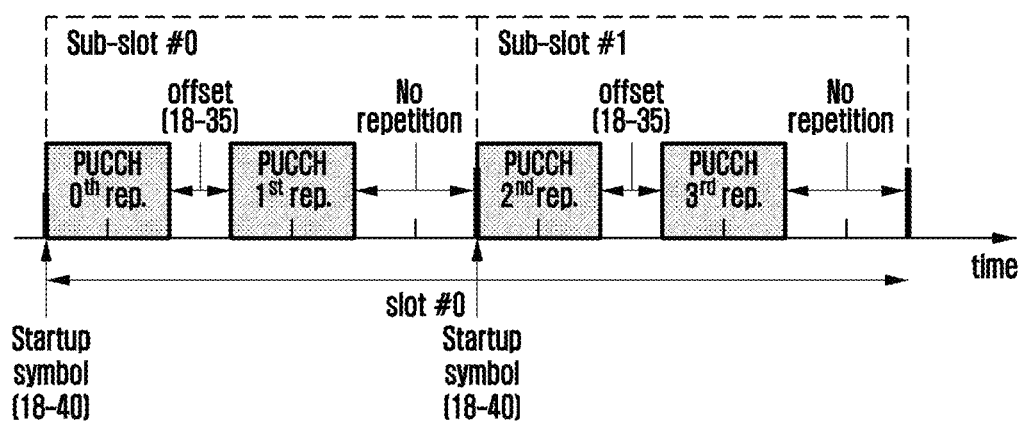

18c. Repetition located at the sub-slot boundary

FIG. 20

| | | | | | | | |
|---|---|---|---|---|---|---|---|
| R | Serving Cell ID | | | | | BWP ID | |
| R | PUCCH Resource ID | | | | | | |
| $S_7$ | $S_6$ | $S_5$ | $S_4$ | $S_3$ | $S_2$ | $S_1$ | $S_0$ |

20-00

| | | |
|---|---|---|
| R | Serving Cell ID | BWP ID |
| R | PUCCH Resource ID$_0$ | |
| R | $C_0$ | Spatial Relation Info ID |
| R | R | Spatial Relation Info ID |

20-20

• • • • •

| | | |
|---|---|---|
| R | PUCCH Resource ID$_{N-2}$ | |
| R | $C_{N-2}$ | Spatial Relation Info ID |

| | | |
|---|---|---|
| R | Serving Cell ID | BWP ID |
| $C_0$ | PUCCH Resource ID$_0$ | |
| R | R | Spatial Relation Info ID |
| R | R | Spatial Relation Info ID |

20-25

• • • • •

| | | |
|---|---|---|
| $C_{N-2}$ | PUCCH Resource ID$_{N-2}$ | |
| R | R | Spatial Relation Info ID |

METHOD AND DEVICE FOR CONTROLLING UPLINK TRANSMISSION POWER FOR NETWORK COORDINATION COMMUNICATION SYSTEM

CROSS-REFERENCE TO RELATED APPLICATIONS

This application is based on and claims priority under 35 U.S.C. § 119 to Korean Patent Application Nos. 10-2021-0036188, and 10-2021-0065802 filed on Mar. 19, 2021, and May 21, 2021, in the Korean Intellectual Property Office, the disclosures of which are herein incorporated by reference in their entirety.

BACKGROUND

1. Field

The disclosure relates to a wireless communication system and, more particularly, to a method and device for controlling, by a terminal, uplink transmission power in consideration of multiple transmission points/panels/beams for cooperative communication between the multiple transmission points/panels/beams.

2. Description of Related Art 5G mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

A method and a device for controlling transmission power for transmission of an uplink data signal or an uplink control signal by a terminal via multiple transmission points/panels/beams for network coordination communication in a wireless communication system are required.

The above information is presented as background information only to assist with an understanding of the disclosure. No determination has been made, and no assertion is made, as to whether any of the above might be applicable as prior art with regard to the disclosure.

SUMMARY

The disclosure provides a method for controlling transmission power for transmission of an uplink data signal or an uplink control signal by a terminal via multiple transmission points/panels/beams for network coordination communication in a wireless communication system.

A method performed by a terminal of the disclosure for solving the above task includes: receiving, from a base station, a radio resource control (RRC) message including at least one physical uplink shared channel (PUSCH) power control information and at least one P0-PUSCH set; receiving, from the base station, downlink control information (DCI) including a transmission power control (TPC) command value and an open-loop power control parameter set indicator; in case that the DCI includes an SRS resource indicator (SRI) and the open-loop power control parameter set indicator is configured to 1, determining transmission power based on PUSCH power control information corresponding to the SRI, the TPC command value, and a first value of a P0-PUSCH set corresponding to the SRI; and transmitting, to the base station, a PUSCH, based on the transmission power.

A method performed by a base station of the disclosure for solving the above task includes: transmitting, to a terminal, a radio resource control (RRC) message including at least one physical uplink shared channel (PUSCH) power control information and at least one P0-PUSCH set; transmitting, to the terminal, downlink control information (DCI) including a transmission power control (TPC) command value and an open-loop power control parameter set indicator; and receiving, from the terminal, a PUSCH, based on the DCI, wherein in case that the DCI includes an SRS resource indicator (SRI), and the open-loop power control parameter set indicator is configured to 1, a transmission power of the PUSCH is determined based on PUSCH power control information corresponding to the SRI, the TPC command value, and a first value of a P0-PUSCH set corresponding to the SRI.

A terminal of the disclosure for solving the above task includes: a transceiver; and a controller configured to receive, from a base station, a radio resource control (RRC) message including at least one physical uplink shared channel (PUSCH) power control information and at least one P0-PUSCH set, receive, from the base station, downlink control information (DCI) including a transmission power control (TPC) command value and an open-loop power control parameter set indicator, determine transmission power, in case that the DCI includes an SRS resource indicator (SRI) and the open-loop power control parameter set indicator is configured to 1, based on PUSCH power control information corresponding to the SRI, the TPC command value, and a first value of a P0-PUSCH set corresponding to the SRI, and transmit, to the base station, a PUSCH, based on the transmission power.

A base station of the disclosure for solving the above task includes: a transceiver; and a controller configured to transmit, to a terminal, a radio resource control (RRC) message including at least one physical uplink shared channel (PUSCH) power control information and at least one P0-PUSCH set, transmit, to the terminal, downlink control information (DCI) including a transmission power control (TPC) command value and an open-loop power control parameter set indicator, and receive, from the terminal, a PUSCH, based on the DCI, wherein in case that the DCI includes an SRS resource indicator (SRI), and the open-loop power control parameter set indicator is configured to 1, a transmission power of the PUSCH is determined based on PUSCH power control information corresponding to the SRI, the TPC command value, and a first value of a P0-PUSCH set corresponding to the SRI.

According to the disclosure, when network coordination communication is used in a wireless communication system, a terminal can distribute optimized transmission power for each transmission point/panel/beam by controlling uplink transmission power for each transmission point/panel/beam, so as to transmit an uplink signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 18B is a diagram illustrating repeated PUCCH transmission in a slot or a sub-slot in the wireless communication system according to an embodiment of the present disclosure;

FIG. 20 is a diagram illustrating an example of a medium access control (MAC) control element (CE) structure for activation of PUCCH-SpatialRelationInfo of a PUCCH resource to support repeated PUCCH transmission to multiple TRPs;

DETAILED DESCRIPTION

Figure 1:
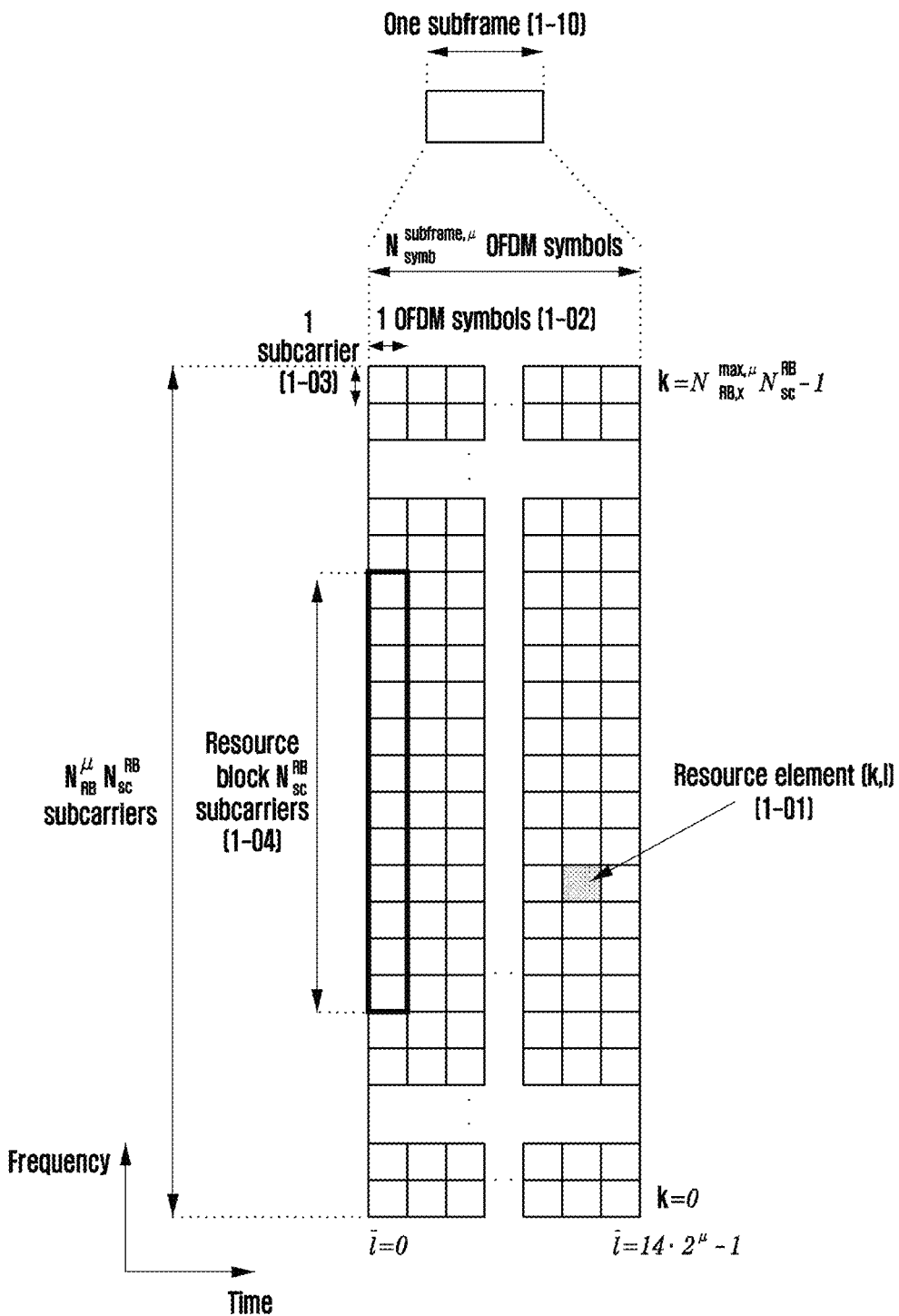
FIG. 1 is a diagram illustrating a basic structure of a time-frequency domain in a mobile communication system according to an embodiment of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging IoT technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

As used in the following description, terms referring to broadcast information, terms referring to control information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards will be used for the convenience of description. However, the disclosure is not limited by these terms and names, and may be applied in the same way to systems that conform other standards.

A wireless communication system has been developed from a wireless communication system providing a voice centered service in the early stage toward broadband wireless communication systems providing high-speed and high-quality packet data services, such as communication standards, for example, 3GPP's high speed packet access (HSPA), long-term evolution (LTE or evolved universal terrestrial radio access (E-UTRA)), LTE-advanced (LTE-A), LTE-Pro, 3GPP2 high rate packet data (HRPD), ultra-mobile broadband (UMB), IEEE 802.16e, and the like.

In an LTE system, which is a representative example of a broadband wireless communication system, a downlink (DL) adopts an orthogonal frequency division multiplexing (OFDM) scheme and an uplink (UL) adopts a single carrier frequency division multiple access (SC-FDMA) scheme. The uplink refers to a radio link via which a terminal (user equipment (UE) or mobile station (MS)) transmits data or a control signal to a base station (BS) (or eNode B), and the downlink refers to a radio link via which a base station transmits data or a control signal to a terminal. In such a multiple-access scheme, data or control information of each user may be distinguished by assigning and operating time-frequency resources, at which data or control information of each user is transmitted, so as not to overlap each other, that is, to establish orthogonality.

A 5G communication system, that is, a future communication system after LTE, may be able to freely reflect various requirements of users, service providers, etc., so that a service that satisfies various requirements may be supported. Services considered for the 5G communication system include an enhanced mobile broadband (eMBB), massive machine type communication (mMTC), ultra-reliability low latency communication (URLLC), and the like.

According to some embodiments, eMBB aims to provide a more improved data transmission rate than a data transmission rate supported by the existing LTE, LTE-A, or LTE-Pro. For example, in a 5G communication system, the eMBB may be able to provide a maximum data rate (peak data rate) of 20 Gbps in a downlink and a peak data rate of 10 Gbps in an uplink from the perspective of one base station. The eMBB may provide an increased user perceived data rate of the terminal at the same time. In order to satisfy these requirements, improvement of transmission/reception technologies including a more advanced multi-input multi-output (MIMO) transmission technology is required. In addition, a data transmission rate required by the 5G communication system may be satisfied by using a frequency bandwidth wider than 20 MHz in a frequency band of 3 to 6 GHz or a frequency band of 6 GHz or higher, instead of a frequency band of 2 GHz used by the current LTE.

Meantime, mMTC is being considered to support application services, such as Internet of things (IoT), in the 5G communication system. In order to efficiently provide the Internet of Things, mMTC may require support for large-scale terminal access in a cell, improved coverage of a terminal, an improved battery time, and a reduced cost of a terminal. IoT is attached to multiple types of sensors and various devices to provide communication functions, so that IoT may be able to support a large number of terminals (e.g., 1,000,000 terminals/km2) within a cell. Due to the nature of a service, a terminal that supports mMTC is likely to be located in a shaded region, which cannot be covered by a cell, such as the basement of a building, and therefore a wider coverage may be required compared to other services provided by the 5G communication system. Since a terminal supporting mMTC may be a low-cost terminal, and it is difficult to frequently exchange a battery of the terminal, a very long battery lifetime may be required.

Finally, the case of URLLC, which is a cellular-based wireless communication service used for mission-critical purposes, is used for a remote control for a robot or machinery, industrial automation, an unmanned aerial vehicle, remote health care, an emergency alert, etc., and may provide communication that provides ultra-low latency and ultra-reliability. For example, a service that supports URLLC has requirements of an air interface latency less than 0.5 milliseconds and a packet error rate of 10-5 or less at the same time. Therefore, for the service that supports URLLC, the 5G system may provide a transmission time interval (TTI) less than that of other services, and at the same time, a design requirement that a wide resource may be allocated in a frequency band is required in the 5G system. However, the above-described mMTC, URLLC, and eMBB are merely examples of different service types, and service types, to which the disclosure is applied, are not limited to the above-described examples.

Services considered in the 5G communication system, which are described above, may be combined with each other and provided based on one framework. That is, for efficient resource management and control, it is desirable that each of services is integrated into one system so as to be controlled and transmitted, rather than operated independently.

Although an embodiment of the disclosure will be described below as an example of an LTE, LTE-A, LTE Pro, or NR system, the embodiment of the disclosure may be applied to other communication systems having a similar technical background or channel type. Further, the embodiments of the disclosure may be applied to other communication systems via some modifications without significantly departing from the scope of the disclosure, according to determination by those skilled in the art.

The present disclosure relates to a method and a device for reporting channel state information, for increasing power saving efficiency of a terminal in a wireless communication system.

According to the disclosure, in the wireless communication system, when a terminal operates in a power saving mode, power saving effect can be further improved by optimizing a method of reporting channel state information according to the power saving mode.

Hereinafter, a frame structure of the 5G system will be described in more detail with reference to the drawings.

FIG. 1 is a diagram illustrating a basic structure of a time-frequency domain in a mobile communication system according to an embodiment of the present disclosure.

Referring to FIG. 1, the horizontal axis represents a time domain and the vertical axis represents a frequency domain. A basic unit of a resource in the time and frequency domains is a resource element (RE) 1-01, and may be defined to be 1 orthogonal frequency division multiplexing (OFDM) symbol 1-02 on the time axis and 1 subcarrier 1-03 on the frequency axis. NSCRB (e.g., 12) consecutive REs in the frequency domain may constitute one resource block (RB) 1-04. In an embodiment, multiple OFDM symbols may constitute one subframe 1-10.

Figure 2:
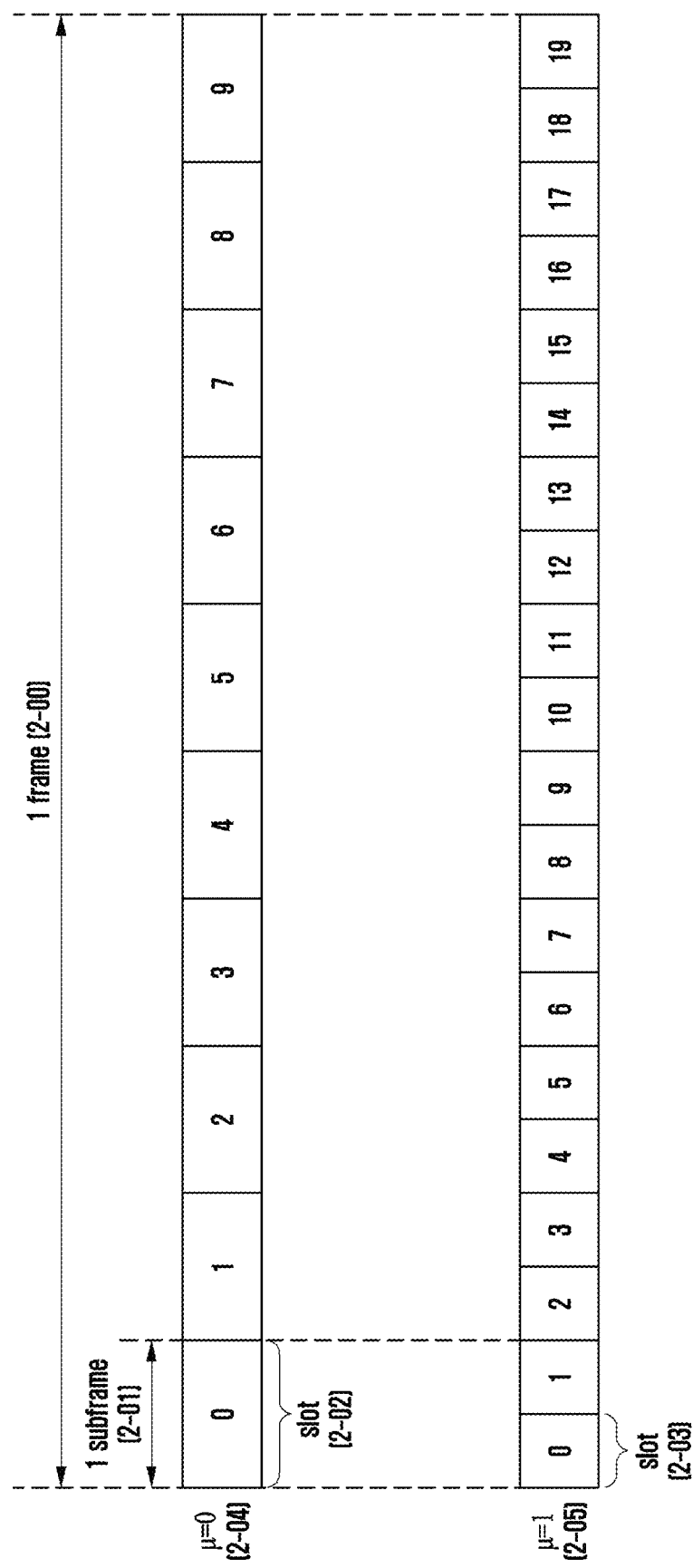
FIG. 2 is a diagram for illustrating a frame, a subframe, and a slot structure in the mobile communication system according to an embodiment of the present disclosure.

FIG. 2 is a diagram for illustrating a frame, a subframe, and a slot structure in a next-generation mobile communication system according to an embodiment of the present disclosure.

Referring to FIG. 2, one frame 2-00 may include one or more subframes 2-10, and one subframe may include one or more slots 2-02. For example, 1 frame 2-00 may be defined to be 10 ms. One subframe 2-01 may be defined to be 1 ms, and in this case, one frame 2-00 may include a total of 10 subframes 2-01. One slot 2-02 or 2-03 may be defined to be 14 OFDM symbols (that is, the number of symbols per slot ($N_{symb}^{slot}$)=14). One subframe 2-01 may include one or multiple slots 2-02 and 2-03, and the number of slots 2-02 and 2-03 per subframe 2-01 may vary according to configuration value μ 2-04 or 2-05 for a subcarrier spacing.

In an example of FIG. 2, as subcarrier spacing configuration values, a case where μ=0 2-04 and a case where μ=1 2-05 are illustrated. If μ=0 2-04, one subframe 2-01 may include one slot 2-02, and if μ=1 2-05, one subframe 2-01 may include two slots 2-03. That is, the number ($N_{slot}^{subframe,\mu}$) of slots per subframe may vary according to configuration value μ for a subcarrier spacing, and accordingly, the number ($N_{slot}^{frame,\mu}$) of slots per frame may vary. $N_{slot}^{subframe,\mu}$ and $N_{slot}^{frame,\mu}$ according to respective subcarrier spacing configurations μ may be defined in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when the terminal always receives the entire serving cell bandwidth like LTE, power consumption of the terminal may be extreme, and in order to solve this, the base station may configure one or more bandwidth parts (BWP) for the terminal so that it is possible to support the terminal to change a reception area within a cell. In the NR, the base station may configure "initial BWP," which is a bandwidth of CORESET #0 (or common search space (CSS)), for the terminal via a master information block (MIB). Thereafter, the base station may configure an initial BWP (first BWP) of the terminal via radio resource control (RRC) signaling, and may notify one or more pieces of BWP configuration information that may be indicated via downlink control information (DCI) in the future. Thereafter, the base station may indicate a band that the terminal is to use, by indicating a BWP ID via DCI. If the terminal fails to receive DCI in a currently assigned BWP for a specific time or longer, the terminal returns to a "default bandwidth part" and attempts to receive DCI.

Figure 3:
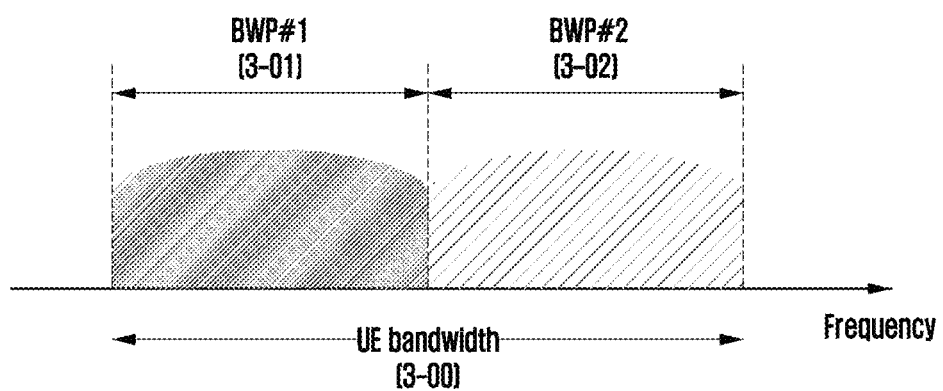
FIG. 3 illustrates an example of a bandwidth part (BWP) configuration in a wireless communication system according to an embodiment of the present disclosure.

FIG. 3 illustrates an example of a bandwidth part (BWP) configuration in a wireless communication system according to an embodiment of the present disclosure.

Referring to FIG. 3, FIG. 3 illustrates an example in which a terminal bandwidth 3-00 is configured by two bandwidth parts, that is, bandwidth part #1 3-05 and bandwidth part #2 3-10. A base station may configure one or multiple bandwidth parts to a terminal, and may configure information as shown in [Table 2] below for each bandwidth part.

TABLE 2

```
BWP ::=         SEQUENCE {
   bwp-Id            BWP-Id
   locationAndBandwidth    INTEGER (1..65536)
   subcarrierSpacing   ENUMERATED {n0, n1, n2, n3, n4, n5}
   cyclicPrefix      ENUMERATED {extended}
}
```

An embodiment of the disclosure is not limited to the aforementioned examples, and in addition to the configuration information, various parameters related to a bandwidth part may be configured for the terminal. The base station may transfer the aforementioned information to the terminal via higher layer signaling, for example, RRC signaling.

At least one bandwidth part among the configured one or multiple bandwidth parts may be activated. Whether or not to activate the configured bandwidth part may be transferred from the base station to the terminal in a semi-static manner via RRC signaling, or may be dynamically transferred via a MAC CE or DCI.

According to an embodiment, the terminal before an RRC connection may be configured with an initial bandwidth part (BWP) for initial access, by the base station via an MIB. More specifically, in an initial access stage, the terminal may receive configuration information for a search space and a control area (control resource set (CORESET)) in which a PDCCH may be transmitted, in order to receive system information (may correspond to remaining system information (RMSI) or system information block 1 (SIB1)) required for initial access may be transmitted via the MIB. Each of the search space and the control resource set configured via the MIB may be considered to be identifier (identity (ID)) 0.

The base station may configure, for the terminal, configuration information, such as frequency allocation information, time allocation information, and numerology for control resource set #0, via the MIB. In addition, the base station may configure, for the terminal via the MIB, configuration information for a monitoring period and occasion for control resource set #0, that is, the configuration information for search space #0. The terminal may consider a frequency domain configured to control resource set #0, which is obtained via the MIB, as an initial bandwidth part for initial access. In this case, an identifier (ID) of the initial bandwidth part may be considered to be 0.

Configuration of the bandwidth part supported by the aforementioned next-generation mobile communication system (5G or NR system) may be used for various purposes.

For example, if the bandwidth supported by the terminal is smaller than the system bandwidth, the bandwidth supported by the terminal may be supported via configuration of the bandwidth part. For example, in [Table 2], a frequency position (configuration information 2) of the bandwidth part is configured for the terminal, so that the terminal may transmit or receive data at a specific frequency position within the system bandwidth.

As another example, for the purpose of supporting different neurology, the base station may configure multiple bandwidth parts for the terminal. For example, in order to support, to the terminal, both data transmission or reception using a subcarrier spacing of 15 kHz and a subcarrier spacing of 30 kHz, two bandwidth parts may be configured to use the subcarrier spacings of 15 kHz and 30 kHz, respectively. Different bandwidth parts may be frequency-division-multiplexed (FDM), and when data is to be transmitted or received at a specific subcarrier spacing, a bandwidth part configured at the subcarrier spacing may be activated.

As another example, for the purpose of reducing power consumption of the terminal, the base station may configure, for the terminal, a bandwidth part having a different size of bandwidth. For example, if the terminal supports a very large bandwidth, for example, 100 MHz, and always transmits or receives data via the corresponding bandwidth, very large power consumption may occur. In particular, in a situation where there is no traffic, it is very inefficient, in terms of power consumption, for the terminal to monitor an unnecessary downlink control channel for a large bandwidth of 100 MHz. Therefore, for the purpose of reducing power consumption of the terminal, the base station may configure, for the terminal, a bandwidth part of a relatively small bandwidth, for example, a bandwidth part of 20 MHz. In the situation where there is no traffic, the terminal may perform monitoring in the bandwidth part of 20 MHz, and if data is generated, the terminal may transmit or receive the data by using the bandwidth part of 100 MHz according to an indication of the base station.

In the aforementioned method for configuring the bandwidth part, terminals before an RRC connection may receive configuration information for an initial bandwidth part via an MIB in an initial access stage. More specifically, the terminal may be configured with a CORESET for a downlink control channel, through which DCI for scheduling of a system information block (SIB) may be transmitted, from an MIB transmitted via a physical broadcast channel (PBCH). The bandwidth of the control resource set, which is configured via the MIB, may be considered to be the initial bandwidth part, and the terminal may receive the PDSCH, through which the SIB is transmitted, via the configured initial bandwidth part. In addition to the use of receiving the SIB, the initial bandwidth part may be used for other system information (OSI), paging, and random access.

Hereinafter, a synchronization signal (SS)/PBCH block of a next-generation mobile communication system (5G or NR system) will be described.

The SS/PBCH block may refer to a physical layer channel block including a primary SS (PSS), a secondary SS (SSS), and a PBCH. More specifically, the SS/PBCH block may be defined as follows:

PSS: A PSS is a signal that serves as a reference for downlink time/frequency synchronization and may provide some information of a cell ID;

SSS: An SSS is a reference for downlink time/frequency synchronization and may provide the remaining cell ID information, which is not provided by the PSS. Additionally, the SSS may serve as a reference signal for demodulation of a PBCH;

PBCH: A PBCH may provide essential system information required for transmission or reception of a data channel and a control channel of the terminal. The essential system information may include search space-related control information indicating radio resource mapping information of a control channel, scheduling control information on a separate data channel for transmission of system information, and the like; and SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The terminal may detect the PSS and the SSS in an initial access stage and may decode the PBCH. The terminal may acquire the MIB from the PBCH, and may be configured with control resource set #0 via the MIB. The terminal may perform monitoring on control resource set #0 while assuming that a selected SS/PBCH block and a demodulation reference signal (DMRS) transmitted in control resource set #0 are quasi-co-located (QCL). The terminal may receive system information as downlink control information transmitted in control resource set #0. The terminal may acquire random access channel (RACH)-related configuration information required for initial access from the received system information. The terminal may transmit a physical RACH (PRACH) to the base station in consideration of the selected SS/PBCH index, and the base station having received the PRACH may acquire information on the SS/PBCH block index selected by the terminal. The base station may identify a block that the terminal has selected from among respective SS/PBCH blocks, and may identify that control resource set #0 corresponding to (associated with) the block selected by the terminal is monitored.

Hereinafter, downlink control information (hereinafter, referred to as DCI) in a next-generation mobile communication system (5G or NR system) will be described in detail.

In a next-generation mobile communication system (5G or NR system), scheduling information for uplink data (or physical uplink data channel (physical uplink shared channel, PUSCH)) or downlink data (or physical downlink data channel (physical downlink shared channel, PDSCH)) is transferred from the base station to the terminal via DCI. The terminal may monitor a DCI format for fallback and a DCI format for non-fallback for a PUSCH or a PDSCH. The fallback DCI format may include a fixed field predefined between the base station and the terminal, and the DCI format for non-fallback may include a configurable field.

The DCI may be transmitted on a physical downlink control channel (PDCCH) via channel coding and modulation. A cyclic redundancy check (CRC) may be attached to a DCI message payload, and the CRC may be scrambled with a radio network temporary identifier (RNTI) corresponding to an identity of the terminal. Different RNTIs according to the purpose of the DCI message, for example, terminal-specific (UE-specific) data transmission, a power control command, or a random access response, may be used for scrambling of the CRC attached to the payload of the DCI message. That is, the RNTI is not explicitly transmitted, but may be included in a CRC calculation procedure so as to be transmitted. When a DCI message transmitted on the PDCCH is received, the terminal may check the CRC by using an assigned RNTI. If a CRC check result is correct, the terminal may know that the message has been transmitted to the terminal.

For example, DCI for scheduling of a PDSCH for system information (SI) may be scrambled with an SI-RNTI. DCI for scheduling of a PDSCH for a random access response (RAR) message may be scrambled with an RA-RNTI. DCI for scheduling of a PDSCH for a paging message may be scrambled with a P-RNTI. DCI for notification of a slot format indicator (SFI) may be scrambled with an SFI-RNTI. DCI for notification of a transmit power control (TPC) may be scrambled with a TPC-RNTI. DCI for scheduling of a UE-specific PDSCH or PUSCH may be scrambled with a cell RNTI (C-RNTI).

DCI format 0_0 may be used as fallback DCI for scheduling of a PUSCH, wherein a CRC is scrambled with a C-RNTI. In an embodiment, DCI format 0_0 in which a CRC is scrambled with a C-RNTI may include information as illustrated in [Table 3].

TABLE 3

- Identifier for DCI formats - [1] bit
- Frequency domain resource assignment -[$\log_2 (N_{RB}^{UL,BWP} (N_{RB}^{UL,BWP} +1) / 2)$] bits
- Time domain resource assignment - X bits
- Frequency hopping flag - 1 bit
- Modulation and coding scheme - 5 bits

TABLE 3-continued

- New data indicator - 1 bit
- Redundancy version - 2 bits
- HARQ process number - 4 bits
- TPC command for scheduled PUSCH - [2] bits
- UL/SUL indicator - 0 or 1 bit DCI format 0_1 may be used as non-fallback DCI for scheduling of a PUSCH, wherein a CRC may be scrambled with a C-RNTI. In an embodiment, DCI format 0_1 in which a CRC is scrambled with a C-RNTI may include information as shown in [Table 4].

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment −1, 2, 3, or 4 bits
VRB-to-PRB mapping (virtual resource block-to- physical resource block mapping) - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.

TABLE 4-continued

2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator $- \left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based PUSCH transmission;

$\lceil \log_2(N_{SRS}) \rceil$ bits for codebook based PUSCH transmission.
Precoding information and number of layers-up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as fallback DCI for scheduling of a PDSCH, wherein a CRC is scrambled with a C-RNTI. In an embodiment, DCI format 1_0 in which a CRC is scrambled with a C-RNTI may include information as shown in [Table 5].

TABLE 5

- Identifier for DCI formats - [1] bit
- Frequency domain resource assignment $\lceil \log_2 (N_{RB}^{DL,BWP} (N_{RB}^{DL,BWP} +1) / 2) \rceil$ bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits Alternatively, DCI format 1_0 may be used as DCI for scheduling of PDSCH for an RAR message, wherein a CRC is scrambled with an RA-RNTI. DCI format 0_1 in which a CRC is scrambled with a C-RNTI may include, for example, the following information.

TABLE 6

- Frequency domain resource assignment - $\lceil \lceil \log_2 (N_{RB}^{DL,BWP} (N_{RB}^{DL,BWP} +1) / 2) \rceil \rceil$ bits
- Time domain resource assignment - 4 bits
- VRB-to-PRB mapping - 1 bit
- Modulation and coding scheme - 5 bits
- TB scaling - 2 bits
- Reserved bits - 16 bits DCI format 1_1 may be used as non-fallback DCI for scheduling of a PUSCH, wherein a CRC is scrambled with a C-RNTI. In an embodiment, DCI format 1_1 in which a CRC is scrambled with a C-RNTI may include information as shown in [Table 7].

TABLE 7

Figure 4:
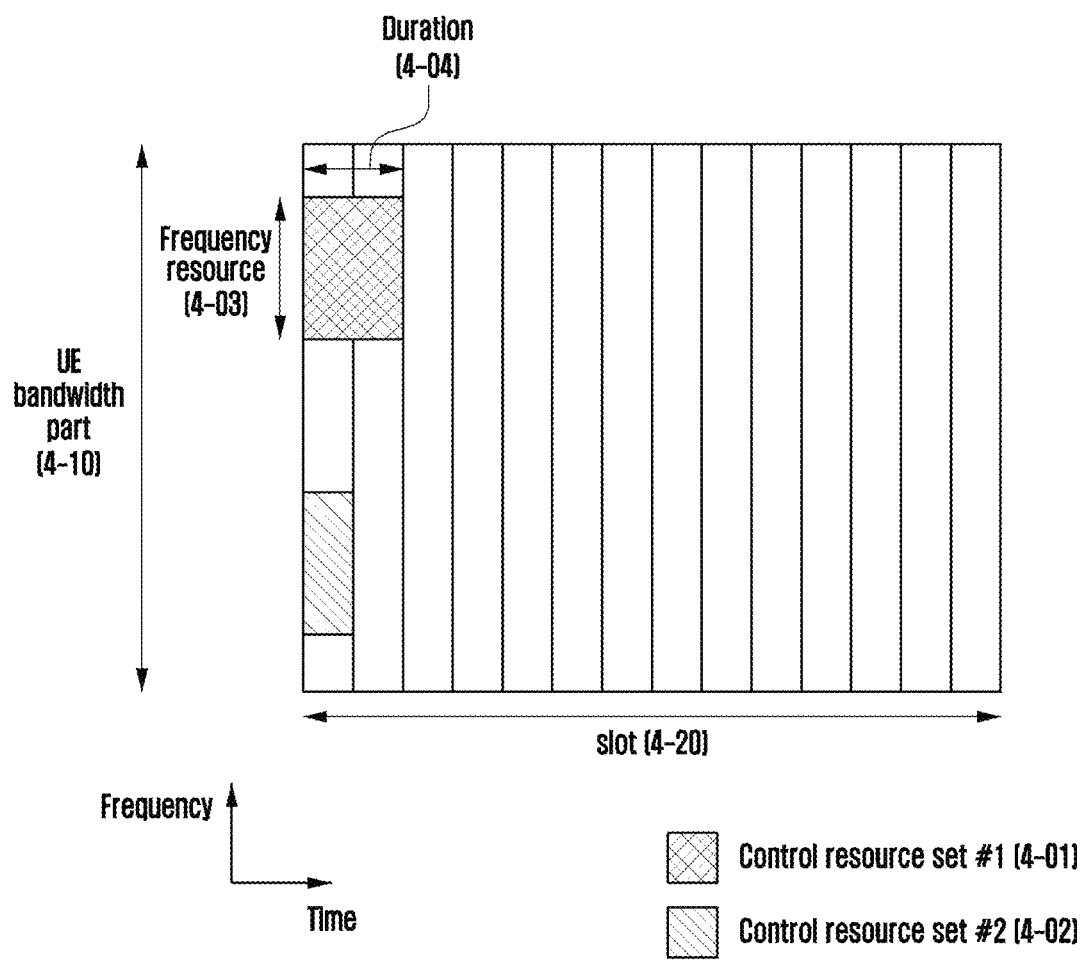
FIG. 4 is a diagram illustrating an example of a control resource set configuration of a downlink control channel in the wireless communication system according to an embodiment of the present disclosure.

- Carrier indicator - 0 or 3 bits
- Identifier for DCI formats - [1] bits
- Bandwidth part indicator - 0, 1 or 2 bits
- Frequency domain resource assignment
  - For resource allocation type 0, $\lceil N_{RB}^{DL,BWP} / P \rceil$ bits
  - For resource allocation type 1, $\lceil \log_2 (N_{RB}^{DL,BWP} (N_{RB}^{DL,BWP} +1) / 2) \rceil$ bits
- Time domain resource assignment - 1, 2, 3, or 4 bits
- VRB-to-PRB mapping - 0 or 1 bit, only for resource allocation type 1
  - 0 bit if only resource allocation type 0 is configured:
  - 1 bit otherwise
- PRB bundling size indicator - 0 or 1 bit
- Rate matching indicator - 0, 1, or 2 bits
- ZP CSI-RS trigger - 0, 1, or 2 bits
  For transport block 1:
- Modulation and coding scheme - 5 bits
- New data indicator - 1 bit
- Redundancy version - 2 bits
  For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ feedback timing indicator - 3 bits
- Antenna ports - 4, 5, or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit FIG. 4 is a diagram or illustrating a control resource set configuration of a downlink control channel in the next-generation mobile communication system according to an embodiment of the present disclosure.

That is, FIG. 4 is a diagram illustrating an example of a control area (control resource set (CORESET)) in which a downlink control channel is transmitted in the 5G wireless communication system according to an embodiment of the disclosure.

Referring to FIG. 4, FIG. 4 illustrates an embodiment in which a terminal bandwidth part 4-10 (UE bandwidth part) is configured on the frequency axis, and two control resource sets (control resource set #1 4-01 and control resource set #2 4-02) are configured within one slot 4-20 on the time axis. The control resource sets 4-01 and 4-02 may be configured in a specific frequency resource 4-03 within the entire terminal bandwidth part 4-10 on the frequency axis. The control resource sets 4-01 and 4-02 may be configured by one or multiple OFDM symbols on the time axis, which may be defined as a control resource set duration 4-04. Referring to FIG. 4, control resource set #1 4-01 may be configured to be a control resource set length of 2 symbols, and control resource set #2 4-02 may be configured to be a control resource set length of 1 symbol.

The control resource set in the next-generation mobile communication system (5G or NR system) may be configured for the terminal by the base station via higher layer signaling (e.g., system information, MIB, and RRC signaling). Configuration of a control resource set for the terminal refers to providing information, such as an identifier (identity) of the control resource set, a frequency position of the control resource set, and a symbol length of the control resource set. For example, configuration of a control resource set may include information as shown in [Table 8] below.

TABLE 8

```
ControlResourceSet ::=                        SEQUENCE {
    -- Corresponds to L1 parameter 'CORESET-ID'
    controlResourceSetId                      ControlResourceSetId,
    frequencyDomainResources                  BIT STRING (SIZE (45)),
    duration                                  INTEGER (1..maxCoReSetDuration),
    cce-REG-MappingType                       CHOICE {
        interleaved                           SEQUENCE {
            reg-BundleSize                    ENUMERATED {n2, n3, n6},
            precoderGranularity               ENUMERATED   {sameAsREG-
bundle, allContiguousRBs},
            interleaverSize                   ENUMERATED {n2, n3, n6}
            shiftIndex
            INTEGER(0..maxNrofPhysicalResourceBlocks-1)
        },
        nonInterleaved                        NULL
```

TABLE 8-continued

```
},
  tci-StatesPDCCH                              SEQUENCE(SIZE
(1..maxNrofTCI-StatesPDCCH)) OF TCI-StateId   OPTIONAL,
    tci-PresentInDCI                          ENUMERATED {enabled}
}
```

In [Table 8], tci-StatesPDCCH (hereinafter, referred to as "TCI state") configuration information may include information on one or multiple SSs/PBCH block indexes or channel state information reference signal (CSI-RS) indexes in a QCL relationship with a DMRS transmitted in a corresponding control resource set.

In the wireless communication system, one or more different antenna ports (alternatively, it is possible to be replaced with one or more channels, signaling, and combinations thereof, but in the description of the disclosure below, for convenience, reference is collectively made to different antenna ports) may be associated with each other by QCL configuration as shown in [Table 9A].

TABLE 9A

```
QCL-Info ::= SEQUENCE {
  cell   ServiceCellIndex (Serving cell index to which QCL reference RS is transmitted)
  bwp-Id  BWP-Id (Index of bandwidth part to which QCL reference RS is transmitted)
  referenceSignal CHOICE { (Indicator indicating one of CSI-RS or SS/PBCH block to
QCL reference RS)
    csi-rs   NZP-CSI-RS-ResourceId,
    ssb      SSB-Index
  },
  qcl-Type  ENUMERATED {typeA, typeB, typeC, typeD}, (QCL type indicator)
  ...
}
```

Specifically, in the QCL configuration, two different antenna ports may be connected in a relationship of a (QCL) target antenna port and a (QCL) reference antenna port, and the terminal may apply (or assume) all or some of statistical characteristics (e.g., a large scale parameter of a channel, such as Doppler shift, Doppler spread, average delay, delay spread, average gain, and spatial Rx (or Tx) parameter, or a reception spatial filter coefficient or a transmission spatial filter coefficient of the terminal) of the channel measured at the reference antenna port when receiving a target antenna port. The target antenna port is an antenna port for transmitting a signal or a channel configured by a higher layer configuration including the QCL configuration, or an antenna port for transmitting a signal or a channel to which a TCI state indicating the QCL configuration is applied. The reference antenna port is an antenna port for transmitting a signal or a channel indicated (specified) by parameter referenceSignal in the QCL configuration.

Specifically, statistical characteristics of a channel, which are specified by the QCL configuration (indicated by a parameter qcl-Type in the QCL configuration) may be classified as follows according to a QCL type:

"QCL-TypeA": {Doppler shift, Doppler spread, average delay, delay spread};
"QCL-TypeB": {Doppler shift, Doppler spread};
"QCL-TypeC": {Doppler shift, average delay}; and
"QCL-TypeD": {Spatial Rx parameter},
In this case, the types of QCL type are not limited to the above four types, but all possible combinations are not listed in order not to obscure the subject matter of description.

The QCL-Type A is a QCL type used in a case where both a bandwidth and a transmission interval of a target antenna port are sufficient compared to a reference antenna port (i.e., when the number of samples and transmission band/time of the target antenna port in both the frequency axis and the time axis are greater than the number of samples and transmission band/time of the reference antenna port) so that all statistical characteristics measurable in the frequency and time axes can be referenced.

The QCL-Type B is a QCL type used in a case where a bandwidth of a target antenna port is sufficient to measure statistical characteristics, e.g., a Doppler shift and a Doppler spread, which are measurable in the frequency axis.

The QCL-Type C is a QCL type used in a case where a bandwidth and transmission interval of a target antenna port are insufficient to measure second-order statistics, e.g., a Doppler spread and delay spreads, so that only first-order statistics, e.g., a Doppler shift and an average delay, can be referenced.

The QCL-Type D is a QCL type configured when spatial reception filter values used when receiving a reference antenna port can be used when receiving a target antenna port.

Meanwhile, the base station is able to configure or indicate up to two QCL configurations to a single target antenna port via the following TCI state configuration as shown in [Table 9B]

TABLE 9B

```
TCI-State::=  SEQUENCE {
  tci-StateId  TCI-StateId, (TCI state indicator)
  qcl-Type1   QCL-Info, (First QCL configuration for target antenna port
to which corresponding TCI state is applied)
  qcl-Type2   QCL-Info (Second QCL configuration for target antenna port
to which corresponding TCI state is applied)  OPTIONAL, -- Need R
  ...
}
```

Among the two QCL configurations included in one TCI state configuration, a first QCL configuration may be configured to one of QCL-Type A, QCL-Type B, and QCL-Type C. In this case, a configurable QCL type is specified according to the types of the target antenna port and the reference antenna port, and will be described in detail below. In addition, among the two QCL configurations included in the one TCI state configuration, a second QCL configuration may be configured to QCL-Type D, and may be omitted in some cases.

Tables 9-1 to 9-5 below shows effective TCI state configurations according to a target antenna port type.

Table 9-1 shows an effective TCI state configuration when the target antenna port is a CSI-RS for tracking (TRS). The TRS refers to an NZP CSI-RS, in which a repetition parameter is not configured and trs-Info is configured to true, among CSI-RSs. Configuration No. 3 in Table 9-1 may be used for aperiodic TRS.

TABLE 9-1

Valid TCI state configuration when a target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9-2 shows valid TCI state configurations when a target antenna port is a CSI-RS for CSI. The CSI-RS for CSI refers to an NZP CSI-RS, in which a repetition parameter is not configured and trs-Info is not configured to true, among CSI-RSs.

TABLE 9-2

Valid TCI state configuration when a target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 9-3 shows valid TCI state configurations when a target antenna port is a CSI-RS for beam management (same meaning as BM, a CSI-RS for L1 RSRP reporting). The CSI-RS for BM refers to an NZP CSI-RS, in which a repetition parameter is configured and has a value of On or Off, and trs-Info is not configured to true, among CSI-RSs.

TABLE 9-3

Valid TCI state configuration when a target antenna port is a CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 9-4 shows valid TCI state configurations when a target antenna port is a PDCCH DMRS.

TABLE 9-4

Valid TCI state configuration when a target antenna port is a PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9-5 shows valid TCI state configurations when a target antenna port is a PDSCH DMRS.

TABLE 9-5

Valid TCI state configuration when a target antenna port is a PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the typical QCL configuration method according to Tables 9-1 to 9-5, the target antenna port and the reference antenna port for each stage are configured and operated as in "SSB"→"TRS"→"CSI-RS for CSI, CSI-RS for BM, PDCCH DMRS, or PDSCH DMRS." Based on this, it is possible to assist a reception operation of the terminal by associating statistical characteristics, which are measurable from the SSB and the TRS, with respective antenna ports.

Figure 5:
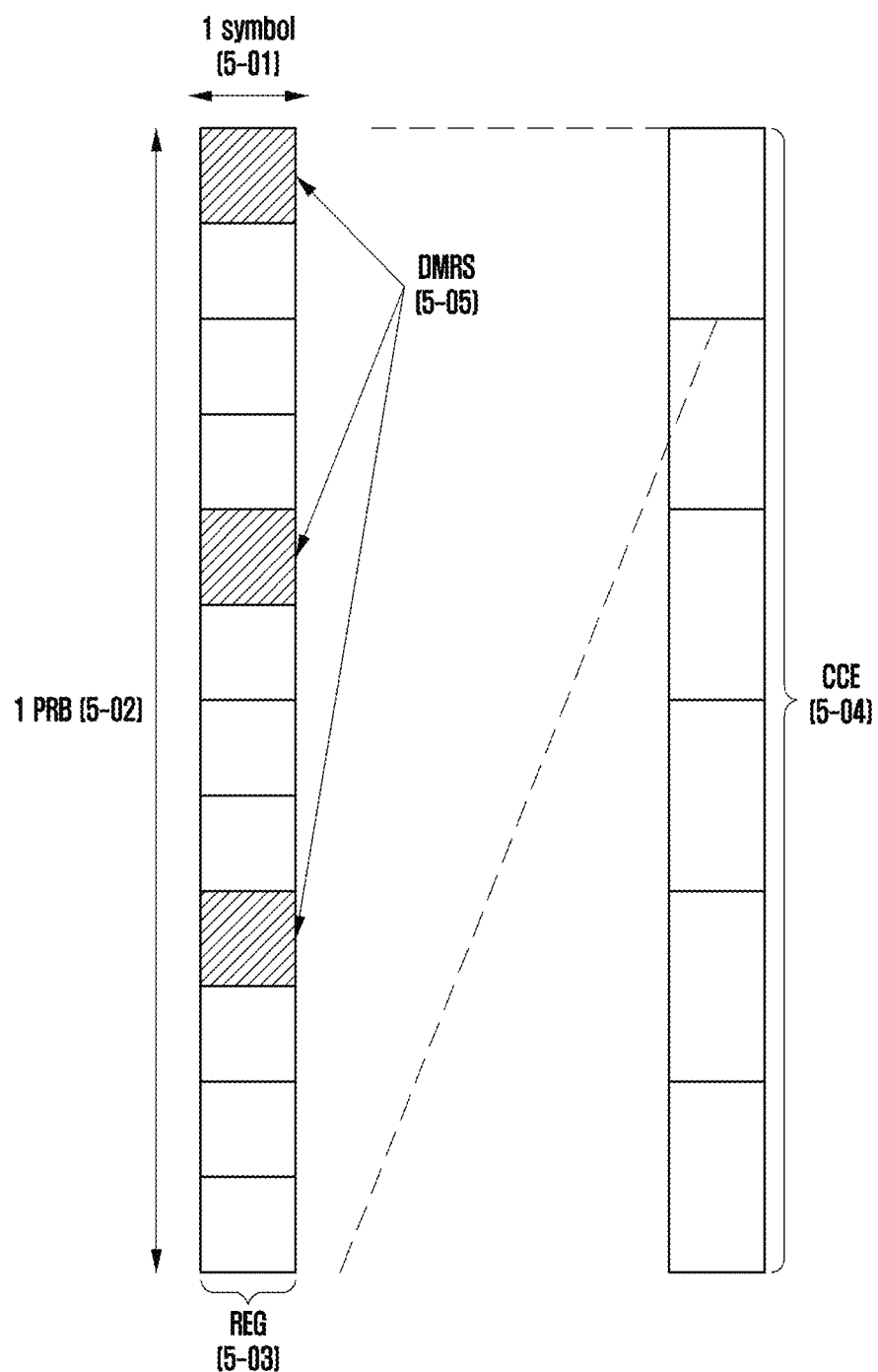
FIG. 5 is a diagram for illustrating a structure of a downlink control channel in the mobile communication system according to an embodiment of the present disclosure.

FIG. 5 is a diagram for illustrating a structure of a downlink control channel in the next-generation mobile communication system according to an embodiment of the present disclosure.

That is, FIG. 5 is a diagram illustrating an example of a basic unit of time and frequency resources constituting a downlink control channel that is available in 5G according to an embodiment of the present disclosure.

Referring to FIG. 5, a basic unit of time and frequency resources constituting a control channel may be defined to be a resource element group (REG) 5-03. The REG 5-03 may be defined as 1 OFDM symbol 5-01 on the time axis and 1 physical resource block (PRB) 5-02 on the frequency axis, that is, 12 subcarriers. The base station may configure a downlink control channel assignment unit by concatenating the REG 5-03.

As illustrated in FIG. 5, when a basic unit to which a downlink control channel is assigned in 5G is a control channel element (CCE) 5-04, 1 CCE 5-04 may include multiple REGs 5-03. For example, the REG 5-03 illustrated in FIG. 5 may include 12 REs, and if 1 CCE 5-04 includes 6 REGs 5-03, 1 CCE 5-04 may include 72 REs. When a downlink control resource set is configured, the corresponding resource set may include multiple CCEs 5-04, and a specific downlink control channel may be mapped to one or multiple CCEs 5-04 so as to be transmitted according to an aggregation level (AL) within the control resource set. The CCEs 5-04 within the control resource set are classified by numbers, and the numbers of the CCEs 5-04 may be assigned according to a logical mapping scheme.

The basic unit of the downlink control channel, i.e., the REG 5-03, illustrated in FIG. 5 may include both REs, to which DCI is mapped, and an area to which a DMRS 5-05, which is a reference signal for decoding of the REs, is mapped. As shown in FIG. 5, 3 DMRSs 5-05 may be transmitted in 1 REG 5-03. The number of CCEs required to transmit a PDCCH may be 1, 2, 4, 8, or 16 depending on the aggregation level (AL), and different numbers of CCEs may be used to implement link adaptation of the downlink control channel. For example, if AL=L, one downlink control channel may be transmitted via the L number of CCEs.

The terminal needs to detect a signal without knowing information on the downlink control channel, wherein a search space representing a set of CCEs may be defined for blind decoding. The search space is a set of downlink control channel candidates including CCEs to which the terminal may attempt decoding on a given aggregation level. Since there are various aggregation levels that make one bundle with 1, 2, 4, 8, and 16 CCEs, the terminal may have multiple search spaces. The search space set may be defined as a set of search spaces at all configured aggregation levels.

The search space may be classified into a common search space and a terminal-specific (UE-specific) search space. According to an embodiment of the disclosure, terminals of a certain group or all terminals may examine a common search space of a PDCCH in order to receive cell-common control information, such as a paging message or dynamic scheduling for system information.

For example, the terminal may receive PDSCH scheduling assignment information for transmission of an SIB including cell operator information, etc. by examining a common search space of a PDCCH. In a case of the common search space, a certain group of terminals or all terminals need to receive the PDCCH, and the common search space may thus be defined as a set of predetermined CCEs. The terminal may receive scheduling assignment information for a UE-specific PDSCH or PUSCH by examining a UE-specific search space of the PDCCH. The UE-specific search space may be defined UE-specifically, based on an identity of the terminal and functions of various system parameters.

In 5G, a parameter for the search space of the PDCCH may be configured by the base station for the terminal via higher layer signaling (e.g., SIB, MIB, and RRC signaling). For example, the base station may configure, for the terminal, the number of PDCCH candidates at each aggregation level L, a monitoring period for a search space, a monitoring occasion in units of symbols in the slot for the search space, a search space type (common search space or UE-specific search space), a combination of an RNTI and a DCI format, which is to be monitored in the search space, a control resource set index for monitoring of the search space, etc. For example, the aforementioned configurations may include information as shown in [Table 10A].

TABLE 10A

```
SearchSpace ::=                                      SEQUENCE {
    -- Identity of the search space. SearchSpaceId = 0 identifies the SearchSpace
configured via PBCH (MIB) or ServingCellConfigCommon.
    searchSpaceId
    SearchSpaceId,
    controlResourceSetId
    ControlResourceSetId,
    monitoringSlotPeriodicityAndOffset                CHOICE {
        sl1
            NULL,
        sl2
            INTEGER (0..1),
        sl4
            INTEGER (0..3),
        sl5
        INTEGER (0..4),
        sl8
            INTEGER (0..7),
        sl10
        INTEGER (0..9),
        sl16
        INTEGER (0..15),
        sl20
        INTEGER (0..19)
    }
        OPTIONAL,
    duration    INTEGER (2..2559)
    monitoringSymbolsWithinSlot                       BIT
STRING (SIZE (14))
                                                     OPTIONAL,
    nrofCandidates
    SEQUENCE {
        aggregationLevel1
        ENUMERATED {n0, n1, n2, n3, n4, n5, n6, n8},
        aggregationLevel2
        ENUMERATED {n0, n1, n2, n3, n4, n5, n6, n8},
        aggregationLevel4
        ENUMERATED {n0, n1, n2, n3, n4, n5, n6, n8},
        aggregationLevel8
        ENUMERATED {n0, n1, n2, n3, n4, n5, n6, n8},
        aggregationLevel16
        ENUMERATED {n0, n1, n2, n3, n4, n5, n6, n8}
    },
    searchSpaceType
    CHOICE {
        -- Configures this search space as common search space (CSS) and
```

TABLE 10A-continued

```
DCI formats to monitor.
    common
    SEQUENCE { 
}
    ue-Specific
    SEQUENCE {
        -- Indicates whether the UE monitors in this USS for DCI
formats 0-0 and 1-0 or for formats 0-1 and 1-1.
        formats
        ENUMERATED {formats0-0-And-1-0, formats0-1-And-1-
1},
    ...
```

Based on the configuration information, the base station may configure one or multiple search space sets for the terminal. According to some embodiments, the base station may configure search space set 1 and search space set 2 for the terminal, may configure DCI format A, which is scrambled with an X-RNTI in search space set 1, to be monitored in the common search space, and may configure DCI format B, which is scrambled with a Y-RNTI in search space set 2, to be monitored in the UE-specific search space.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

The common search space may be classified into a set of search spaces of a specific type according to the purpose. An RNTI to be monitored may be different for each determined search space set type. For example, a common search space type, a purpose, and an RNTI to be monitored may be classified as shown in [Table 10B].

TABLE 10B

| Search space type | Purpose | RNTI |
|---|---|---|
| Type0 CSS | PDCCH transmission for SIB schedule | SI-RNTI |
| Type0A CSS | PDCCH transmission for other SI schedules (SIB2, etc.) | SI-RNTI |
| Type 1 CSS | PDCCH transmission for random access response (RAR) schedule, Msg3 retransmission schedule, Msg4 schedule | RA-RNTI, TC-RNTI |
| Type 2 CSS | Paging | P-RNTI |
| Type 3 CSS | Transmission of group control information | INT-RNTI, SFI-RNTI, TPC-PUSCH-RNTI, TPC-PUCCH-RNTI, TPC-SRS-RNTI |
|  | In case of PCell, PDCCH transmission for data schedule | C-RNTI, MCS-C-RNTI, CS-RNTI |

In the common search space, the following combinations of DCI formats and RNTIs may be monitored. Of course, the disclosure is not limited to the following examples:
  DCI format 0_0/1_0 with CRC scrambled by C-RNTI, CS-RNTI, SP-CSI-RNTI, RA-RNTI, TC-RNTI, P-RNTI, SI-RNTI;
  DCI format 2_0 with CRC scrambled by SFI-RNTI;
  DCI format 2_1 with CRC scrambled by INT-RNTI;
  DCI format 2_2 with CRC scrambled by TPC-PUSCH-RNTI, TPC-PUCCH-RNTI; and
  DCI format 2_3 with CRC scrambled by TPC-SRS-RNTI.

In the UE-specific search space, the following combinations of DCI formats and RNTIs may be monitored. Of course, the disclosure is not limited to the following examples:
  DCI format 0_0/1_0 with CRC scrambled by C-RNTI, CS-RNTI, TC-RNTI; and
  DCI format 1_0/1_1 with CRC scrambled by C-RNTI, CS-RNTI, TC-RNTI.

The RNTIs specified above may conform to the following definitions and uses:
  Cell RNTI (C-RNTI): used for UE-specific PDSCH scheduling;
  Temporary cell RNTI (TC-RNTI): used for UE-specific PDSCH scheduling;
  Configured scheduling RNTI (CS-RNTI): used for semi-statically configured UE-specific PDSCH scheduling;
  Random access RNTI (RA-RNTI): used for scheduling PDSCH at random access stage;
  Paging RNTI (P-RNTI): used for scheduling PDSCH on which paging is transmitted;
  System information RNTI (SI-RNTI): used for scheduling PDSCH on which system information is transmitted;
  Interruption RNTI (INT-RNTI): used for indicating whether to puncture PDSCH;
  Transmit power control for PUSCH RNTI (TPC-PUSCH-RNTI): used for indicating power control command for PUSCH;
  Transmit power control for PUCCH RNTI (TPC-PUCCH-RNTI): used for indicating power control command for PUCCH; and
  Transmit power control for SRS RNTI (TPC-SRS-RNTI): used for indicating power control command for SRS.

In an embodiment, the aforementioned DCI formats may be defined as shown in [Table 11] below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, in 5G, multiple search space sets may be configured by different parameters (e.g., parameters in [Table 10A]). Accordingly, a set of search space sets monitored by the terminal may vary at each time point. For example, if search space set #1 is configured in an X-slot period, search space set #2 is configured in a Y-slot period, and X and Y are different from each other, the terminal may monitor both search space set #1 and search space set #2 in a specific slot, and may monitor one of search space set #1 and search space set #2 in the specific slot.

If multiple search space sets are configured for the terminal, the following conditions may be considered to determine a search space set that the terminal may monitor.

[Condition 1: Limiting the Maximum Number of PDCCH Candidates]

The number of PDCCH candidates that may be monitored per slot may not exceed Mμ. Mμ may be defined to be the maximum number of PDCCH candidates per slot in a cell configured to a subcarrier spacing of $15 \cdot 2^\mu$ kHz, and may be defined as shown in [Table 12] below.

TABLE 12

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limiting the Maximum Number of CCEs]

The number of CCEs constituting the entire search space per slot (here, the entire search space may refer to the entire CCE set corresponding to a union area of multiple search space sets) may not exceed Cμ. Cμ may be defined to be the maximum number of CCEs per slot in a cell configured to a subcarrier spacing of $15 \cdot 2^\mu$ kHz, and may be defined as shown in [Table 13] below.

TABLE 13

| μ | Maximum number of CCEs per slot and per serving cell ($C^\mu$) |
|---|---|
| 0 | 56 |
| 1 | 56 |
| 2 | 48 |
| 3 | 32 |

For convenience of description, a situation in which both conditions 1 and 2 are satisfied at a specific time point may be exemplarily defined as "condition A." Therefore, not satisfying condition A may refer to not satisfying at least one of the above conditions 1 and 2.

According to configurations of the search space sets by the base station, a case in which condition A is not satisfied at a specific time point may occur. If condition A is not satisfied at the specific time point, the terminal may select and monitor only some of the search space sets configured to satisfy condition A at the corresponding time point, and the base station may transmit a PDCCH in the selected search space sets.

According to an embodiment of the disclosure, a method of selecting some search spaces from among the entire configured search space sets may conform to the following methods.

If condition A for the PDCCH fails to be satisfied in a specific time point (slot), The terminal (or base station) may select a search space set, in which a search space type has been configured to be the common search space, over a search space set configured to be the UE-specific search space, from among the search space sets that exist at the corresponding time point.

If all the search space sets configured to be the common search space are selected (that is, if condition A is satisfied even after all the search spaces configured to be the common search space are selected), the terminal (or base station) may select the search space sets configured to be the UE-specific search space. In this case, if there are multiple search space sets configured to be the UE-specific search spaces, a search space set having a low search space set index may have a higher priority. In consideration of the priority, the terminal or the base station may select terminal-specific search space sets within a range in which condition A is satisfied.

Hereinafter, time and frequency resource allocation methods for data transmission in NR will be described.

In NR, the following detailed frequency domain resource allocation (FD-RA) methods may be provided in addition to frequency-axis resource candidate allocation via BWP indication.

Figure 6:
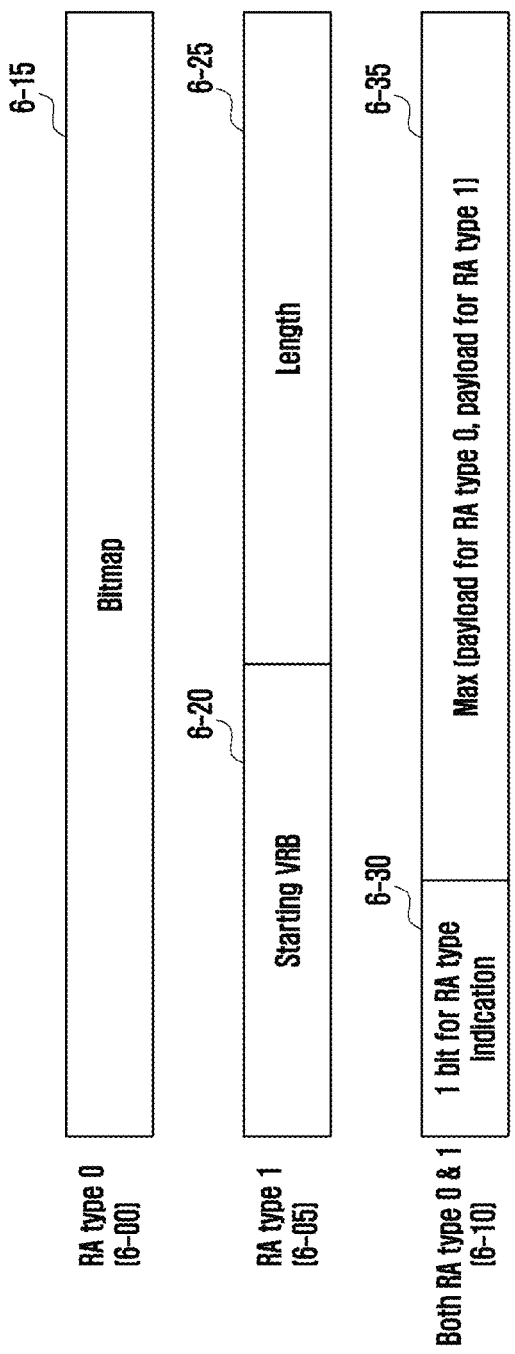
FIG. 6 is a diagram illustrating an example of a frequency axis resource allocation of a physical downlink shared channel (PDSCH) in the wireless communication system according to an embodiment of the present disclosure.

FIG. 6 is a diagram illustrating an example of frequency axis resource allocation of a PDSCH in the wireless communication system according to an embodiment of the present disclosure.

FIG. 6 is a diagram illustrating three frequency axis resource allocation methods of type 0 6-00, type 1 6-05, and dynamic switch 6-10 which are configurable via a higher layer in NR.

Referring to FIG. 6, if a terminal is configured, via higher layer signaling, to use only resource type 0 6-00, some downlink control information (DCI) assigning a PDSCH to the terminal has a bitmap including NRBG bits. Conditions for this will be described later. In this case, NRBG refers to the number of resource block groups (RBG) determined as shown in [Table 14] below according to a BWP size assigned by a BWP indicator and higher layer parameter rbg-Size, and data may be transmitted to the RBG indicated to be 1 by a bit map.

TABLE 14

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured, via higher layer signaling, to use only resource type 1 6-05, some DCI that assigns a PDSCH to the terminal may include frequency axis resource allocation information including $\lceil \log_2(N_{RB}^{D,L,BWP} (N_{RB}^{D,L,BWP}+1)/2) \rceil$ bits. Conditions for this will be described later. Based on this, the base station may configure a starting VRB 6-20 and a length 6-25 of frequency axis resources continuously allocated therefrom.

If the terminal is configured, via higher layer signaling, to use both resource type 0 and resource type 1 6-10, some DCI that assigns a PDSCH to the terminal may include frequency axis resource allocation information including bits of a large value 6-35 among a payload 6-15 for configuration of resource type 0 and payloads 6-20 and 6-25 for configuration of resource type 1. Conditions for this will be described later. In this case, one bit may be added to a first part (MSB)

of the frequency axis resource allocation information in the DCI, and if the corresponding bit is 0, use of resource type 0 may be indicated, and if the corresponding bit is 1, use of resource type 1 may be indicated.

Hereinafter, a method of time domain resource allocation for a data channel in the next-generation mobile communication system (5G or NR system) is described.

The base station may configure, for the terminal via higher layer signaling (e.g., RRC signaling), a table for time domain resource allocation information on a downlink data channel (PDSCH) and an uplink data channel (PUSCH). A table including up to 16 entries (maxNrofDL-Allocations=16) may be configured for the PDSCH, and a table including up to 16 entries (maxNrofUL-Allocations=16) may be configured for the PUSCH.

In an embodiment, the time domain resource allocation information may include a PDCCH-to-PDSCH slot timing (denoted as K0, and corresponding to a time interval in units of slots between a time point at which the PDCCH is received and a time point at which the PDSCH scheduled by the received PDCCH is transmitted), a PDCCH-to-PUSCH slot timing (denoted as K2, and corresponding to a time interval in units of slots between a time point at which the PDCCH is received and a time point at which the PUSCH scheduled by the received PDCCH is transmitted), information on a position and length of a start symbol in which the PDSCH or PUSCH is scheduled within a slot, a mapping type of the PDSCH or PUSCH, or the like. For example, information as shown in [Table 15] or [Table 15-1] below may be transmitted to the terminal by the base station.

a control channel, which are configured using a higher layer, a scheduling offset (K0) value, and an OFDM symbol start position 7-00 and length 7-05 within one slot dynamically indicated via DCI.

Figure 8:
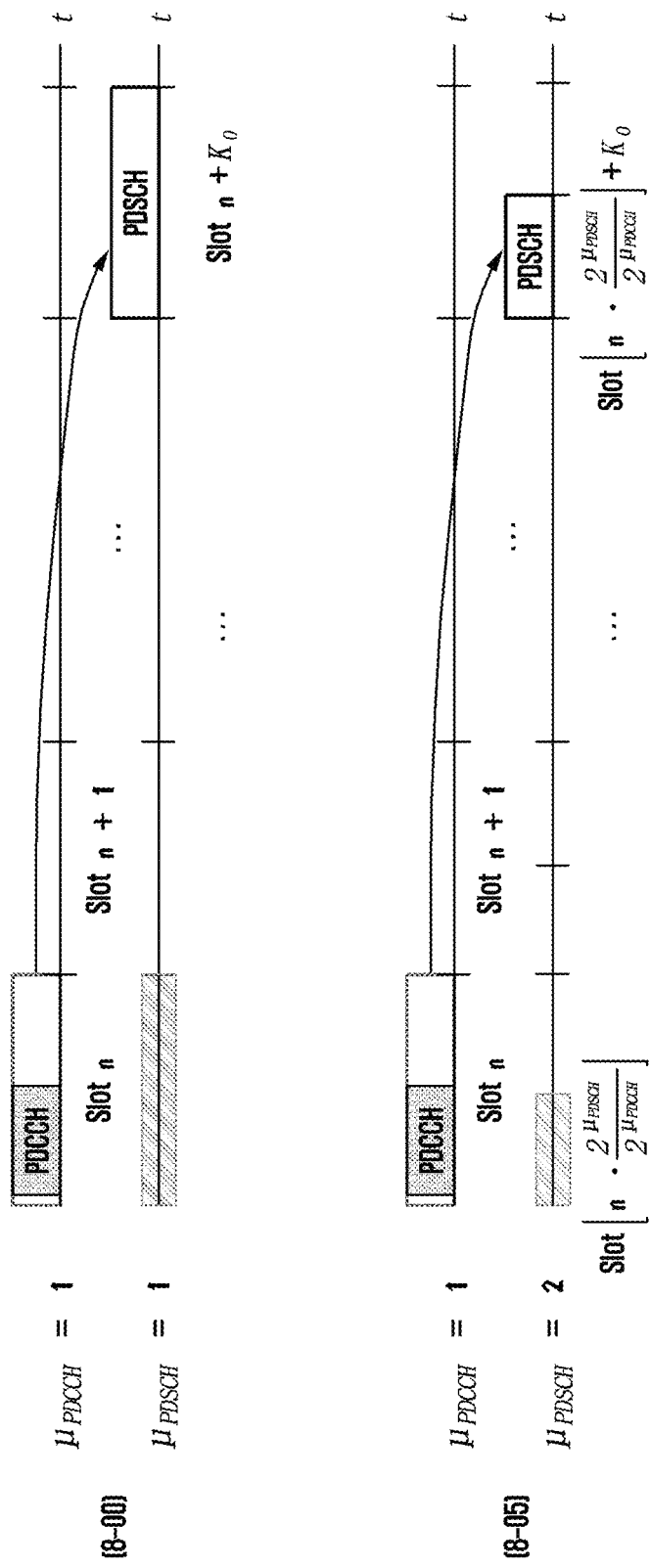
FIG. 8 is a diagram illustrating an example of time axis resource allocation according to subcarrier spacings of a data channel and a control channel in the wireless communication system according to an embodiment of the present disclosure.

FIG. 8 is a diagram illustrating an example of time axis resource allocation according to subcarrier spacings of a data channel and a control channel in the wireless communication system according to an embodiment of the present disclosure.

Referring to FIG. 8, it can be seen that when subcarrier spacings of a data channel and a control channel are the same 8-00 ($\mu_{PDSCH}=\mu_{PDCCH}$), since slot numbers for data and control are the same, a scheduling offset occurs in a base station and a terminal according to a predetermined slot offset K0. On the other hand, it can be seen that when subcarrier spacings of a data channel and a control channel are different 8-05 ($\mu_{PDSCH}\neq\mu_{PDCCH}$), since slot numbers for data and control are different, a scheduling offset occurs in a base station and a terminal according to a predetermined slot offset K0, based on a subcarrier spacing of a PDCCH.

In NR, the terminal transmits control information (uplink control information (UCI)) to the base station via a physical uplink control channel (PUCCH). The control information may include at least one of HARQ-ACK indicating success or failure of demodulation/decoding for a transport block (TB) received by the terminal via a PDSCH, a scheduling request (SR) for requesting resource allocation from a PUSCH base station by the terminal for uplink data transmission, and channel state information (CSI) that is information for reporting a channel state of the terminal.

TABLE 15

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
  k0      INTEGER(0..32)      OPTIONAL, -- Need S
  mappingType      ENUMERATED {typeA, typeB},
  startSymbolAndLength     INTEGER (0..127)
}

TABLE 15-1

PUSCH-TimeDomainResourceAllocation information element

PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
  k2      INTEGER(0..32)  OPTIONAL, -- Need S
  mappingType      ENUMERATED {typeA, typeB},
  startSymbolAndLength     INTEGER (0..127)
}

The base station may indicate one of the entries in the tables relating to the time domain resource allocation information to the terminal via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Figure 7:
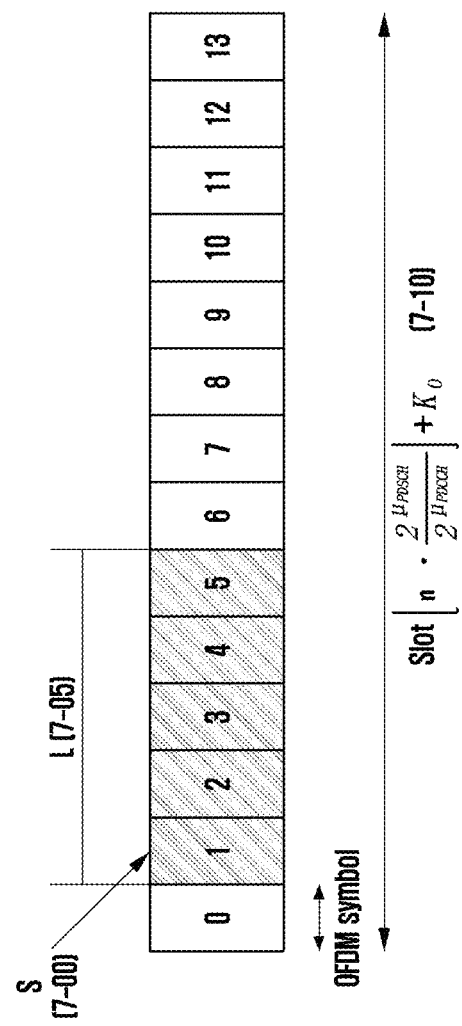
FIG. 7 is a diagram illustrating an example of a time axis resource allocation of a PDSCH in the wireless communication system according to an embodiment of the present disclosure.

FIG. 7 is a diagram illustrating an example of a time axis resource allocation of a physical downlink shared channel (PDSCH) in the wireless communication system according to an embodiment of the present disclosure.

Referring to FIG. 7, a base station may indicate a time axis position of a PDSCH resource according to subcarrier spacings (SCSs) ($\mu_{PDSCH}$ and $\mu_{PDCCH}$) of a data channel and A PUCCH resource may be largely divided into a long PUCCH and a short PUCCH according to a length of an assigned symbol. In NR, a long PUCCH has a length of 4 symbols or more in a slot, and a short PUCCH has a length of 2 symbols or fewer in a slot.

In more details about the long PUCCH, the long PUCCH may be used for the purpose of improving uplink cell coverage, and thus may be transmitted in a DFT-S-OFDM scheme, which is a single carrier transmission, rather than OFDM transmission. The long PUCCH supports transmission formats, such as PUCCH format 1, PUCCH format 3, and PUCCH format 4, depending on the number of supportable control information bits and whether terminal multiplexing via pre-DFT OCC support at the front stage of IFFT is supported.

First, the PUCCH format 1 is a DFT-S-OFDM-based long PUCCH format capable of supporting control information of up to 2 bits, and uses a frequency resource of 1RB. The control information may include each of or a combination of HARQ-ACK and SR. In PUCCH format 1, an OFDM symbol including a DMRS that is a demodulation reference signal (or reference signal) and an OFDM symbol including UCI are configured in a repetitive manner.

For example, if the number of transmission symbols of PUCCH format 1 is 8 symbols, a first start symbol of 8 symbols includes a DMRS symbol, a UCI symbol, a a DMRS symbol, a UCI symbol, a DMRS symbol, a UCI symbol, a DMRS symbol, and a UCI symbol in sequence. The DMRS symbol is spread using an orthogonal code (or orthogonal sequence or spreading code, wi(m)) on the time axis to a sequence corresponding to a length of 1RB on the frequency axis within one OFDM symbol, and is transmitted after IFFT is performed.

The UCI symbol is generated as follows. The terminal may generate d(0) by BPSK-modulating 1-bit control information and by QPSK-modulating 2-bit control information, perform scrambling by multiplying generated d(0) by a sequence corresponding to the length of 1 RB on the frequency axis, spread the scrambled sequence by using an orthogonal code (or an orthogonal sequence or spreading code, wi(m)) on the time axis, perform the IFFT, and then perform transmission.

The terminal generates the sequence, based on a group hopping or sequence hopping configuration and a configured ID, which are configured via a higher signal from the base station, and generates a sequence corresponding to a length of 1 RB by cyclic shifting the generated sequence with an initial cyclic shift (CS) value configured via a higher signal.

wi(m) is determined as in $$w_i(m) = e^{\frac{j2\pi \phi(m)}{N_{SF}}}$$

when a length (NSF) of a spreading code is given, which is specifically shown in [Table 16] below. i refers to an index of the spreading code, and m refers to indexes of elements of the spreading code. Here, numbers in [ ] in [Table 16] refer to $\phi(m)$, for example, if the length of the spreading code is 2 and the index of the configured spreading code satisfies i=0, spreading code wi(m) becomes $w_i(0) = e^{j2\pi \cdot 0/N_{SF}} = 1$ and $w_i(1) = e^{j2\pi \cdot 0/N_{SF}} = 1$, and satisfies wi(m)=[1 1].

configured via a higher layer. The control information may include each of or a combination of HARQ-ACK, SR, and CSI. In PUCCH format 3, a DMRS symbol position is presented, in [Table 17] below, according to whether frequency hopping is configured and whether an additional DMRS symbol is configured in the slot.

TABLE 17

| | DMRS location in PUCCH format 3/4 transmission | | | |
|---|---|---|---|---|
| PUCCH | Additional DMRS is not configured | | Additional DMRS is configured | |
| format 3/4 Transmission length | Frequency hopping is not configured | Frequency hopping is configured | Frequency hopping is not configured | Frequency hopping is configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, if the number of transmission symbols of PUCCH format 3 is 8 symbols, a first start symbol of the 8 symbols starts with 0, and a DMRS is transmitted via the first symbol and a fifth symbol. In the table above, the same scheme is also applied to a DMRS symbol position of PUCCH format 4.

Next, PUCCH format 4 is a DFT-S-OFDM-based long PUCCH format capable of supporting control information exceeding 2 bits, and uses a frequency resource of 1RB. The control information may include each of or a combination of HARQ-ACK, SR, and CSI. A difference between PUCCH format 4 and PUCCH format 3 is that, in a case of PUCCH format 4, PUCCH format 4 of multiple terminals can be multiplexed within one RB. Multiplexing of PUCCH format 4 of multiple terminals is possible via application of pre-DFT OCC to control information in the front stage of IFFT. However, the number of transmittable control information symbols of one terminal decreases according to the number of multiplexed terminals. The number of multiplexable terminals, that is, the number of different available OCCs, may be 2 or 4, and the number of OCCs and the OCC index to be applied may be configured via a higher layer.

Next, a short PUCCH will be described. The short PUCCH may be transmitted in both a downlink centric slot

TABLE 16

| | $\phi(m)$ | | | | | | |
|---|---|---|---|---|---|---|---|
| $N_{SF}$ | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a DFT-S-OFDM-based long PUCCH format capable of supporting control information exceeding 2 bits, and the number of used RBs may be and an uplink centric slot and, in general, the short PUCCH may be transmitted at a last symbol of a slot or an OFDM symbol at the end (e.g., a last OFDM symbol, a second OFDM symbol from the end, or last 2 OFDM symbols). Of course, transmission of the short PUCCH at a random position in the slot is also possible. The short PUCCH may be transmitted using one OFDM symbol or two OFDM symbols. The short PUCCH may be used to shorten a delay time compared to a long PUCCH in a situation where uplink cell coverage is good, and is transmitted in a CP-OFDM scheme.

The short PUCCH supports transmission formats, such as PUCCH format 0 and PUCCH format 2, according to the number of supportable control information bits. First, PUCCH format 0 is a short PUCCH format capable of supporting control information of up to 2 bits, and uses a frequency resource of 1 RB. The control information may include each of or a combination of HARQ-ACK and SR. PUCCH format 0 has a structure of transmitting no DMRS and transmitting only a sequence mapped to 12 subcarriers in the frequency axis within one OFDM symbol. The terminal generates a sequence, based on a group hopping or sequence hopping configuration and a configured ID, which are configured via a higher signal from the base station, cyclic-shifts the generated sequence by using a final cyclic shift (CS) value obtained by adding a different CS value to an indicated initial CS value depending on ACK or NACK, maps the cyclic-shifted sequence to 12 subcarriers, and transmits the mapped sequence.

For example, when HARQ-ACK is 1 bit, as in the following [Table 18], if ACK, the terminal generates a final CS by adding 6 to an initial CS value, and if NACK, the terminal generates the final CS by adding 0 to the initial CS. The CS value of 0 for NACK and the CS value of 6 for ACK are defined in the standard, and the terminal always generates PUCCH format 0 according to the value so as to transmit 1-bit HARQ-ACK.

TABLE 18

| 1 bit HARQ-ACK | NACK | ACK |
|---|---|---|
| Final CS | (Initial CS + 0) mod 12 = initial CS | (Initial CS + 6) mod 12 |

For example, if HARQ-ACK is 2 bits as in the following [Table 19], 0 is added to an initial CS value if (NACK, NACK), 3 is added to the initial CS value if (NACK, ACK), 6 is added to the initial CS value if (ACK, ACK), and 9 is added to the initial CS value if (ACK, NACK). The CS value of 0 for (NACK, NACK), the CS value of 3 for (NACK, ACK), the CS value of 6 for (ACK, ACK), and the CS value of 9 for (ACK, NACK) are defined in the standard, and the terminal always generates PUCCH format 0 according to the value so as to transmit a 2-bit HARQ-ACK.

If the final CS value exceeds 12 by the CS value added according to ACK or NACK to the initial CS value, since a sequence length is 12, modulo 12 is applied to the final CS value.

TABLE 19

| 2 bit HARQ-ACK | NACK, NACK | NACK, ACK | ACK, ACK | ACK, NACK |
|---|---|---|---|---|
| Final CS | (Initial CS + 0) mod 12 = Initial CS | (Initial CS + 3) mod 12 | (Initial CS + 6) mod 12 | (Initial CS + 9) mod 12 |

Next, PUCCH format 2 is a short PUCCH format supporting control information exceeding 2 bits, and the number of used RBs is configurable via a higher layer. The control information may include each of or a combination of HARQ-ACK, SR, and CSI. According to PUCCH format 2, positions of subcarriers in which a DMRS is transmitted within one OFDM symbol is fixed to subcarriers having indexes of #1, #4, #7, and #10, when an index of a first subcarrier is #0. The control information is mapped to subcarriers remaining after excluding the subcarriers, in which the DMRS is positioned, via modulation after channel coding.

In summary, values configurable for the aforementioned respective PUCCH formats and ranges of the values may be organized as shown in [Table 20] below. In the following table, a case where no value needs to be configured is indicated as N.A.

TABLE 20

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4-14 | 1, 2 | 4-14 | 4-14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A. (Default is 1) | N.A. (Default is 1) | 1-16 | 1-6, 8-10, 12, 15, 16 | N.A. (Default is 1) |
| Enabling frequency hopping (intra-slot) | Configurability | ✓ | ✓ | ✓ | ✓ | ✓ |
| | Value range | On/Off (only for 2 symbol) | On/Off | On/Off (only for 2 symbol) | On/Off | On/Off |
| Freq.cy resource of $2^{nd}$ hop if intra-slot frequency hopping is enabled | Configurability | ✓ | ✓ | ✓ | ✓ | ✓ |
| | Value range | 0-274 | 0-274 | 0-274 | 0-274 | 0-274 |

TABLE 20-continued

| | | PUCCH Format 0 | PUCCH Format 1 | PUCCH Format 2 | PUCCH Format 3 | PUCCH Format 4 |
|---|---|---|---|---|---|---|
| Index of initial cyclic shift | Configurability | ✓ | ✓ | N.A. | N.A. | N.A. |
| | Value range | 0-11 | 0-11 | N.A. | N.A. | N.A. |
| Index of time-domain OCC | Configurability | N.A. | ✓ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

In order to improve uplink coverage, multi-slot repetition may be supported for PUCCH formats 1, 3, and 4, and PUCCH repetition is configurable for each PUCCH format.

The terminal repeatedly transmits a PUCCH including UCI as many as the number of slots configured via nrofSlots, which is higher layer signaling. For the repeated PUCCH transmission, PUCCH transmission in each slot may be performed using the same number of consecutive symbols, and the number of the consecutive symbols may be configured via nrofSymbols in PUCCH-format 1, PUCCH-format 3, or PUCCH-format 4, which is higher layer signaling. For the repeated PUCCH transmission, PUCCH transmission in each slot may be performed using the same start symbol, and the start symbol may be configured via startingSymbolIndex in PUCCH-format 1, PUCCH-format 3, or PUCCH-format 4, which is higher layer signaling.

For the repeated PUCCH transmission, if the terminal has been configured to perform frequency hopping in PUCCH transmission in different slots, the terminal performs frequency hopping in units of slots. In addition, if the terminal has been configured to perform frequency hopping in PUCCH transmission in different slots, the terminal starts, in an even-numbered slot, the PUCCH transmission from a first PRB index configured via startingPRB, which is higher layer signaling, and the terminal starts, in an odd-numbered slot, the PUCCH transmission from a second PRB index configured via secondHopPRB, which is higher layer signaling.

Additionally, if the terminal is configured to perform frequency hopping in PUCCH transmission in different slots, an index of a slot indicated to the terminal for first PUCCH transmission is 0, and during the configured total number of repeated PUCCH transmissions, a value of the number of repeated PUCCH transmissions is increased in each slot regardless of execution of the PUCCH transmission. If the terminal is configured to perform frequency hopping in PUCCH transmission in different slots, the terminal does not expect configuration of frequency hopping within the slot when performing PUCCH transmission. If the terminal is not configured to perform frequency hopping in PUCCH transmission in different slots but is configured for frequency hopping in a slot, a first PRB index and a second PRB index are applied equally in the slot.

Next, a PUCCH resource configuration of the base station or the terminal is described. The base station is able to configure a PUCCH resource for each BWP via a higher layer for a specific terminal. The configuration may be as shown in [Table 21].

TABLE 21

```
PUCCH-Config ::=    SEQUENCE {
  resourceSetToAddModList    SEQUENCE (SIZE (1..maxNrofPUCCH-
ResourceSets)) OF PUCCH-ResourceSet OPTIONAL, -- Need N
  resourceSetToReleaseList    SEQUENCE (SIZE (1..maxNrofPUCCH-ResourceSets))
OF PUCCH-ResourceSetId OPTIONAL, -- Need N
  resourceToAddModList    SEQUENCE (SIZE (1..maxNrofPUCCH-Resources)) OF
PUCCH-Resource   OPTIONAL, -- Need N
  resourceToReleaseList    SEQUENCE (SIZE (1..maxNrofPUCCH-Resources)) OF
PUCCH-ResourceId   OPTIONAL, -- Need N
  format1           SetupRelease { PUCCH-FormatConfig }     OPTIONAL, --
Need M
  format2           SetupRelease { PUCCH-FormatConfig }     OPTIONAL, --
Need M
  format3           SetupRelease { PUCCH-FormatConfig }     OPTIONAL, --
Need M
  format4           SetupRelease { PUCCH-FormatConfig }     OPTIONAL, --
Need M
  schedulingRequestResourceToAddModList SEQUENCE (SIZE (1..maxNrofSR-
Resources)) OF SchedulingRequestResourceConfig
                   OPTIONAL, -- Need N
  schedulingRequestResourceToReleaseList SEQUENCE (SIZE (1..maxNrofSR-
Resources)) OF SchedulingRequestResourceId
                   OPTIONAL, -- Need N
  multi-CSI-PUCCH-ResourceList   SEQUENCE (SIZE (1..2)) OF PUCCH-
ResourceId        OPTIONAL, -- Need M
  dl-DataToUL-ACK        SEQUENCE (SIZE (1..8)) OF INTEGER (0..15)
OPTIONAL, -- Need M
  spatialRelationInfoToAddModList   SEQUENCE (SIZE
(1..maxNrofSpatialRelationInfos)) OF PUCCH-SpatialRelationInfo
                   OPTIONAL, -- Need N
```

TABLE 21-continued

```
spatialRelationInfoToReleaseList   SEQUENCE (SIZE
(1..maxNrofSpatialRelationInfos)) OF PUCCH-SpatialRelationInfoId
                OPTIONAL, -- Need N
pucch-PowerControl     PUCCH-PowerControl         OPTIONAL, -- Need M
...
}
```

According to the above table, one or multiple PUCCH resource sets in the PUCCH resource configuration for a specific BWP may be configured, and a maximum payload value for UCI transmission may be configured in some of the PUCCH resource sets. Each PUCCH resource set may include one or multiple PUCCH resources, and each of the PUCCH resources may belong to one of the aforementioned PUCCH formats.

With respect to the PUCCH resource sets, for a first PUCCH resource set, a maximum payload value may be fixed to a predetermined number of bits (e.g., 2 bits), and thus the corresponding value may not be separately configured via a higher layer. If remaining PUCCH resource sets are configured, indexes of the corresponding PUCCH resource sets may be configured in ascending order according to maximum payload values, and a maximum payload value may not be configured in the last PUCCH resource set. Higher layer configuration for the PUCCH resource sets may be as shown in [Table 22] below.

TABLE 22

```
-- A set with one or more PUCCH resources
PUCCH-ResourceSet ::=      SEQUENCE {
  pucch-ResourceSetId    PUCCH-ResourceSetId,
  resourceList        SEQUENCE (SIZE (1..maxNrofPUCCH-ResourcesPerSet)) OF
PUCCH-ResourceId,
  maxPayloadMinus1      INTEGER (4..256)       OPTIONAL -- Need R
}
```

Parameter resourceList in the above table may include IDs of PUCCH resources belonging to the PUCCH resource set.

During initial access or if the PUCCH resource set is not configured, a PUCCH resource set as shown in [Table 23], which includes multiple cell-specific PUCCH resources in an initial BWP, may be used. The PUCCH resource to be used for initial access in this PUCCH resource set may be indicated via SIB 1.

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits in the case of PUCCH format 0 or 1, and may be determined by a symbol length, the number of PRBs, and a maximum code rate in the case of the remaining formats. The symbol length and the number of PRBs may be configured for each PUCCH resource, and the maximum code rate may be configured for each PUCCH format.

Next, PUCCH resource selection for UCI transmission is described.

In a case of SR transmission, a PUCCH resource for an SR corresponding to schedulingRequestiD may be configured via a higher layer, as shown in [Table 24]. The PUCCH resource may be a resource belonging to PUCCH format 0 or PUCCH format 1.

TABLE 24

```
SchedulingRequestResourceConfig ::=  SEQUENCE {
  schedulingRequestResourceId   SchedulingRequestResourceId,
  schedulingRequestID      SchedulingRequestId,
  periodicityAndOffset    CHOICE {
    sym2           NULL,
    sym6or7           NULL,
    sl1            NULL,      -- Recurs in every slot
    sl2            INTEGER (0..1),
    sl4            INTEGER (0..3),
    sl5            INTEGER (0..4),
    sl8            INTEGER (0..7),
    sl10            INTEGER (0..9),
    sl16            INTEGER (0..15),
    sl20            INTEGER (0..19),
    sl40            INTEGER (0..39),
    sl80            INTEGER (0..79),
    sl160           INTEGER (0..159),
    sl320           INTEGER (0..319),
    sl640           INTEGER (0..639)
  }                    OPTIONAL, -- Need M
  resource         PUCCH-ResourceId   OPTIONAL   -- Need M
}
```

For the configured PUCCH resource, a transmission period and an offset are configured via parameter periodicityAndOffset of [Table 24]. If there is uplink data to be transmitted by the terminal at a time point corresponding to the configured period and offset, the corresponding PUCCH resource is transmitted, otherwise the corresponding PUCCH resource may not be transmitted.

In a case of CSI transmission, a PUCCH resource for transmission of a periodic or semi-persistent CSI report via a PUCCH may be configured in parameter pucch-CSI-ResourceList via higher signaling, as shown in [Table 25]. The parameter includes a list of PUCCH resources specific to respective BWPs for a cell or CC in which the corresponding CSI report is to be transmitted. The PUCCH resource may be a resource belonging to PUCCH format 2, PUCCH format 3, or PUCCH format 4.

TABLE 25

```
CSI-ReportConfig ::=       SEQUENCE {
  reportConfigId     CSI-ReportConfigId,
  carrier       ServCellIndex    OPTIONAL, -- Need S
    ...
  reportConfigType     CHOICE {
    periodic       SEQUENCE {
      reportSlotConfig        CSI-ReportPeriodicityAndOffset,
      pucch-CSI-ResourceList     SEQUENCE (SIZE (1..maxNrofBWPs)) OF PUCCH-CSI-Resource
    },
    semiPersistentOnPUCCH      SEQUENCE {
      reportSlotConfig      CSI-ReportPeriodicityAndOffset,
      pucch-CSI-ResourceList     SEQUENCE (SIZE (1..maxNrofBWPs)) OF PUCCH-CSI-Resource
    },
    ...
}
```

For the PUCCH resource, a transmission period and an offset are configured via reportSlotConfig of [Table 25].

In a case of HARQ-ACK transmission, a resource set of a PUCCH resource for transmission is first selected according to a payload of UCI including corresponding HARQ-ACK. That is, a PUCCH resource set having a minimum payload not smaller than the UCI payload is selected. Next, a PUCCH resource in the PUCCH resource set may be selected via a PUCCH resource indicator (PRI) in DCI for scheduling of a TB corresponding to the HARQ-ACK, and the PRI may be the PUCCH resource indicator specified in [Table 5] or [Table 6]. A relationship between the PRI configured via higher signaling and the PUCCH resource selected from the PUCCH resource set may be as shown in [Table 26].

TABLE 26

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

If the number of selected PUCCH resources in the PUCCH resource set is greater than 8, the PUCCH resources may be selected by the following Equation 1:

$$r_{PUCCH} = \begin{cases} \left\lfloor \dfrac{n_{CCE,p} \cdot \lfloor R_{PUCCH}/8 \rfloor}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lfloor R_{PUCCH}/8 \rfloor}{N_{CCE,p}} \right\rfloor + \Delta_{PRI} \cdot \left\lfloor \dfrac{R_{PUCCH}}{8} \right\rfloor + R_{PUCCH} \bmod 8 & \text{if } \Delta_{PRI} \geq R_{PUCCH} \bmod 8 \end{cases}$$ [Equation 1]

In the above Equation 1, $r_{PUCCH}$ indicates an index of a selected PUCCH resource in the PUCCH resource set, $R_{PUCCH}$ indicates the number of PUCCH resources belonging to the PUCCH resource set, $\Delta_{PRI}$ indicates a PRI value, $N_{CCE,p}$ indicates the total number of CCEs of CORESET p to which received DCI belongs, and $n_{CCE,p}$ indicates a first CCE index for the received DCI.

A time point at which the corresponding PUCCH resource is transmitted is after $K_1$ slots from TB transmission corresponding to the HARQ-ACK. A candidate of value $K_1$ is configured via a higher layer, and more specifically, is configured via parameter dl-DataToUL-ACK in PUCCH-Config specified in [Table 21]. One $K_1$ value among the candidates may be selected by a PDSCH-to-HARQ feedback timing indicator in the DCI for scheduling of the TB, and this value may be the value specified in [Table 5] or [Table 6]. The unit of the $K_1$ value may be units of slots or units of sub slots. Here, a sub slot is a unit of a length smaller than that of a slot, and one or multiple symbols may constitute one sub slot.

Next, a case where two or more PUCCH resources are located in one slot is described. The terminal may transmit UCI via one or two PUCCH resources in one slot or sub-slot, and when UCI is transmitted via two PUCCH resources in one slot/sub-slot, i) respective PUCCH resources do not overlap in units of symbols, and ii) at least one PUCCH resource may be a short PUCCH. The terminal may not expect to transmit multiple PUCCH resources for HARQ-ACK transmission within one slot.

Next, a PUCCH transmission procedure when two or more PUCCH resources overlap is described. If two or more PUCCH resources overlap, one of the overlapping PUCCH resources may selected or a new PUCCH resource may be selected according to the condition that the transmitted PUCCH resource may not overlap in units of symbols. In addition, all UCI payloads transmitted via the overlapping PUCCH resources may be multiplexed and transmitted, or some of the UCI payloads may be dropped. First, a case (case 1) in which multi-slot repetition is not configured in PUCCH resources and a case (case 2) in which multi-slot repetition is configured in PUCCH resources are described.

If the PUCCH resources overlap, case 1 is divided into case 1-1 which is a case where two or more PUCCH resources for HARQ-ACK transmission overlap, and case 1-2 which are the remaining cases.

Figure 9:
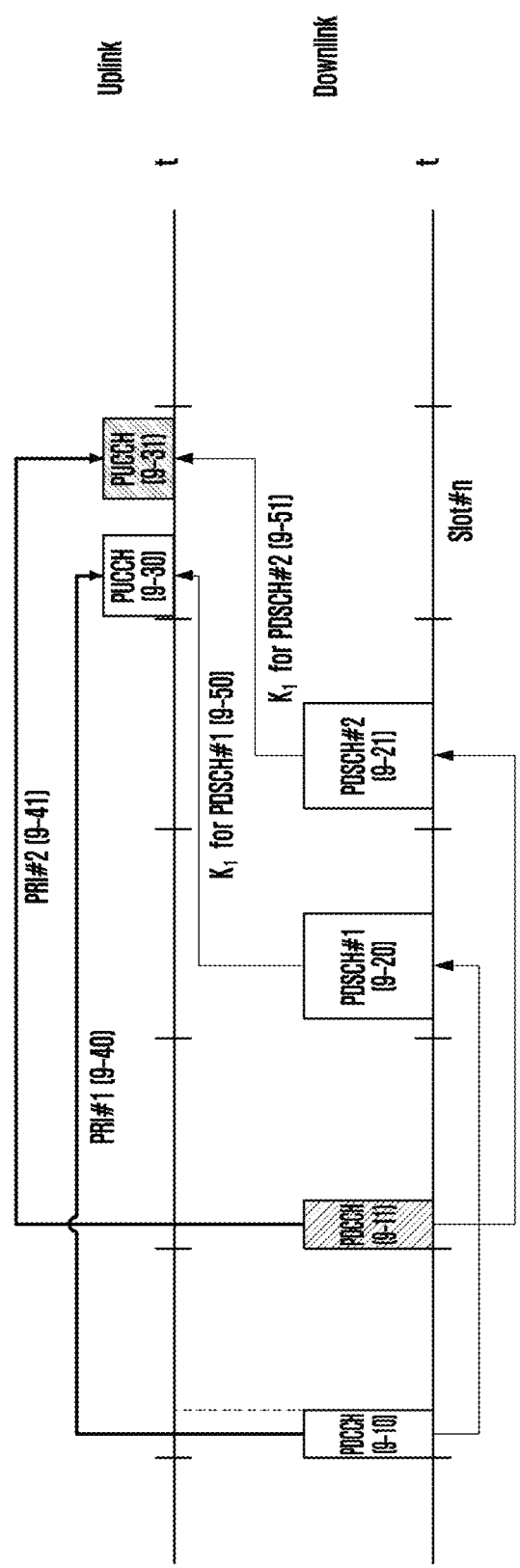
FIG. 9 is a diagram illustrating a case in which multiple PUCCH resources for HARQ-ACK transmission on a PDSCH overlap if multi-slot repetition is not configured, according to an embodiment of the disclosure.

A case corresponding to case 1-1 is shown in FIG. 9.

FIG. 9 is a diagram illustrating a case in which multiple PUCCH resources for HARQ-ACK transmission on a PDSCH overlap if multi-slot repetition is not configured, according to an embodiment of the present disclosure.

Referring to FIG. 9, for two or more different PDCCHs 9-10 and 9-11 for scheduling of a PDSCH, if transmission slots of PUCCH resources corresponding to the respective PDCCHs are the same, the PUCCH resources may be considered overlap with each other. That is, if uplink slots corresponding to $K_1$ values 9-50 and 9-51 indicated by multiple PDCCHs are the same, the PUCCH resources corresponding to the PDCCHs may be considered to overlap each other.

In this case, between the PUCCH resources indicated by PRIs 9-40 and 9-41 in the PDCCHs, only a PUCCH resource 9-31 selected based on the PRI 9-41 corresponding to the PDCCH 9-11 transmitted at a last point is selected, and HARQ-ACK information is transmitted via the PUCCH resource. Therefore, both HARQ-ACK information for a PDSCH 9-21 and HARQ-ACK information for another PUCCH 9-30 overlapping with the PUCCH resource 9-31 are encoded by a predefined HARQ-ACK codebook and then transmitted via the selected PUCCH resource 9-31.

Next, a case corresponding to case 1-2, in which the PUCCH resource for HARQ-ACK transmission and the PUCCH resource for SR and/or CSI transmission overlap, or a case in which multiple PUCCH resources for SR and/or CSI transmission overlap is described. In the above case, when multiple PUCCH resources transmitted in the same slot overlap by one or more symbols in the time axis, it is defined that the corresponding PUCCH resources overlap, and whether to multiplex UCI within these resources may be summarized as shown in [Table 27] below.

TABLE 27

| PUCCH 1 / PUCCH 2 | SR | HARQ-ARK | CSI |
|---|---|---|---|
| SR | — | Case 1-2-1 (Multiplex or not depending on PUCCH format) | Always multiplex |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to the above table, when the PUCCH resources in which HARQ-ACK is transmitted overlap, or when the PUCCHs on which SR and CSI are transmitted overlap, UCI thereof is always multiplexed.

When respective PUCCH resources in which SR and HARQ-ACK are transmitted overlap, that is, in a case of case 1-2-1, whether UCI multiplexing is performed according to formats of the PUCCH resources is divided as follows:

SR on PUCCH format 0+HARQ-ACK on PUCCH format 1: SR is dropped and only HARQ-ACK is transmitted; and Remaining cases: Both SR and HARQ-ACK are multiplexed.

In addition, in the remaining cases corresponding to case 1-2-2, that is, when the PUCCH resources in which HARQ-ACK and CSI are transmitted overlap, or when multiple PUCCH resources in which CSI is transmitted overlap, whether to multiplex UCI thereof may follow a higher layer configuration. In addition, whether to multiplex between HARQ-ACK and CSI and whether to multiplex between multiple CSIs may be independently configured.

For example, whether to multiplex between HARQ-ACK and CSI may be configured via parameter simultaneousH- ARQ-ACK-CSI for each PUCCH format 2, 3, or 4, and corresponding parameters may all be configured to the same value for the PUCCH formats. If it is configured not to perform multiplexing via the above parameter, only HARQ-ACK is transmitted and overlapped CSI may be dropped. In addition, whether to multiplex between multiple CSIs may be configured via parameter multi-CSI-PUCCH-ResourceList in PUCCH-Config. That is, when parameter multi-CSI-PUCCH-ResourceList is configured, multiplexing between CSI may be performed, otherwise, only a PUCCH corresponding to CSI having a high priority may be transmitted according to priorities between CSI.

When UCI multiplexing is performed as described above, a method of selecting a PUCCH resource for transmission of a corresponding UCI resource and a multiplexing method may differ according to information of overlapped UCI and a format of a PUCCH resource, which may be summarized as shown in [Table 28] below.

TABLE 28

| | SR | HARQ-ACK | | CSI |
|---|---|---|---|---|
| PUCCH 1<br>PUCCH 2 | (format 0/1) | Format 1 | Format 0/2/3/4 | (format 2/3/4) |
| SR (format 0/1) | — | Option 1 | Option 2 | Option 3 |
| HARQ-ACK | Format 1 | Option 1 | Option 4 | Option 4 | Option 5 (grant-based) Option 6 (SPS) |
| | Format 0/2/3/4 | Option 2 | Option 4 | Option 4 | Option 5 (grant-based) Option 6 (SPS) |
| CSI (format 2/3/4) | Option 3 | Option 5 (grant-based) Option 6 (SPS) | Option 5 (grant-based) Option 6 (SPS) | Option 7 |

Each option in the above table is as follows:
Option 1: The terminal selects a PUCCH resource differently according to an SR value of an SR PUCCH resource overlapping an HARQ-ACK PUCCH resource. That is, if the SR value is positive, a PUCCH resource for SR is selected, and if the SR value is negative, a PUCCH resource for HARQ-ACK is selected. HARQ-ACK information is transmitted in the selected PUCCH resource;
Option 2: The terminal multiplexes HARQ-ACK information and SR information in a PUCCH resource for HARQ-ACK transmission so as to transmit the same;
Option 3: The terminal multiplexes SR information and CSI in a PUCCH resource for CSI transmission so as to transmit the same;
Option 4: PUCCH resource transmission for overlapping between HARQ-ACK—detailed operations are described in case 1-1;
Option 5: If a PUCCH resource for HARQ-ACK corresponding to a PDSCH scheduled by the PDCCH and a PUCCH resource for CSI transmission overlap, and if multiplexing between HARQ-ACK and CSI is configured via a higher layer, the terminal multiplexes HARQ-ACK information and CSI information in a PUCCH resource for HARQ-ACK so as to transmit the same;
Option 6: If a PUCCH resource for HARQ-ACK corresponding to a semi-persistent scheduling (SPS) PDSCH and a PUCCH resource for CSI transmission overlap, and multiplexing between HARQ-ACK and CSI is configured via higher layer, the terminal multiplexes HARQ-ACK information and CSI information in a PUCCH resource for CSI transmission so as to transmit the same; and
Option 7: If PUCCH resources for transmission of multiple pieces of CSI overlap and multiplexing between multiple pieces of CSI is configured via a higher layer, the terminal selects one resource having a lowest index, which enables transmission of all multiplexed UCI payloads, in a PUCCH resource list for CSI multiplexing configured via the higher layer, that is, multi-CSI-PUCCH-ResourceList, and then transmits the UCI payload. If there is no resource enabling transmission of all the multiplexed UCI payloads in the list, the terminal selects a resource having a largest index and then transmits as many transmittable CSI reports as possible in the resource.

If a PUCCH resource list for multiplexing via a higher layer, that is, multi-CSI-PUCCH-ResourceList is configured, the terminal selects one resource having a lowest index, which enables transmission of all multiplexed UCI payloads, from among resources in the list, and then transmits the UCI payloads. If there is no resource enabling transmission of all the multiplexed UCI payloads in the list, the terminal selects a resource having a largest index and then transmits HARQ-ACK and as many transmittable CSI reports as possible in the resource.

In the above, for convenience of description, the focus has dealt with the case in which two PUCCH resources overlap, but the method may be similarly applied even when three or more PUCCH resources overlap. For example, if a PUCCH resource in which SR+HARQ-ACK is multiplexed and a CSI PUCCH resource overlap, the method of multiplexing between HARQ-ACK and CSI may be followed.

If it is configured not to perform multiplexing between specific UCI, UCI with a high priority may be transmitted according to the priority in the order of HARQ-ACK>SR>CSI, and UCI with a lower priority may be dropped. If it is configured not to perform multiplexing when multiple CSI PUCCH resources overlap, a PUCCH corresponding to CSI with a high priority is transmitted, and a PUCCH corresponding to the other CSI may be dropped.

Next, if case 2 that is a case in which multi-slot repetition is configured, case 2 is divided into a case (case 2-1) in which two or more PUCCH resources for HARQ-ACK transmission are located in the same start slot, and the other case (case 2-2). Each case is shown in FIG. 10.

Figure 10:
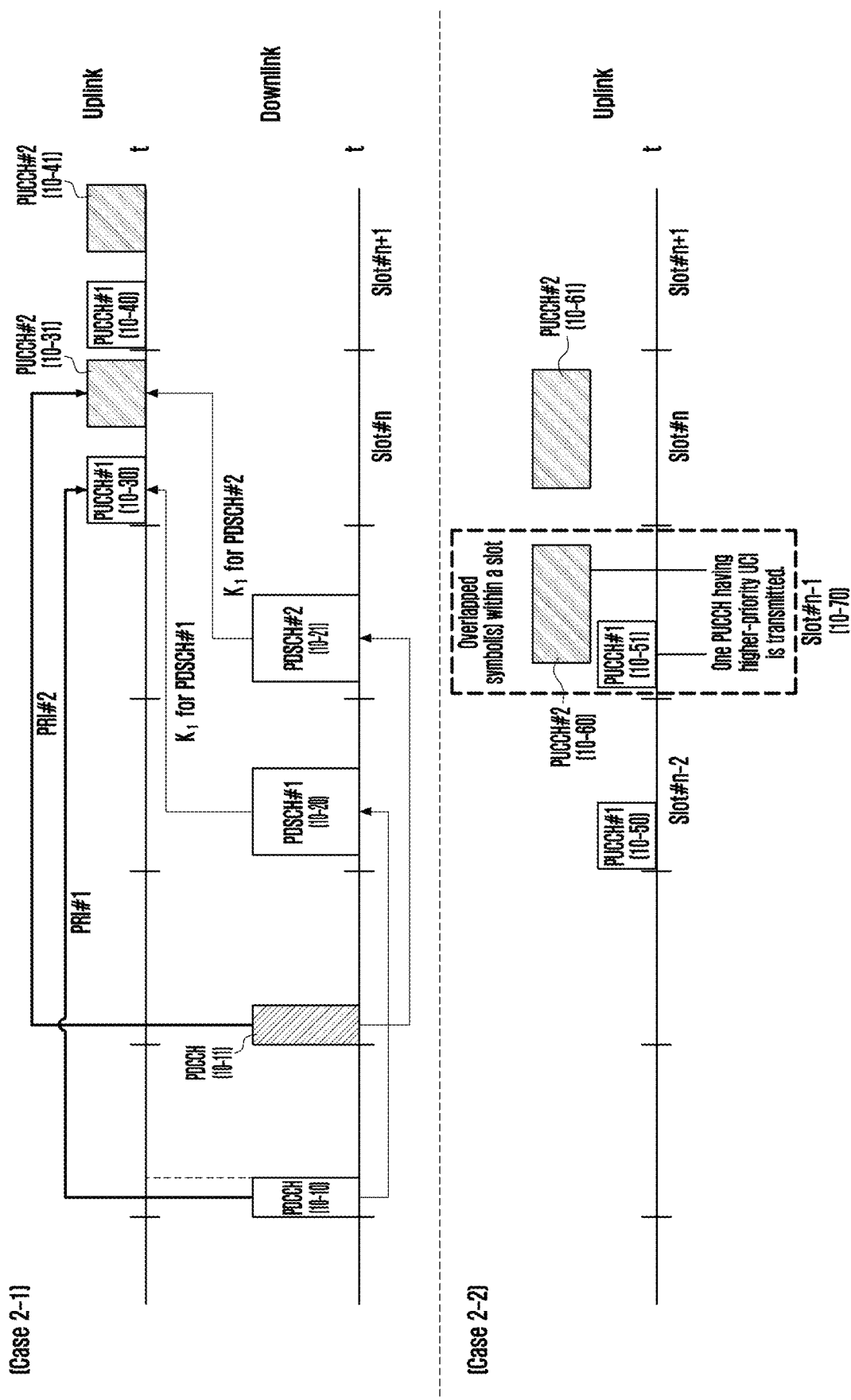
FIG. 10 is a diagram illustrating a case in which PUCCH resources overlap if multi-slot repetition is configured, according to an embodiment of the present disclosure.

FIG. 10 is a diagram illustrating a case in which PUCCH resources overlap if multi-slot repetition is configured, according to an embodiment of the present disclosure.

Referring to case 2-1, if multi-slot repetition is configured in a PUCCH resource for HARQ-ACK, PUCCH #1 is repeatedly transmitted over multiple slots 10-30 and 10-40 and PUCCH #2 is also repeatedly transmitted over multiple slots 10-31 and 10-41. In this case, if start slots of the two PUCCHs indicated by K1 are the same, a single PUCCH resource (a PUCCH transmitted at a latest time in one slot), that is, PUCCH #2, may be selected in the same manner as in case 1-1. Accordingly, HARQ-ACK information corresponding to both PDSCH #1 and PDSCH #2 is multiplexed via an HARQ-ACK codebook and transmitted in the corresponding PUCCH.

For convenience of description, a case in which multiple PUCCHs subjected to multi-slot repetition overlap is exemplified, but the same method may be applied when a PUCCH subjected to multi-slot repetition and a PUCCH transmitted in a single slot overlap.

Case 2-2 corresponds to a case in which a symbol unit overlap occurs between a PUCCH for HARQ-ACK transmission and a PUCCH for SR or CSI transmission, or between PUCCHs for multiple SR or CSI transmissions. That is, case 2-2 corresponds to a case in which, when PUCCH #1 is repeatedly transmitted over multiple slots 10-50 and 10-51 and PUCCH #2 is also repeatedly transmitted over multiple slots 10-60 and 10-61, PUCCH #1 and PUCCH #2 overlap by one or more symbols in one slot 10-70.

Between the PUCCHs in which overlap has occurred by one or more symbols in the slot 10-70, priorities between UCI in the PUCCHs are compared, and therefore UCI with a higher priority is transmitted, and the other UCI is dropped in the corresponding slot. In this case, the priorities between the UCI follows HARQ-ACK>SR>CSI in a descending order.

If multiple CSI PUCCH resources overlap, a PUCCH corresponding to CSI with a high priority may be transmitted, and a PUCCH corresponding to other CSI may be dropped in the corresponding slot. The aforementioned PUCCH transmission or drop according to priority is performed only in a slot where overlap in units of symbols has occurred, and is not performed in other slots. That is, a PUCCH in which multi-slot repetition is configured may be dropped in the slot where overlap in units of symbols has occurred, but may be transmitted as configured in the remaining slots.

In the above case, for convenience of description, a case in which multiple PUCCHs subjected to multi-slot repetition overlap is exemplified, but the same method may also be applied when a PUCCH subjected to multi-slot repetition and a PUCCH transmitted in a single slot overlap.

Overlap between PUCCH and PUSCH transmissions is described. If, during $N_{PUCCH}^{repeat}>1$ repeated transmissions, the terminal transmits a PUCCH in a first slot and transmits a PUSCH in a second slot, if PUCCH transmission overlaps PUSCH transmission in one or multiple slots, and if UCI in the PUSCH is multiplexed in overlapped slots, the terminal transmits the PUCCH and does not transmit the PUSCH in slots in which the PUCCH and the PUSCH overlap.

In single slot transmission and multi-slot repetition of the PUCCH, the described slot may be replaced with a mini-slot so as to be used for a low-latency service, such as URLLC.

A mini-slot has a shorter length on the time axis compared to a slot, and one mini-slot may include fewer than 14 symbols. For example, 2 or 7 symbols may constitute one mini-slot. When a mini-slot is configured via a higher layer or the like, units, such as the HARQ-ACK feedback timing K1 value and the number of repeated transmissions, may be replaced with units of mini-slots in an existing slot. Mini-slot configuration may be applied to all PUCCH transmissions or may be limited to PUCCH transmission for a specific service. For example, transmission in units of slots may be applied to a PUCCH for an eMBB service, whereas transmission in units of mini-slots may be applied to a PUCCH for a URLLC service.

Next, beam configuration to be applied to PUCCH transmission is described. If the terminal does not have a terminal-specific configuration for a PUCCH resource configuration (dedicated PUCCH resource configuration), a PUCCH resource set is provided via pucch-ResourceCommon which is higher signaling, wherein the beam configuration for PUCCH transmission conforms to a beam configuration used in PUSCH transmission scheduled via a random access response (RAR) UL grant.

If the terminal has a terminal-specific configuration for a PUCCH resource configuration (dedicated PUCCH resource configuration), the beam configuration for PUCCH transmission is provided via pucch-spatialRelationInfoId, which is higher level signaling shown in [Table 29]. If the terminal is configured with one pucch-spatialRelationInfoId, the beam configuration for PUCCH transmission of the terminal is provided via one pucch-spatialRelationInfoId. If the terminal is configured with multiple pucch-spatialRelationInfoID, the terminal is indicated to activate one of the multiple pucch-spatialRelationInfoID via a MAC control element (CE). The terminal may be configured with up to eight pucch-spatialRelationInfoID via higher signaling, and may be indicated to activate only one pucch-spatialRelationInfoID therefrom.

If the terminal is indicated to activate any pucch-spatialRelationInfoID via the MAC CE, the terminal applies activation of pucch-spatialRelationInfoID via the MAC CE from a slot that appears first after $3N_{slot}^{subframe,\mu}$ slots from a slot for HARQ-ACK transmission on a PDSCH that transmits the MAC CE including activation information for pucch-spatialRelationInfoID. In the above, µ is a neurology applied to PUCCH transmission, and $N_{slot}^{subframe,\mu}$ refers to the number of slots per subframe in a given neurology. A higher layer configuration for pucch-spatialRelationInfo may be as shown in [Table 29] below. pucch-spatialRelationInfo may be interchangeably used with PUCCH beam information.

TABLE 29

| | |
|---|---|
| PUCCH-SpatialRelationInfo ::= | SEQUENCE { |
| pucch-SpatialRelationInfoId | PUCCH-SpatialRelationInfoId, |
| servingCellId | ServCellIndex        OPTIONAL,   -- |
| Need S | |
| referenceSignal | CHOICE { |
| ssb-Index | SSB-Index, |
| csi-RS-Index | NZP-CSI-RS-ResourceId, |
| srs | SEQUENCE { |
| | resource |
| SRS-ResourceId, | |
| | uplinkBWP      BWP-Id |
| | } |

TABLE 29-continued

```
},
    pucch-PathlossReferenceRS-Id       PUCCH-PathlossReferenceRS-Id,
    p0-PUCCH-Id                        P0-PUCCH-Id,
    closedLoopIndex                    ENUMERATED { i0, i1 }
}
PUCCH-SpatialRelationInfoId ::=        INTEGER (1..maxNrofSpatialRelationInfos)
```

According to [Table 29], one referenceSignal configuration may exist in a specific pucch-spatialRelationInfo configuration, and the referenceSignal may be ssb-Index indicating a specific SS/PBCH, may be csi-RS-Index indicating a specific CSI-RS, or may be srs indicating a specific SRS.

If referenceSignal is configured with ssb-Index, the terminal may configure, as a beam for PUCCH transmission, a beam used when receiving an SS/PBCH corresponding to ssb-Index among SS/PBCHs in the same serving cell, or if servingCellId is provided, a beam used when receiving an SS/PBCH corresponding to ssb-Index among SS/PBCHs in a cell indicated by servingCellId may be configured as the beam for PUCCH transmission.

If the referenceSignal is configured with csi-RS-Index, the terminal may configure, as a beam for PUCCH transmission, a beam used when receiving a CSI-RS corresponding to csi-RS-Index among CSI-RSs in the same serving cell, or if servingCellId is provided, a beam used when receiving a CSI-RS corresponding to csi-RS-Index among CSI-RSs in a cell indicated by servingCellId may be configured as the beam for PUCCH transmission.

If the referenceSignal is configured with srs, the terminal may configure, as a beam for PUCCH transmission, a transmission beam used when transmitting an SRS corresponding to a resource index provided via a higher signaling resource in the same serving cell and/or in an activated uplink BWP, or if servingCellID and/or uplinkBWP are/is provided, a transmission beam used when transmitting an SRS corresponding to a resource index provided via a higher signaling resource in a cell indicated by servingCellID and/or uplinkBWP and/or in the uplink BWP may be configured as a beam for PUCCH transmission.

One pucch-PathlossReferenceRS-Id configuration may exist in a specific pucch-spatialRelationInfo configuration. PUCCH-PathlossReferenceRS of [Table 30] man be mapped with pucch-PathlossReferenceRS-Id of [Table 29], and up to 4 configurations are possible via pathlossReferenceRSs in higher signaling of PUCCH-PowerControl of [Table 30]. PUCCH-PathlossReferenceRS is configured with ssb-Index if connected to an SS/PBCH via referenceSignal of [Table 30], and is configured with csi-RS-Index if connected to a CSI-RS.

TABLE 30

```
PUCCH-PowerControl ::=                        SEQUENCE {
    deltaF-PUCCH-f0                           INTEGER (-16..15)  OPTIONAL, -- Need R
    deltaF-PUCCH-f1                           INTEGER (-16..15)  OPTIONAL, -- Need R
    deltaF-PUCCH-f2                           INTEGER (-16..15)  OPTIONAL, -- Need R
    deltaF-PUCCH-f3                           INTEGER (-16..15)  OPTIONAL, -- Need R
    deltaF-PUCCH-f4                           INTEGER (-16..15)  OPTIONAL, -- Need R
    p0-Set                                    SEQUENCE (SIZE (1..maxNrofPUCCH-P0-PerSet)) OF
P0-PUCCH OPTIONAL, -- Need M
    pathlossReferenceRSs                                                       SEQUENCE (SIZE
(1..maxNrofPUCCH-PathlossReferenceRSs)) OF PUCCH-PathlossReferenceRS  OPTIONAL, --
Need M
    twoPUCCH-PC-AdjustmentStates              ENUMERATED {twoStates}          OPTIONAL, -- Need
S
    ...
}
P0-PUCCH ::=                                  SEQUENCE {
    p0-PUCCH-Id                               P0-PUCCH-Id,
    p0-PUCCH-Value                            INTEGER (-16..15)
}
P0-PUCCH-Id ::=                               INTEGER (1..8)
PUCCH-PathlossReferenceRS ::=                 SEQUENCE {
    pucch-PathlossReferenceRS-Id              PUCCH-PathlossReferenceRS-Id,
    referenceSignal                           CHOICE {
        ssb-Index                                 SSB-Index,
        csi-RS-Index                              NZP-CSI-RS-ResourceId
    }
}
```

During uplink transmission of the terminal, when a transmit OFF state is switched to a transmit ON state, a transition time may be required to satisfy a transmit power requirement condition of the ON state. In addition, when the transmit ON state is switched to the transmit OFF state, a transition time may be required to satisfy a transmit power requirement condition of the OFF state. Alternatively, a transient time may be required even when a transmission power change, a transmission RB change, or hopping occurs in the transmit ON state.

In LTE and NR, when connected to a serving base station, the terminal may perform a procedure of reporting UE capability of the terminal, which is supported thereby, to the base station. Hereinafter, this is referred to as UE capability (report). The base station may transfer, to the connected terminal, a message (e.g., UE capability enquiry message) for requesting a UE capability report. The message may include a UE capability report request for each radio access technology (RAT) type of the base station. The UE capability report request for each RAT type may include frequency band information for requesting UE capability of the terminal.

The RAT type may include, for example, nr, eutra-nr, and eutra. The base station may make a request, including information indicating at least one of the nr, eutra-nr, and eutra, for a UE capability report of the terminal with respect to the included information. The terminal may report, to the base station, UE capability including information indicating at least one of the nr, eutra-nr, and eutra with respect to an RAT type supportable by the terminal.

For example, if the RAT type included in the UE capability enquiry indicates nr, the terminal supporting NR-based wireless communication may report UE capability by adding the RAT type indicating nr to the message for reporting UE capability (e.g., a UE capability information message).

As another example, if the RAT type included in the UE capability enquiry message indicates eutra-nr, the terminal supporting (NG) E-UTRA NR dual connectivity (EN-DC) (covering E-UTRA connected to EPC or 5GC) or NR E-UTRA dual connectivity (NE-DC) may report UE capability by adding the RAT type indicating eutra-nr to a message (e.g., a UE capability information message) for reporting UE capability.

The UE capability enquiry message may request a UE capability report for multiple RAT types via a single RRC message container. Alternatively, the base station may include a UE capability enquiry message, which includes a UE capability report request for each RAT type, multiple times in one RRC message so as to transmit the same to the terminal. For example, the terminal having received the RRC message including multiple UE capability enquiry messages may configure a UE capability information message corresponding to each UE capability report request so as to report (transmit) the same to the base station.

In the next-generation mobile communication system, a UE capability request for multi-radio dual connectivity (MR-DC) including NR, LTE, and E-UTRA-NR dual connectivity (EN-DC) may be made. The UE capability enquiry message is generally transmitted initially after the terminal establishes a connection, but may be requested by the base station when necessary, based on arbitrary conditions.

The terminal which has been requested, by the base station, to report UE capability (or the terminal having received the UE capability enquiry message) may configure UE capability according to RAT type and band information requested by the base station. Hereinafter, a method of configuring UE capability by the terminal in the NR system is described.

In one example of Step 1, if the terminal receives, from the base station, a list of at least one band among LTE and NR via the UE capability report request, the terminal may configure a band combination (BC) for an NR stand-alone (SA) and EN-DC. For example, the terminal may configure a candidate list of BC for NR SA and EN-DC, based on the bands, for which a UE capability report has been requested, via list information (e.g., FreqBandList) included in the UE capability enquiry message received from the base station. The bands have priorities in the order described in FreqBandList.

In one example of Step 2, if the base station sets an "eutra-nr-only" flag or an "eutra" flag within the UE capability enquiry message so as to request a UE capability report, the terminal may remove BC for NR SA BCs from the BC candidate list configured in step 1. Alternatively, this may be performed only when the LTE base station (eNB) requests "eutra" capability.

In one example of Step 3, the terminal may remove fallback BCs from the BC candidate list configured in step 1. Here, a fallback BC may refer to a BC in which a band corresponding to at least one secondary cell (SCell) has been removed from a certain super set BC. The super set BC is already able to cover the fallback BC, and thus the fallback BC can be omitted. Step 3 may also be applied in multi-RAT dual connectivity (MR-DC). For example, application may also be available for LTE bands. BCs remaining after step 3 may be referred to as "final candidate BC list."

In one example of Step 4, in order to select BCs to be reported, the terminal may select BCs conforming to a requested RAT type from the "final candidate BC list." In step 4, the terminal may configure a list (e.g., supportedBandCombinationList) sequentially including the BCs selected by the terminal. For example, the terminal may configure BCs and UE capability to be reported according to a preconfigured RAT-Type order, for example, in the order of nr→eutra-nr→eutra.

In steps 1 to 4, the terminal may configure featureSetCombination for each BC included in configured supportedBandCombinationList, and may configure a list (e.g., featureSetCombinations) including each featureSetCombination. In this case, featureSetCombination may refer to a set of feature sets for each band within the selected BC, and the feature set may refer to a set of capabilities supported by the terminal in carriers within a specific band.

The terminal may compare each BC and a feature set combination for each BC with respect to the supportedBandCombinationList. A specific BC, e.g., BC #X, includes all bands of a BC to be compared, e.g., BC #Y, and if a feature set combination of BC #X is configured with the same or higher level of capability compared to a feature set combination of BC #Y, BC #Y may be defined to be a fallback BC of BC #X. After discovering all fallback BCs in the band combination list according to the aforementioned comparison, a new BC list from which all the fallback BCs have been removed may be configured, and a list of "candidate feature set combinations" for each of the BCs may be configured. The "candidate feature set combinations" may include feature set combinations for both NR and EUTRA-NR BC, and may be configured based on feature set combinations of UE-NR-Capabilities and UE-MRDC-Capabilities containers.

In one example of Step 5, if the RAT Type requested from the base station is eutra-nr, featureSetCombinations may be included in two containers of UE-MRDC-Capabilities and UE-NR-Capabilities. However, the feature set of NR may include only UE-NR-Capabilities.

The aforementioned steps are merely examples and are not limited thereto. Accordingly, according to an embodiment of the disclosure, some steps may be omitted or other steps may be added.

After UE capability is configured, the terminal may transmit a UE capability information message including the UE capability to the base station. The base station may perform scheduling and transmission/reception management for the terminal, based on the UE capability information received from the terminal.

Figure 11:
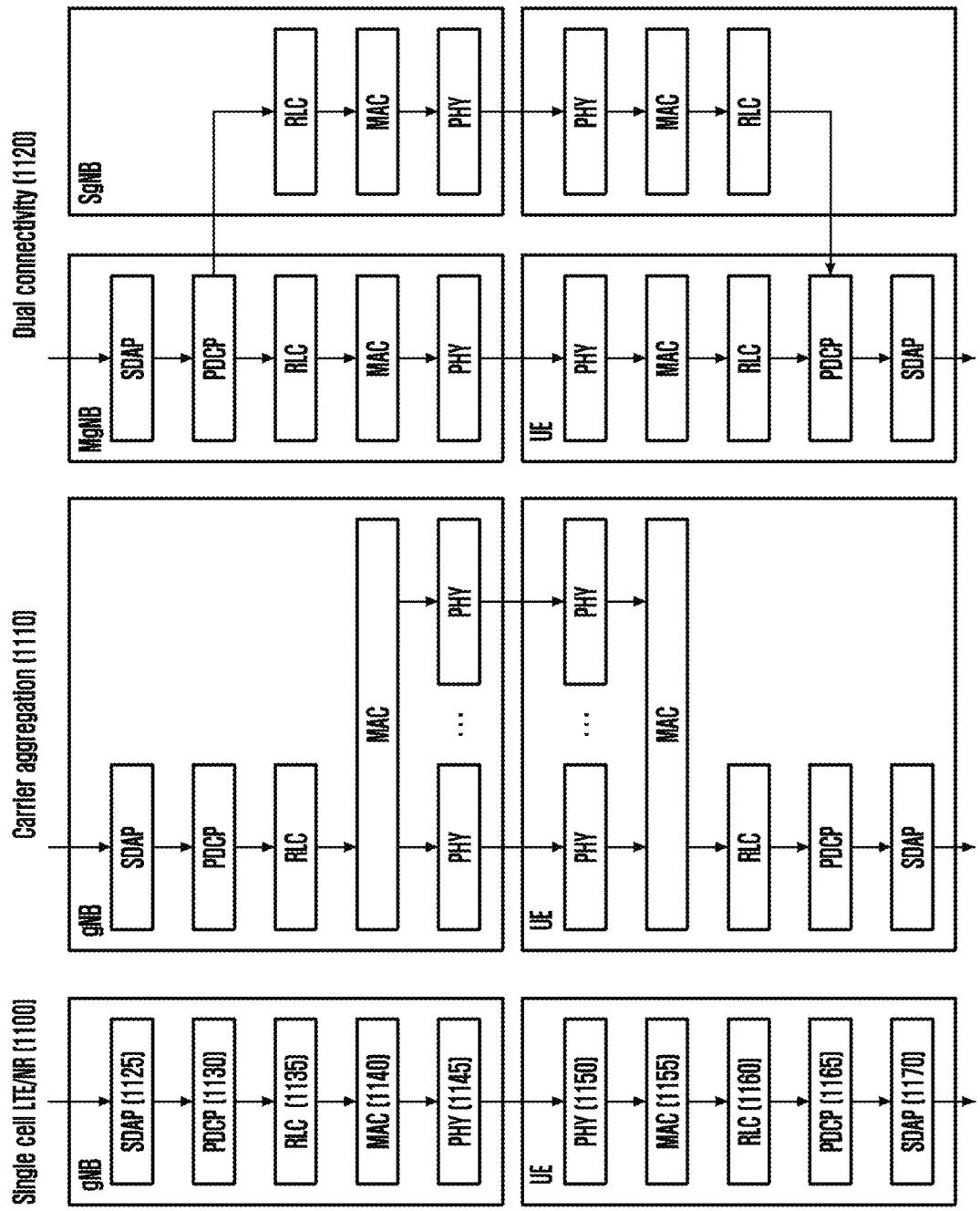
FIG. 11 is a diagram illustrating radio protocol structures of a terminal and a base station in single cell, carrier aggregation, and dual connectivity situations, according to an embodiment of the present disclosure.

FIG. 11 is a diagram illustrating radio protocol structures of a terminal and a base station in single cell, carrier aggregation, and dual connectivity situations, according to an embodiment of the present disclosure.

Referring to FIG. 11, radio protocols of the next-generation mobile communication system may include NR service data adaptation protocols (NR SDAPs) 1125 and 1170, NR packet data convergence protocols (NR PDCPs) 1130 and

1165, NR radio link controls (NR RLCs) 1135 and 1160, and NR medium access controls (NR MACs) 1140 and 1155 at both a terminal and an NR base station 1100, respectively.

Main functions of the NR SDAPs 1125 and 1170 may include some of the following functions:

User data transfer function (transfer of user plane data);
  Function of mapping a QoS flow and a data bearer for an uplink and a downlink (mapping between a QoS flow and a DRB for both DL and UL);
  Function of marking a QoS flow ID in an uplink and a downlink (marking QoS flow ID in both DL and UL packets); and/or
  Function of mapping a reflective QoS flow to a data bearer for uplink SDAP PDUs (reflective QoS flow to DRB mapping for the UL SDAP PDUs).

With respect to an SDAP layer device, the terminal may be configured, via an RRC message, whether to use a header of the SDAP layer device or whether to use a function of the SDAP layer device for each PDCP layer device, for each bearer, or for each logical channel, and if the SDAP header is configured, a NAS QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in an uplink and a downlink. The SDAP header may include QoS flow ID information indicating QoS. The QoS information may be used as a data processing priority, scheduling information, etc. to support a smooth service.

Main functions of the NR SDAPs 1130 and 1165 may include some of the following functions:

Header compression and decompression function (header compression and decompression: ROHC only);
  User data transmission function (transfer of user data);
  In-sequence delivery function (in-sequence delivery of upper layer PDUs);
  Out-of-sequence delivery function (out-of-sequence delivery of upper layer PDUs);
  Reordering function (PDCP PDU reordering for reception);
  Duplicate detection function (duplicate detection of lower layer SDUs);
  Retransmission function (retransmission of PDCP SDUs);
  Encryption and decryption function (ciphering and deciphering); and/or
  Timer-based SDU delete function (timer-based SDU discard in uplink).

In the above, the reordering function of an NR PDCP device refers to a function of rearranging PDCP PDUs, which are received in a lower layer, in order based on PDCP sequence numbers (SN), wherein the reordering function may include a function of delivering data to a higher layer in the rearranged order or may include a function of directly delivering data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR SDAPs 1135 and 1160 may include some of the following functions:

Data transmission function (transfer of upper layer PDUs);
  In-sequence delivery function (in-sequence delivery of upper layer PDUs);
  Out-of-sequence delivery function (out-of-sequence delivery of upper layer PDUs);
  ARQ function (error correction through ARQ);
  Concatenation, segmentation, and reassembly function (concatenation, segmentation and reassembly of RLC SDUs);
  Re-segmentation function (re-segmentation of RLC data PDUs);
  Reordering function (reordering of RLC data PDUs);
  Duplicate detection function (duplicate detection);
  Error detection function (protocol error detection);
  RLC SDU discard function (RLC SDU discard); and/or
  RLC re-establishment function (RLC re-establishment).

In the above, the in-sequence delivery function of an NR RLC device refers to a function of delivering RLC SDUs, which are received from a lower layer, to a higher layer in order, wherein the in-sequence delivery function may include a function of, when originally one RLC SDU is divided into multiple RLC SDUs and then received, reassembling the divided RLC SDUs and delivering the same, may include a function of rearranging the received RLC PDUs on the basis of RLC sequence numbers (SNs) or PDCP sequence numbers (SNs), may include a function of rearranging the order and recording lost RLC PDUs, may include a function of reporting states of the lost RLC PDUs to a transmission side, may include a function of requesting to retransmit the lost RLC PDUs, and may include a function of, when there are lost RLC SDUs, delivering only RLC SDUs before the lost RLC SDUs to a higher layer in order.

Alternatively, the in-sequence delivery function may include a function of, although there is a lost RLC SDU, if a predetermined timer has expired, delivering all RLC SDUs received before starting of the timer to a higher layer in order, or may include a function of, although there is a lost RLC SDU, if a predetermined timer has expired, delivering all RLC SDUs received up to the present time to a higher layer in order. The RLC PDUs may be processed in the order of reception thereof (in order of arrival regardless of the order of the sequence numbers or serial numbers) and may be delivered to the PDCP device regardless of the order (out-of-sequence delivery). In a case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replace with a multiplexing function of the NR MAC layer.

In the above, the out-of-sequence delivery function of the NR RLC device refers to a function of delivering RLC PDUs received from a lower layer to an immediate higher layer in any order, may include a function of, when originally one RLC SDU is divided into multiple RLC SDUs and then received, reassembling the divided RLC SDUs and delivering the same, and may include a function of storing RLC SNs or PDCP SNs of the received RLC PDUs, arranging the order thereof, and recording lost RLC PDUs.

The NR MAC 1140 or 1155 may be connected to multiple NR RLC layer devices included in one terminal, and main functions of the NR MAC may include some of the following functions:

Mapping function (mapping between logical channels and transport channels);
  Multiplexing and demultiplexing function (multiplexing/demultiplexing of MAC SDUs);
  Scheduling information reporting function (scheduling information reporting);
  HARQ function (error correction through HARQ);
  Function of priority handling between logical channels (priority handling between logical channels of one UE);

Function of priority handling between terminals (priority handling between UEs by means of dynamic scheduling);

MBMS service identification function (MBMS service identification);

Transmission format selection function (transport format selection); and

Padding function (padding).

NR PHY layers 1145 and 1150 may perform channel coding and modulation of higher layer data, make the channel coded and modulated higher layer data into OFDM symbols, and transmit the OFDM symbols via a radio channel, or may perform demodulation and channel-decoding of the OFDM symbols received through the radio channel so as to transfer the same to the higher layer.

The detailed structure of the radio protocol structure may be variously changed according to a carrier (or cell) operating method. For example, when the base station transmits, based on a single carrier (or cell), data to the terminal, the base station and the terminal use a protocol structure having a single structure for each layer, as in reference numeral 1100. On the other hand, when the base station transmits data to the terminal, based on carrier aggregation (CA) using multiple carriers in a single TRP, the base station and the terminal use a protocol structure in which up to the RLC layer has a single structure but the PHY layer is multiplexed via the MAC layer, as in 1110. As another example, when the base station transmits data to the terminal, based on dual connectivity (DC) using multiple carriers in multiple TRPs, the base station and the terminal use a protocol structure in which up to the RLC has a single structure but the PHY layer is multiplexed via the MAC layer, as in 1120.

Referring to the aforementioned PUCCH-related descriptions, in current Rel-15 NR, PUCCH transmission is focused on transmission toward a single cell, a single transmission point, a single panel, a single beam, and/or a single transmission direction. In the following description of the disclosure, for convenience of description, a cell, a transmission point, a panel, a beam, a transmission direction, or/and the like, which are distinguishable via higher layer/L1 parameters, such as TCI state or spatial relation information, or indicators, such as a cell ID, a TRP ID, and a panel ID, are described as a transmission reception point (TRP) in a unified manner. Therefore, the TRP can be appropriately replaced by one of the above terms.

In general, since a PUCCH resource used during PUCCH transmission is 1 and only one PUCCH-spatialRelationInfo may be activated for one PUCCH resource, the terminal may maintain an indicated transmission beam during the PUCCH transmission. If the PUCCH is repeatedly transmitted over multiple slots or multiple mini-slots, a transmission beam according to one indicated PUCCH-spatialRelationInfo needs to be maintained throughout the repeated transmission.

If PUCCH transmission for multiple TRPs is supported, the PUCCH may be repeatedly transmitted for each TRP. In this case, the terminal may need to support configuration for the PUCCH transmission to multiple TRPs.

For example, multiple beam directions may be indicated for transmission to multiple TRPs on one PUCCH, or multiple PUCCHs including the same UCI may be transmitted to different TRPs respectively, and different beam directions for these PUCCHs need to be indicated. In the disclosure, by providing various PUCCH resource configuration methods in consideration of the aforementioned cases, a transmission delay time of uplink control information is minimized and high reliability is achieved at the same time.

Detailed PUCCH resource configuration methods will be described specifically in the following embodiments.

Hereinafter, an embodiment of the disclosure is described in detail with the accompanying drawings. In addition, in describing the disclosure, when it is determined that a detailed description of a related function or configuration may unnecessarily obscure the subject matter of the disclosure, the detailed description thereof will be omitted. Terms to be described hereinafter are terms defined in consideration of functions in the disclosure, and may vary depending on intention or usage of users or operators. Therefore, the definition may be based on contents throughout the specification.

Hereinafter, a base station is a subject that performs resource allocation to a terminal, and may be at least one of a gNode B, a gNB, an eNode B, a Node B, a base station (BS), a radio access unit, a base station controller, or a node on a network. A terminal may include a user equipment (UE), a mobile station (MS), a cellular phone, a smart phone, a computer, or a multimedia system capable of performing a communication function. In addition, an embodiment of the disclosure will be described below using an NR or LTE/LTE-A system as an example, but an embodiment of the disclosure may be applied to other communication systems having a similar technical background or channel type. The embodiments of the disclosure may be applied to other communication systems via some modifications without significantly departing from the scope of the disclosure, as determined by a person having skilled technical knowledge.

The content of the disclosure is applicable in FDD and TDD systems.

Hereinafter, in the disclosure, higher signaling (or higher layer signaling) is a method of transferring a signal from a base station to a terminal by using a physical layer downlink data channel or transferring a signal from a terminal to a base station by using a physical layer uplink data channel, and may be referred to as RRC signaling, PDCP signaling, or a medium access control (MAC) control element (MAC CE).

Hereinafter, in the disclosure, in determining whether to apply cooperative communication, it is possible for a terminal to use various methods, in which PDCCH(s) assigning a PDSCH to which cooperative communication is applied has a specific format, PDCCH(s) assigning a PDSCH to which cooperative communication is applied includes a specific indicator indicating whether the cooperative communication is applied, PDCCH(s) assigning a PDSCH to which cooperative communication is applied is scrambled with a specific RNTI, applying of cooperative communication in a specific section indicated by a higher layer is assumed, and the like. Hereinafter, for convenience of description, a case in which a terminal receives a PDSCH to which cooperative communication has been applied based on conditions similar to the above may be referred to as an NC-JT case.

Hereinafter, in the disclosure, determination of the priority between A and B may be mentioned in various ways, such as selecting one having a higher priority according to a predetermined priority rule so as to perform an operation corresponding thereto, or omitting or dropping an operation having a lower priority.

Hereinafter, in the disclosure, descriptions of the examples may be provided via multiple embodiments, but these are not independent of each other, and it is possible that one or more embodiments are applied concurrently or in combination.

First Embodiment: DCI Reception for NC-JT

Unlike the conventional system, the 5G wireless communication system can support not only a service requiring a high transmission rate, but also a service having a very short transmission delay and a service requiring a high connection density. In a wireless communication network including multiple cells, TRPs, or beams, cooperative communication (coordinated transmission) between respective cells, TRPs, or/and beams is one of element techniques capable of satisfying various service requirements by increasing the intensity of a signal received by a terminal or efficiently performing interference control between each cell, TRP, or/and beam.

Joint transmission (JT) is a representative transmission technique for the aforementioned cooperative communication, and the technology enables enhancement of the intensity of a signal received by a terminal, by supporting one terminal via different cells, TRPs, and/or beams. Characteristics of channels between a terminal and each cell, TRP, and/or beam may be largely different, so that different precoding, MCS, and resource allocation are required to be applied to links between a terminal and each cell, TRP, and/or beam. In particular, in the case of non-coherent joint transmission (NC-JT) supporting non-coherent precoding between each cell, TRP, or/and beam, it is important to configure individual downlink (DL) transmission information for each of cells, TRPs, or/and beams.

However, the configuration of individual DL transmission information for each cell, TRP, or/or beam is a major factor that increases a payload required for DL DCI transmission, which may adversely affect DCI reception performance. Therefore, it is necessary, for supporting of JT, to carefully design a tradeoff between the amount of DCI information and the PDCCH reception performance.

Figure 12:
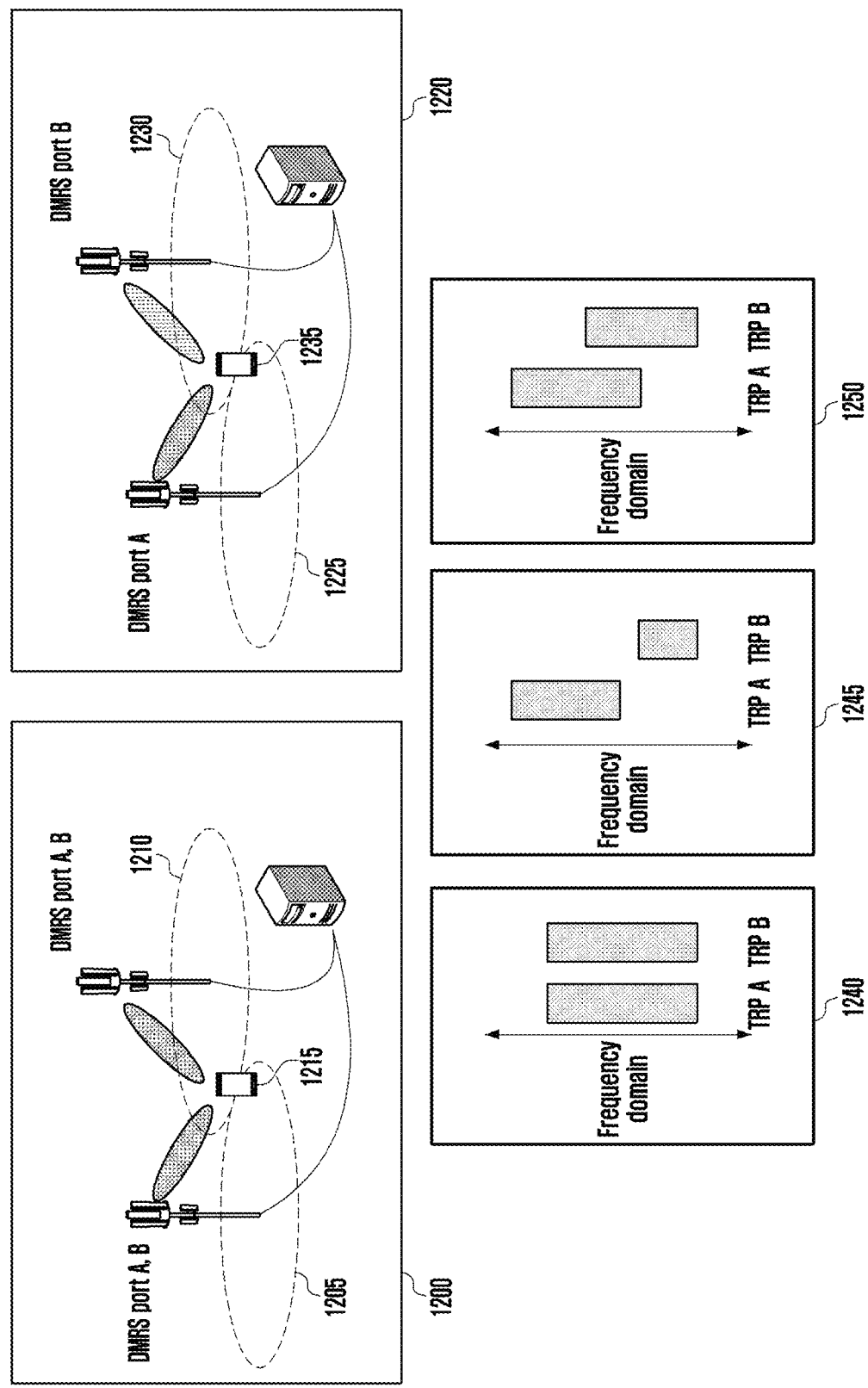
FIG. 12 is a diagram illustrating an example of an antenna port configuration and resource allocation for cooperative communication in the wireless communication system according to an embodiment of the present disclosure.

FIG. 12 is a diagram illustrating an example of an antenna port configuration and resource allocation for cooperative communication in the wireless communication system according to an embodiment of the present disclosure.

Referring to FIG. 12, examples of radio resource allocation for each TRP according to a situation and a joint transmission (JT) technique are illustrated.

In FIG. 12, reference numeral 1200 is an example of coherent joint transmission (C-JT) supporting coherent precoding between respective cells, TRPs, or/and beams.

In C-JT, TRP A 1205 and TRP B 1210 may transmit a single data stream (PDSCH) to a terminal 1215, and multiple TRPs may perform joint precoding. This means that the same DMRS ports (e.g., DMRS ports A and B in both TRPs) are used for the same PDSCH transmission in TRP A 1205 and TRP B 1210. In this case, the terminal may receive one piece of DCI for reception of one PDSCH demodulated based on a DMRS transmitted via DMRS ports A and B.

In FIG. 12, reference numeral 1220 is an example of non-coherent joint transmission (NC-JT) supporting non-coherent precoding between respective cells, TRPs, or/and beams. In the case of NC-JT, a PDSCH is transmitted to a terminal 1235 for each of cells, TRPs, or/and beams, and individual precoding may be applied to each PDSCH. Each cell, TRP, or/and beam may transmit a different PDSCH so as to improve throughput compared to single cell, TRP, or/and beam transmission, or each cell, TRP, or/and beam may repeatedly transmit the same PDSCH so as to improve reliability compared to single cell, TRP, or/and beam transmission.

Various radio resource allocations may be considered as shown in a case 1240 where all frequency and time resources used for PDSCH transmission by multiple TRPs are the same, a case 1245 where the frequency and time resources used by multiple TRPs do not overlap at all, and a case 1250 where some of the frequency and time resources used by multiple TRPs overlap.

In each of the described cases, when multiple TRPs repeatedly transmit the same PDSCH to improve reliability, if a reception terminal does not know whether the PDSCH is repeatedly transmitted, the terminal cannot perform combining in a physical layer for the PDSCH, and thus there may be a limit to improving reliability. Therefore, the disclosure provides a method for repeated transmission indication and configuration for improving NC-JT transmission reliability.

In order to concurrently assign multiple PDSCHs to one terminal for NC-JT support, DCI of various types, structures, and relationships may be considered.

Figure 13:
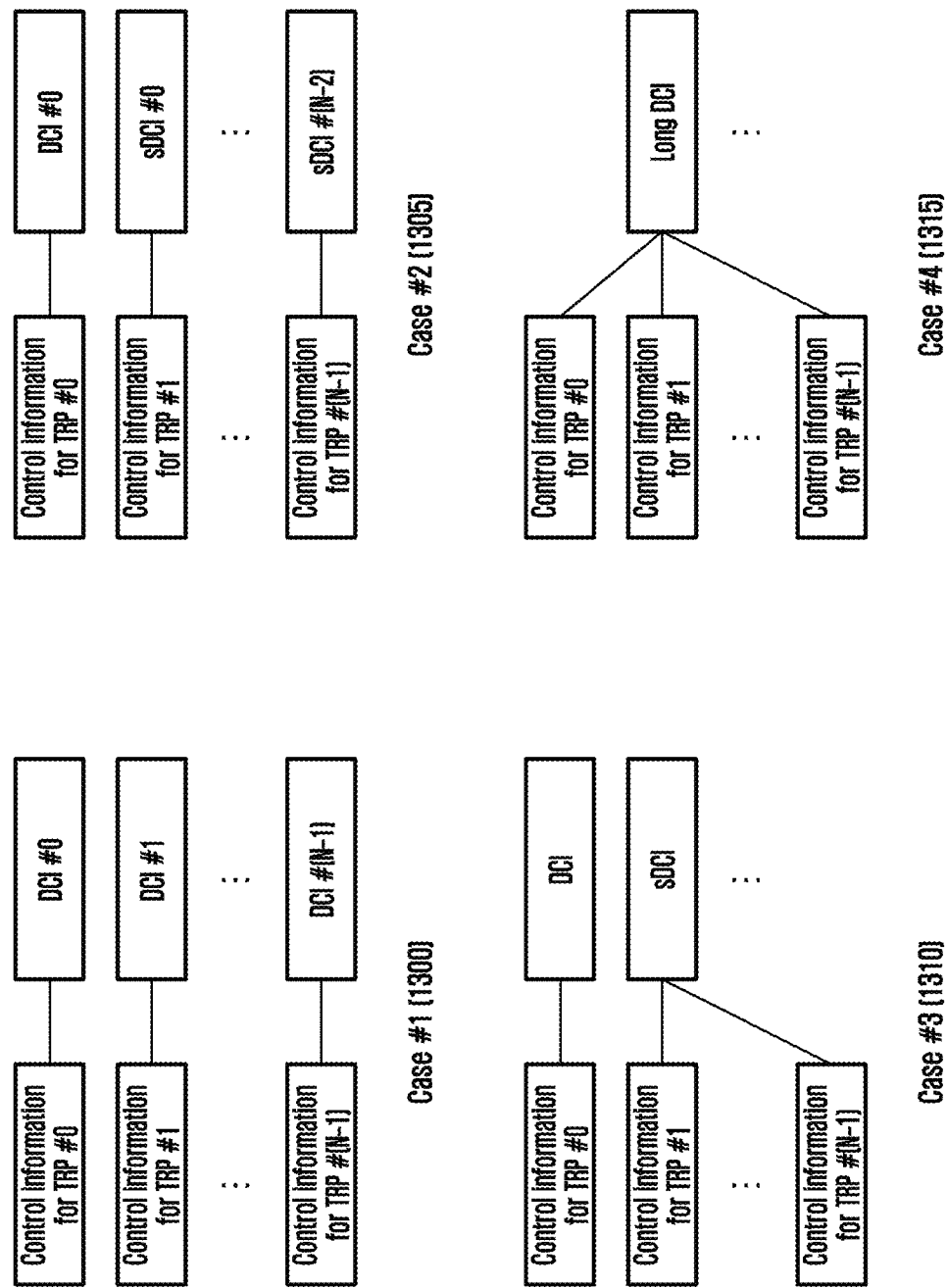
FIG. 13 is a diagram illustrating an example of a downlink control information (DCI) configuration for cooperative communication in the wireless communication system according to an embodiment of the present disclosure.

FIG. 13 is a diagram illustrating an example of a downlink control information (DCI) configuration for cooperative communication in the wireless communication system according to an embodiment of the present disclosure.

Referring to FIG. 13, various examples of DCI for NC-JT support are illustrated.

Referring to FIG. 13, case #1 1300 is an example in which, in a situation where different (N−1) PDSCHs are transmitted in (N−1) additional TRPs (TRP #1 to TRP #(N−1)) in addition to a serving TRP (TRP #0) used during single PDSCH transmission, control information for the PDSCHs transmitted in the (N−1) additional TRPs is transmitted in the same format (same DCI format) as that of control information for the PDSCH transmitted in the serving TRP. That is, a terminal may acquire control information for the PDSCHs transmitted in different TRPs (TRP #0 to TRP #(N−1)) via DCI(DCI #0 to DCI #(N−1)) having the same DCI format and the same payload. In this embodiment and an embodiment to be described later, the control information transmitted in the serving TRP may be classified into and referred to as first DCI, DCI transmitted in another TRP (cooperative TRP) may be classified into and referred to as second DCI, and so forth.

In aforementioned case #1, a freedom degree of each PDSCH control (assignment) may be fully guaranteed, but if each DCI is transmitted in a different TRP, a coverage difference for each DCI may occur, and reception performance may deteriorate.

Case #2 1305 is an example in which, in a situation where different (N−1) PDSCHs are transmitted in (N−1) additional TRPs (TRP #1 to TRP #(N−1)) in addition to a serving TRP (TRP #0) used during single PDSCH transmission, control information for the PDSCHs transmitted in the (N−1) additional TRPs is transmitted in formats (different DCI formats or different DCI payloads) different from a format of control information for the PDSCH transmitted in the serving TRP.

For example, in the case of DCI #0, which is control information for the PDSCH transmitted in the serving TRP (TRP #0), all information elements of DCI format 1_0 to DCI format 1_1 are included, but secondary DCI (hereinafter, sDCI) (sDCI #0 to sDCI #(N−2)), which is control information for the PDSCHs transmitted in cooperative TRPs (TRP #1 to TRP #(N−1)) may include only some of the information elements of DCI format 1_0 to DCI format 1_1.

Therefore, in the case of sDCI including control information for the PDSCHs transmitted in the cooperative TRPs, a payload may be small compared to normal DCI (nDCI) including PDSCH-related control information transmitted in the serving TRP, or as many reserved bits as the number of bits less than that of nDCI may be included.

In aforementioned case #2, a freedom degree of each PDSCH control (assignment) may be limited according to contents of information elements included in sDCI, but since reception performance of the sDCI is superior to that of nDCI, a probability of occurrence of a coverage difference for each DCI may be lowered.

Case #3 1310 is an example in which, in a situation where different (N−1) PDSCHs are transmitted in (N−1) additional TRPs (TRP #1 to TRP #(N−1)) in addition to a serving TRP (TRP #0) used during single PDSCH transmission, control information for the PDSCHs transmitted in the (N−1) additional TRPs is transmitted in formats (different DCI formats or different DCI payloads) different from a format of control information for the PDSCH transmitted in the serving TRP.

For example, in the case of DCI #0, which is control information for the PDSCH transmitted in the serving TRP (TRP #0), all information elements of DCI format 1_0 to DCI format 1_1 are included, and in the case of control information for the PDSCHs transmitted in cooperative TRPs (TRP #1 to TRP #(N−1)), only some of the information elements of DCI format 1_0 to DCI format 1_1 may be included in one piece of "secondary" DCI (sDCI).

For example, the sDCI may include at least one of HARQ-related information such as frequency domain resource assignment, time domain resource assignment, and MCS of the cooperative TRPs. In addition, for information not included in sDCI, such as a bandwidth part (BWP) indicator or a carrier indicator, the information may follow the DCI (DCI #0, normal DCI, nDCI) of the serving TRP.

In case #3, a freedom degree of each PDSCH control (assignment) may be limited according to contents of information elements included in the sDCI, but reception performance of the sDCI is adjustable, and in comparison with case #1 or case #2, the complexity of DCI blind decoding of the terminal may be reduced.

Case #4 1315 is an example in which, in a situation where different (N−1) PDSCHs are transmitted in (N−1) additional TRPs (TRP #1 to TRP #(N−1)) in addition to a serving TRP (TRP #0) used during single PDSCH transmission, control information for the PDSCHs transmitted in the (N−1) additional TRPs is transmitted via the same DCI (long DCI (lDCI)) as that of the control information for the PDSCH transmitted in the serving TRP. That is, the terminal may acquire control information for the PDSCHs transmitted in different TRPs (TRP #0 to TRP #(N−1)) via a single piece of DCI.

In case #4, complexity of DCI blind decoding of the terminal may not increase, but a freedom degree of PDSCH control (assignment) may be low, such as the number of cooperative TRPs is limited according to limitation of a long DCI payload.

In the following descriptions and embodiments, sDCI may refer to secondary DCI or various auxiliary DCI, such as normal DCI (DCI format 1_0 to 1_1 described above) including PDSCH control information transmitted in a cooperative TRP, and if a specific limitation not specified, the descriptions are applicable to the various auxiliary DCIs in a similar manner. In addition, terms, such as first DCI and second DCI, may be used to classify DCI according to a form or characteristic of the DCI or a TRP for transmission of the DCI. For example, DCI transmitted via a serving TRP may be expressed as first DCI, DCI transmitted via a cooperative TRP may be expressed as a second DCI, and so forth.

In the following descriptions and embodiments, case #1, case #2, and case #3, in which one or more DCI (PDCCH) is used for NC-JT support, are classified into multiple PDCCH-based NC-JTs, and case #4 in which a single piece of DCI (PDCCH) is used for NC-JT support may be classified as a single PDCCH-based NC-JT.

In embodiments of the disclosure, "cooperative TRP" may be replaced with various terms, such as "cooperative panel" or "cooperative beam" when actually applied.

In the embodiments of the disclosure, "when NC-JT is applied" can be interpreted in various ways according to situations, such as "when a terminal receives one or more PDSCHs concurrently in one BWP," "when a terminal receives a PDSCH, based on two or more transmission configuration indicator (TCI) indications concurrently in one BWP," and "when a PDSCH received by a terminal is associated with one or more DMRS port groups," but one expression is used for convenience of description.

In the present disclosure, a radio protocol structure for NC-JT may be used in various ways according to a TRP scenario. For example, if there is no backhaul delay or is a small backhaul delay between cooperative TRPs, a structure based on MAC layer multiplexing may be used in a similar manner to reference numeral 1110 of FIG. 11 (CA-like method). On the other hand, if a backhaul delay between cooperative TRPs is large so that the backhaul delay cannot be ignored (e.g., when 2 ms or longer is required for information exchange, such as CSI, scheduling, and HARQ-ACK, between cooperative TRPs), characteristics robust to a delay may be secured using an independent structure for each TRP from the RLC layer in a similar manner to reference numeral 1120 of FIG. 11 (DC-like method).

1-1st Embodiment: Method for Configuring a Downlink Control Channel for Multi-PDCCH-Based NC-JT Operation In NC-JT based on multiple PDCCHs, when DCI for a PDSCH schedule of each TRP is transmitted, a CORESET or search space that is classified for each TRP may be configured. The CORESET or search space for each TRP may be configured as shown in at least one of the following cases.

In one example of higher layer index configuration for each CORESET, CORESET configuration information configured via a higher layer may include an index value, and a TRP for transmission of a PDCCH in a corresponding CORESET may be distinguished by a configured index value for each CORESET. That is, the terminal may consider that the same TRP transmits the PDCCH or may determine or consider that the PDCCH for scheduling of a PDSCH of the same TRP is transmitted, in a set of CORESETs having the same higher layer index value.

The aforementioned index for each CORESET may be referred to as CORESETPoolIndex, and the terminal may determine or consider, for CORESETs for which the same CORESETPoolIndex value is configured, that the PDCCH is transmitted from the same TRP. In a case of a CORESET for which no CORESETPoolIndex value is configured, the terminal may determine or consider that a default value of CORESETPoolIndex has been configured, wherein the default value may be 0.

In one example of configuration of multiple PDCCH-Configs, Multiple PDCCH-Configs may be configured in one BWP, and each PDCCH-Config may include a PDCCH configuration for each TRP. That is, a list of CORESETs for each TRP and/or a list of search spaces for each TRP may be configured in one PDCCH-Config, and the terminal may determine or consider that one or more CORESETs and one or more search spaces included in one PDCCH-Config may correspond to a specific TRP.

In one example of CORESET beam/beam group configuration, a TRP corresponding to a corresponding CORESET may be distinguished via a beam or beam group configured for each CORESET. For example, if the same TCI state is configured for multiple CORESETs, the terminal may consider that the CORESETs are transmitted via the same TRP, or may determine or consider that the PDCCH for scheduling of the PDSCH of the same TRP is transmitted in the corresponding CORESET.

In one example of search space beam/beam group configuration, a beam or beam group may be configured for each search space, and a TRP for each search space may be distinguished based thereon. For example, when the same beam/beam group or TCI state is configured in multiple search spaces, the terminal may consider or determine that the same TRP transmits the PDCCH in the search space, or that the PDCCH for scheduling of the PDSCH of the same TRP is transmitted in the search space.

By distinguishing the CORESET or search space for each TRP as described above, it is possible to classify PDSCH and HARQ-ACK information for each TRP, and based on this, independent PUCCH resource use and independent HARQ-ACK codebook generation for each TRP are possible.

Second Embodiment: Method of Transferring HARQ-ACK Information for NC-JT Transmission The second embodiment describes a method of transferring HARQ-ACK information for NC-JT transmission.

Figure 14A:
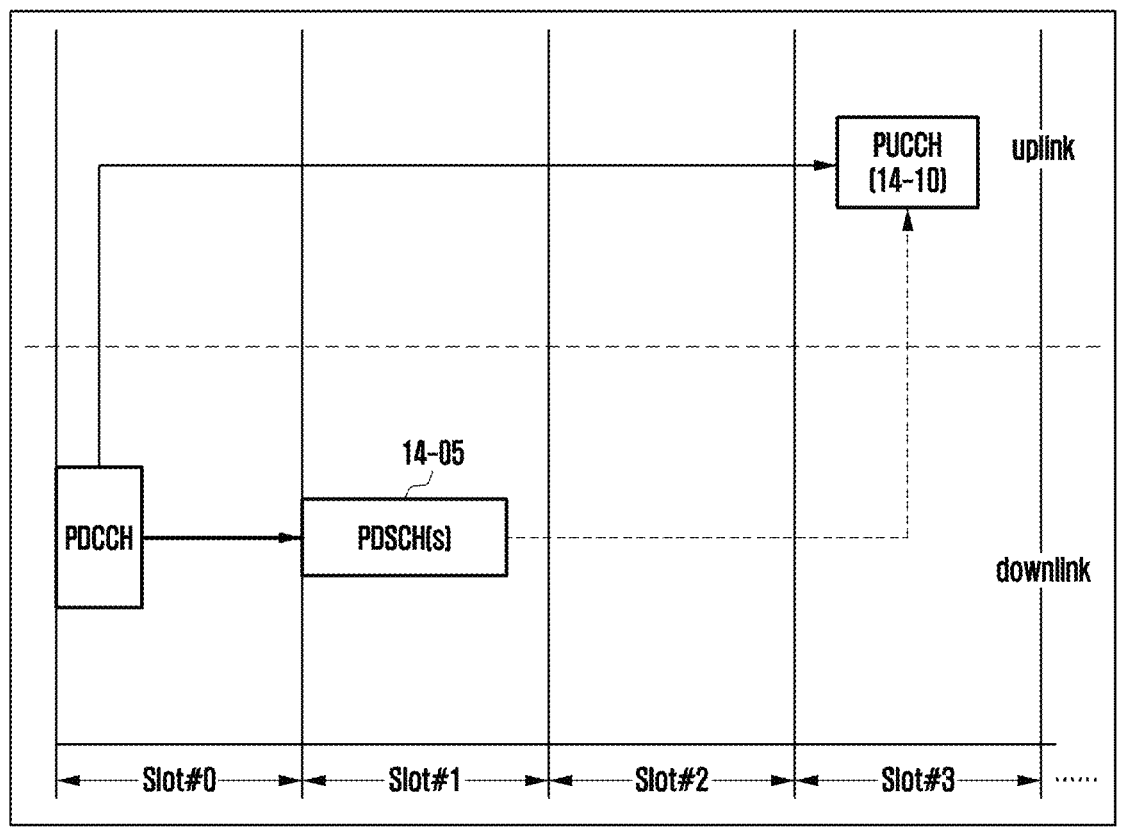
FIG. 14A is a diagram illustrating a method of transferring HARQ-ACK information when a single PDCCH is used for NC-JT transmission in the wireless communication system according to an embodiment of the present disclosure.
Figure 14B:
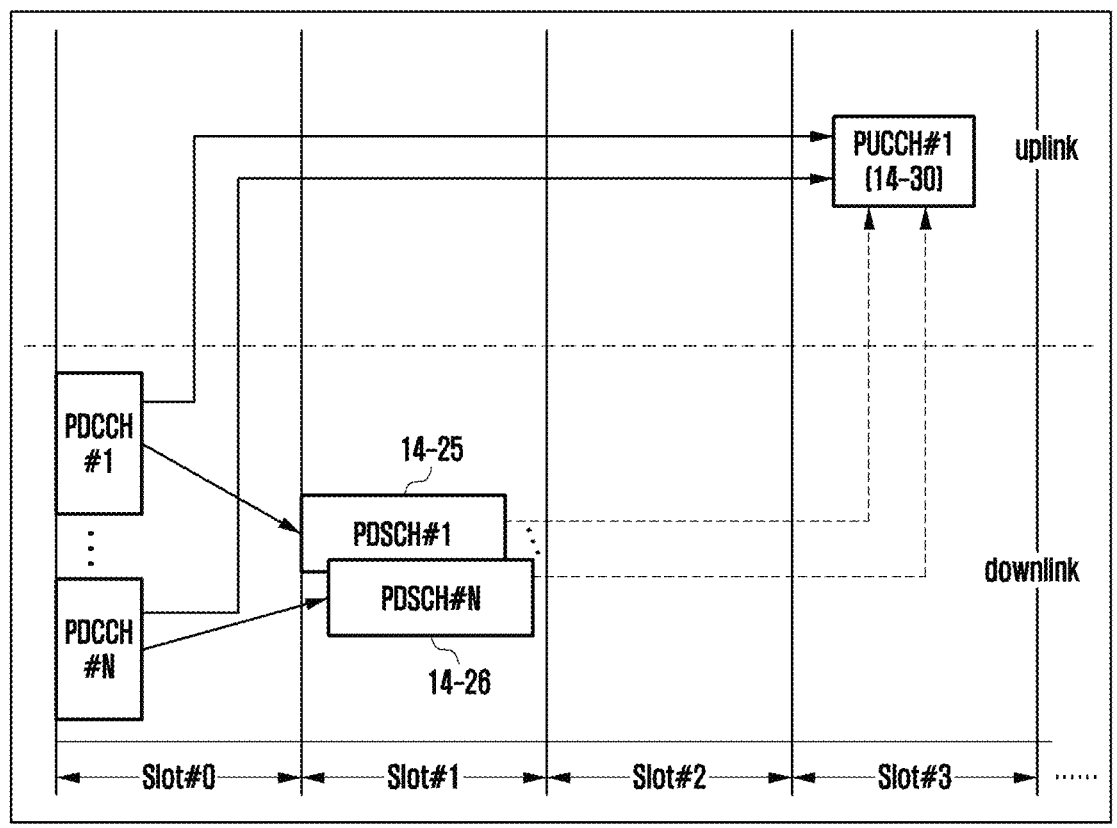
FIG. 14B is a diagram illustrating a method of transferring joint HARQ-ACK information when a multi-PDCCH is used for NC-JT transmission in the wireless communication system according to an embodiment of the present disclosure.
Figure 14C:
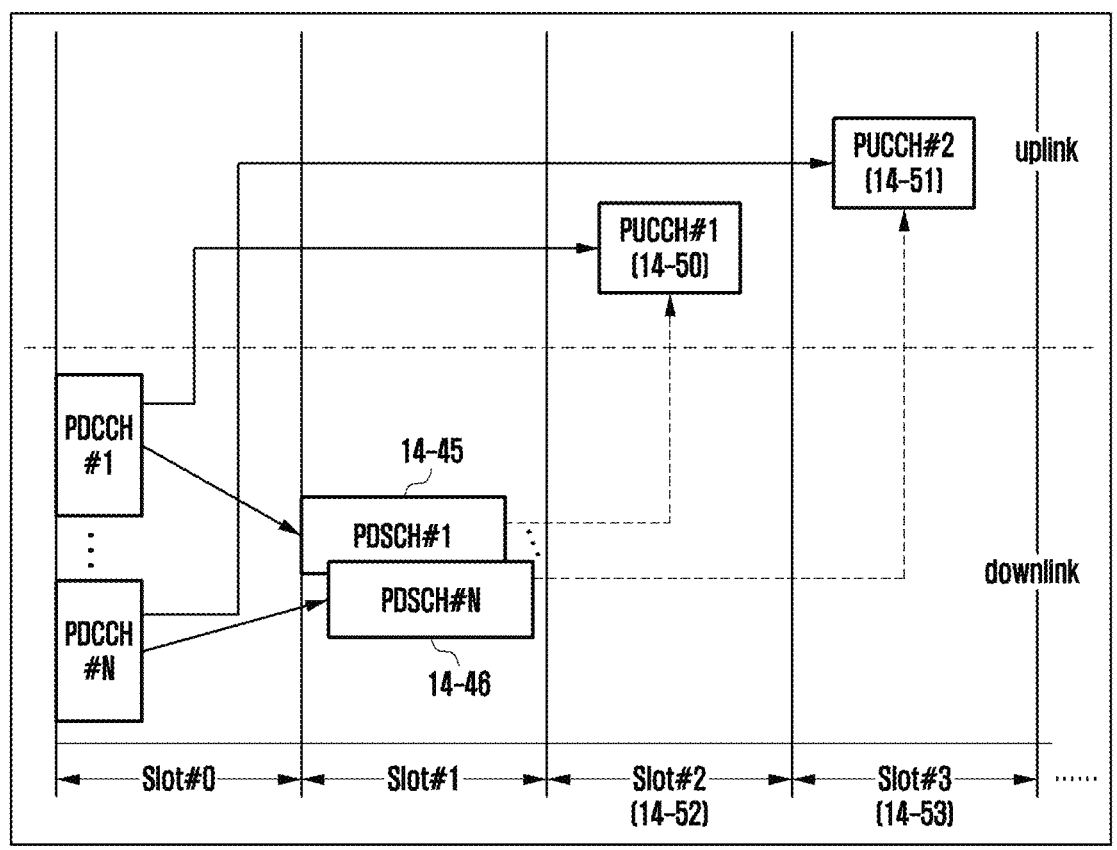
FIG. 14C is a diagram illustrating a method of transferring inter-slot time division multiplexed HARQ-ACK information when a multi-PDCCH is used for NC-JT transmission in the wireless communication system according to an embodiment of the present disclosure.
Figure 14D:
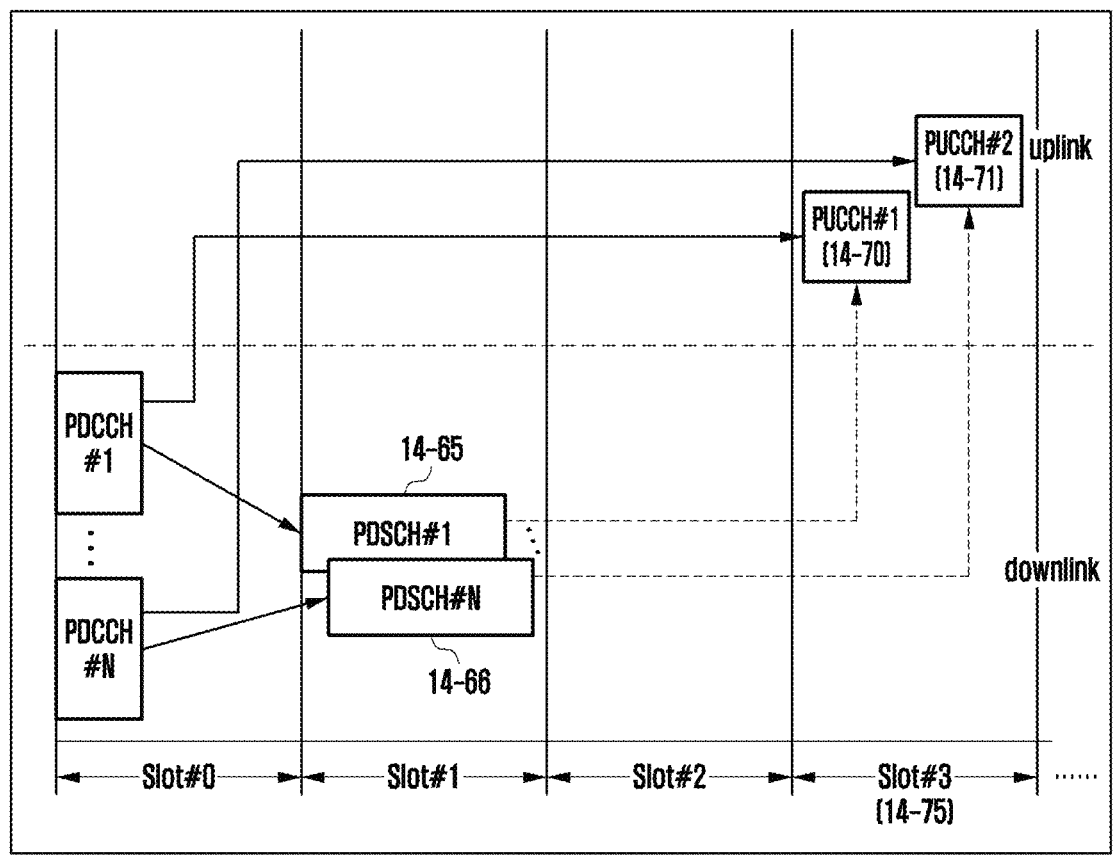
FIG. 14D is a diagram illustrating a method of transferring intra-slot time division multiplexed HARQ-ACK information when a multi-PDCCH is used for NC-JT transmission in the wireless communication system according to an embodiment of the present disclosure.

FIG. 14A is a diagram illustrating a method of transferring HARQ-ACK information according to various DCI configurations and PUCCH configurations for NC-JT transmission, FIG. 14B is a diagram illustrating a method of transferring HARQ-ACK information according to various DCI configurations and PUCCH configurations for NC-JT transmission, FIG. 14C is a diagram illustrating a method of transferring HARQ-ACK information according to various DCI configurations and PUCCH configurations for NC-JT transmission, and FIG. 14D is a diagram illustrating a method of transferring HARQ-ACK information according to various DCI configurations and PUCCH configurations for NC-JT transmission.

First, FIG. 14A (option #1: HARQ-ACK for single-PDCCH NC-JT) 14-00 illustrates an example in which HARQ-ACK information for one or multiple PDSCHs 14-05 scheduled by a TRP is transmitted via one PUCCH resource 14-10 in the case of single-PDCCH-based NC-JT. The PUCCH resource 14-10 may be indicated via at least one of a PRI value and a $K_1$ value in the DCI.

FIG. 14B (option #2) to FIG. 14D (option #4) 14-20, 14-40, and 14-60 illustrate cases of multi-PDCCH-based NC-JT. Respective options may be classified according to the number of PUCCH resources to transmit HARQ-ACK information corresponding to the PDSCH of each TRP and positions of the PUCCH resources on the time axis.

FIG. 14B (option #2: joint HARQ-ACK) 14-20 illustrates an example in which the terminal transmits HARQ-ACK information corresponding to PDSCHs 14-25 and 14-26 of respective TRPs via one PUCCH resource 14-30. In this case, all HARQ-ACK information for each TRP may be generated based on a single HARQ-ACK codebook, and HARQ-ACK information for each TRP may be generated based on an individual HARQ-ACK codebook. In this case, HARQ-ACK information for each TRP may be concatenated so as to be transmitted in one PUCCH resource 14-30.

When an individual HARQ-ACK codebook for each TRP is used, as defined in the aforementioned 1-1st embodiment, the TRP may be classified into at least one of a set of CORESETs having the same higher layer index, a set of CORESETs belonging to the same TCI state, beam, or beam group, and a set of search spaces belonging to the same TCI state, beam, or beam group.

FIG. 14C (option #3: inter-slot time-division multiplexed (TDMed) separate HARQ-ACK) 14-40 illustrates an example in which the terminal transmits HARQ-ACK information corresponding to PDSCHs 14-45 and 14-46 of respective TRPs via PUCCH resources 14-50 and 14-51 of different slots 14-52 and 14-53.

Slots including the PUCCH resources for respective TRPs may be determined by the aforementioned $K_1$ value. If $K_1$ values indicated by multiple PDCCHs indicate the same slot, the terminal may consider that all the PDCCHs have been transmitted in the same TRP, and may transmit all HARQ-ACK information corresponding thereto. In this case, HARQ-ACK information concatenated in one PUCCH resource located in the same slot may be transmitted to the TRP.

FIG. 14D (option #4: intra-slot TDMed separate HARQ-ACK) 14-60 illustrates an example of transmitting HARQ-ACK information corresponding to PDSCHs 14-65 and 14-66 of respective TRPs via different PUCCH resources 14-70 and 14-71 in different symbols in the same slot 14-75.

The slot including the PUCCH resources for respective TRPs may be determined by the aforementioned $K_1$ value, and if $K_1$ values indicated by the multiple PDCCHs indicate the same slot, the terminal may select a PUCCH resource and determine a transmission symbol via at least one of the following methods.

<PUCCH Resource Group Configuration for Each TRP>

A PUCCH resource group for HARQ-ACK transmission for each TRP may be configured. When a TRP for each CORESET or/and search space is classified as in the aforementioned 1-1st embodiment, the PUCCH resource for HARQ-ACK transmission for each TRP may be selected within the PUCCH resource group for the corresponding TRP. Time division multiplexing (TDM) may be expected between PUCCH resources selected from different PUCCH resource groups, that is, the selected PUCCH resources are not expected to overlap in units of symbols (within the same slot). The terminal may generate an individual HARQ-ACK codebook for each TRP, and then transmit the same in the PUCCH resource selected for each TRP, as in the above.

<Indicating Different PRIs for Respective TRPs>

As shown in the aforementioned 1-1st embodiment, if a TRP for each search space and/or CORESET is classified, a PUCCH resource for each TRP may be selected according to a PRI. That is, the PUCCH resource selection in Rel-15 described above may be independently performed for each TRP. In this case, PRIs used to determine PUCCH resources for respective TRPs may be different from each other. For example, the terminal may not expect that the PRIs used to determine the PUCCH resources for respective TRPs are indicated with the same value. For example, a PDCCH for TRP 1 may include a PRI configured as PRI=n, and a PDCCH for TRP 2 may include a PRI configured as PRI=m.

TDM may be expected between the PUCCH resources indicated by the PRIs for respective TRPs. That is, selected PUCCH resources are not expected to overlap each other in units of symbols (within the same slot). As described above, an individual HARQ-ACK codebook for each TRP may be generated in the PUCCH resource selected for each TRP and then transmission is performed.

<Defining a $K_1$ Value in Units of Sub-Slots>

The PUCCH resource selection in Rel-15 described above may be followed, but a $K_1$ value may be defined in units of sub-slots. For example, the terminal may generate, in the same sub-slot, an HARQ-ACK codebook for PDSCH/PDCCHs indicated to report HARQ-ACK, and then may perform transmission via a PUCCH resource indicated by a PRI. The HARQ-ACK codebook generation and the PUCCH resource selection may be irrelevant to classification of a TRP for each search space and/or CORESET.

When the terminal supports NC-JT reception, one of the options may be configured via a higher layer or may be implicitly selected according to a situation.

For example, for the terminal supporting multi-PDCCH-based NC-JT, one of option 2 (joint HARQ-ACK) and option 3 or 4 (separate HARQ-ACK) may be selected via a higher layer.

As another example, depending on whether single-PDCCH-based NC-JT or multi-PDCCH-based NC-JT is supported or configured, option 1 may be selected for the former and option 2, 3, or 4 may be selected for the latter.

As another example, in the multi-PDCCH-based NC-JT, an option to be used may be determined according to selection of a PUCCH resource. When PUCCH resources of the same slot are selected for different TRPs, if the corresponding PUCCH resources are different and do not overlap in units of symbols, HARQ-ACK may be transmitted according to option 4, and if the corresponding PUCCH resources overlap in units of symbols or the assigned symbols are identical, HARQ-ACK may be transmitted according to option 2. In a case where PUCCH resources of different slots are selected for different TRPs, HARQ-ACK may be transmitted according to option 3.

Configuration of the options may be dependent on the UE capability. For example, the base station may receive UE capability according to the aforementioned procedure, and the option may be configured based thereon. For example, option 4 configuration is allowed only for a terminal having capability supporting intra-slot TDMed separate HARQ-ACK, and a terminal without the corresponding capability may not expect configuration according to option 4.

Figure 15:
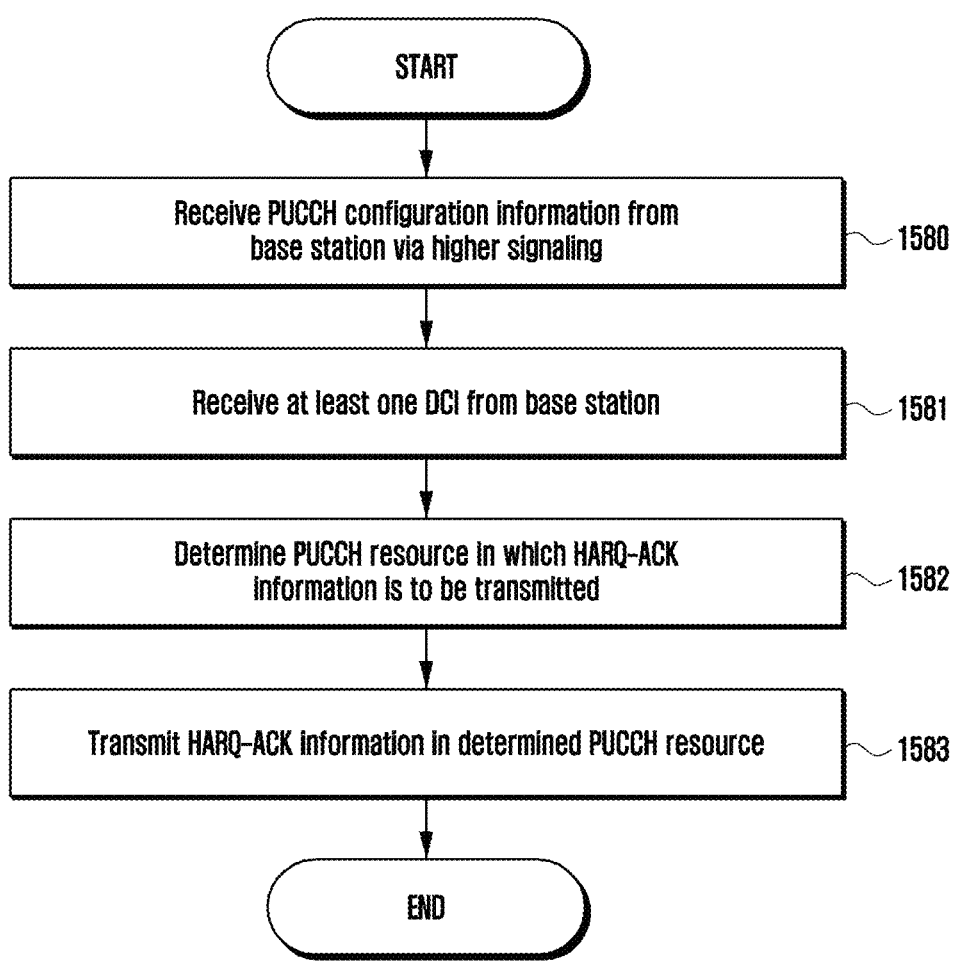
FIG. 15 is a diagram illustrating an example of a method of transmitting, by a terminal, HARQ-ACK information for NC-JT transmission to a base station in the wireless communication system according to an embodiment of the present disclosure.

FIG. 15 is a flow chart illustrating an example of a method in which a terminal transmits, to a base station, HARQ-ACK information for NC-JT transmission according to the present disclosure.

Referring to FIG. 15, (although not illustrated) a terminal may transmit capability information on whether the described options are supported, to a base station via a message (e.g., a UECapabilityInformation message) for reporting UE capability, and the base station may explicitly configure an option to be applied to the terminal, based on the capability information transmitted by the terminal, or a specific option may be implicitly applied.

In operation 1580, a terminal may receive PUCCH configuration information from a base station via higher signaling. The PUCCH configuration information may include at least one piece of information in Table 21, Table 22, Table 29, and Table 30, and at least one of PUCCH group configuration information and information for configuring a relationship between a PRI and a PUCCH resource as shown in Table 26, or information for configuring a candidate for a K1 value as shown in Table 21 may be included.

Thereafter, in operation 1581, the terminal may receive DCI for scheduling of downlink data from the base station on a PDCCH (this may be interchangeably used with PDCCH reception).

Thereafter, in operation 1582, the terminal may determine a PUCCH resource for transmission of HARQ-ACK, by identifying at least one of a PRI, a PDSCH-to-HARQ feedback timing indicator included in the DCI, or an HARQ-ACK payload to be transmitted according to the aforementioned method, based on an option applied to the terminal.

Thereafter, in operation 1583, the terminal may transmit HARQ-ACK information in the determined PUCCH resource.

Not all operations of the aforementioned method need to be performed, and a specific operation may be omitted or the order thereof may be changed.

Figure 16:
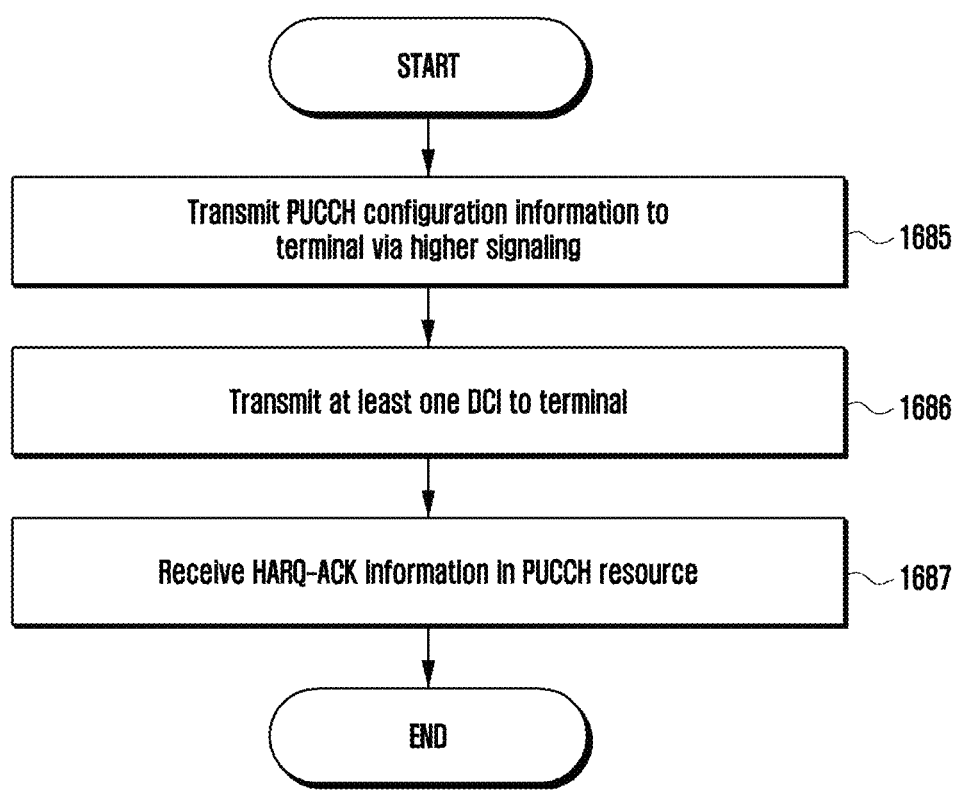
FIG. 16 is a diagram illustrating an example of a method of receiving, by a base station, HARQ-ACK information for NC-JT transmission from a terminal in the wireless communication system according to an embodiment of the present disclosure.

FIG. 16 is a flow chart illustrating an example of a method in which a base station receives, from a terminal, HARQ-ACK information for NC-JT transmission according to the present disclosure.

Referring to FIG. 16, (although not illustrated) a base station may receive a message (e.g., a UECapabilityInformation message) for reporting UE capability including capability information on whether the described options are supported, which is transmitted by a terminal, and may explicitly configure an option applied to the terminal, based on the capability information transmitted by the terminal, or may implicitly apply a specific option.

In operation 1685, the base station may transmit PUCCH configuration information to the terminal via higher signaling. The PUCCH configuration information may include at least one piece of information in Table 21, Table 22, Table 29, and Table 30, and at least one of PUCCH group configuration information and information for configuring a relationship between a PRI and a PUCCH resource as shown in Table 26, or information for configuring a candidate for a K1 value as shown in Table 21 may be included.

Thereafter, in operation 1686, the base station may transmit DCI for scheduling of downlink data to the terminal via a PDCCH (this may be interchangeably used with PDCCH transmission). The terminal may determine a PUCCH resource for transmission of HARQ-ACK, by identifying at least one of a PRI, a PDSCH-to-HARQ feedback timing indicator included in the DCI, or an HARQ-ACK payload to be transmitted according to the aforementioned method, based on an option applied to the terminal.

Thereafter, the terminal may transmit HARQ-ACK information in the determined PUCCH resource, and the base station may receive, in operation 1687, HARQ-ACK information in the PUCCH resource determined in the same manner.

Not all operations of the aforementioned method need to be performed, and a specific operation may be omitted or the order thereof may be changed.

Third Embodiment: Resource Configuration for PUCCH Transmission to Multiple TRPs For PUCCH transmission to multiple TRPs, PUCCH resources may be configured by at least one of the following methods. Transmission of PUCCH resources, which will be described later, may refer to transmission of UCI via a PUCCH or PUCCH transmission.

In one example of repeated PUCCH transmission via a single PUCCH resource, a PUCCH is repeatedly transmitted according to a determined unit of repeated transmission via a single PUCCH resource, and a PUCCH transmission beam or/and transmission power may be changed for each repeated transmission or in some repeated transmissions among all repeated transmissions.

In one example of PUCCH transmission via multiple PUCCH resources, multiple different PUCCHs, including the same control information, are transmitted to different TRPs, and the multiple PUCCHs may not overlap each other. In addition, different transmission beams or/and transmission powers may be applied to the multiple PUCCHs.

Detailed embodiments for each of the aforementioned resource configuration methods are described below.

3-1st Embodiment: Resource Configuration for Repeated PUCCH Transmission to Multiple TRPs Via Single PUCCH Resource When a PUCCH is repeatedly transmitted to multiple TRPs on a single PUCCH resource, there may be the following differences from repeated PUCCH transmission to a single TRP via a single PUCCH resource.

<Whether Short PUCCH Repeated Transmission is Required>

When a PUCCH is repeatedly transmitted via a single PUCCH resource to a single TRP, only a long PUCCH is used, and repeated transmission of a short PUCCH is not supported. This is because repeated transmission is for coverage improvement, but the short PUCCH is not designed for coverage improvement.

On the other hand, one purpose of performing repeated PUCCH transmission to multiple TRPs may be to overcome blockage, wherein the use of a short PUCCH makes it possible to overcome blockage with a smaller delay time compared to the use of a long PUCCH. Therefore, a short PUCCH may be used for repeated PUCCH transmission to multiple TRPs.

<Whether Scheduling Reflecting a Transient Time Between Repeated Transmissions is Necessary>

In a case of performing repeated short PUCCH transmission to multiple TRPs, changes in beam and transmission power may occur between repeated transmissions. When the transmission power for a short PUCCH is changed, a guard time or offset between short PUCCH transmissions may be required to satisfy a required transient time. Therefore, when repeated short PUCCH transmission to multiple TRPs is performed, repeated transmissions reflecting the offset is required.

First, repeated transmission of the short PUCCH may be performed in units of sub-slots.

Figure 18A:
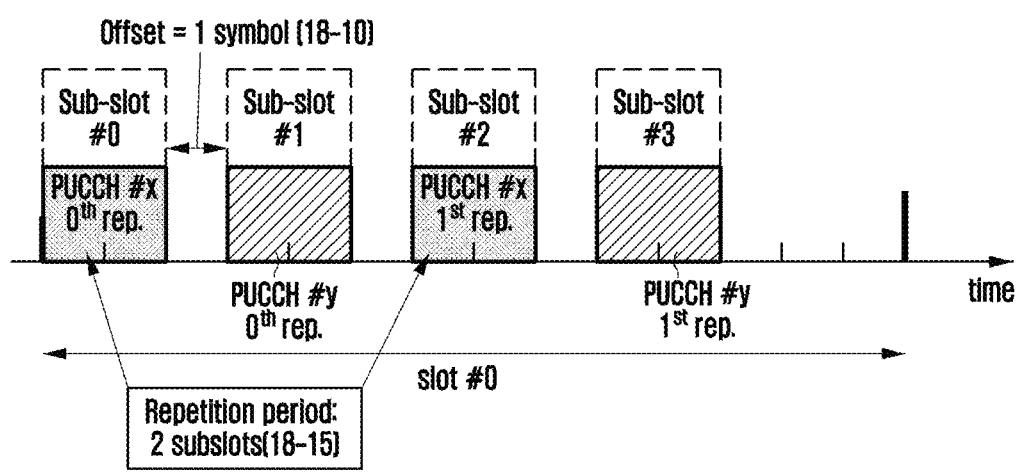
FIG. 18A is a diagram illustrating repeated PUCCH transmission in units of sub-slots in the wireless communication system according to an embodiment of the present disclosure.

FIG. 18A is a diagram illustrating repeated short PUCCH transmission in units of sub-slots according to the present disclosure.

A length of a sub-slot may be equal to or longer than a length of a repeatedly transmitted short PUCCH, and the length of the sub-slot may vary depending on time.

FIG. 18A illustrates an example in which all sub-slots have the same length of 2 18-05 for convenience of description, but the length is not limited thereto. An offset between short PUCCHs may be configured via PUCCH resource scheduling of a base station, such as configuring a start symbol position in a sub-slot of the short PUCCH and a length of the short PUCCH. However, if the offset cannot be configured by PUCCH resource scheduling, such as a case where the length of the sub-slot is the same as the length of the short PUCCH, a method of configuring the offset between repeated short PUCCH transmissions may be necessary. The offset may be configured in units of sub-slots or units of symbols.

FIG. 18A illustrates an example in which the offset is configured to 1 symbol 18-10, but 1 symbol is merely an example, and the offset is not limited thereto. The offset may be configured between respective repeated short PUCCH transmissions. Alternatively, if no change in transmission power occurs during the repeated short PUCCH transmission, an offset is not required, and thus an offset may be configured only between repeated transmissions in which a change in transmission power occurs.

The "between repeated transmissions in which a change in transmission power occurs" may be replaced with an expression such as "between repeated transmissions in which a beam change occurs" and "between repeated transmissions in which spatialRelationInfo changes."

The above contents have been described with an example of repeated short PUCCH transmission for the sake of convenience of description, but the described contents may be also applied to a long PUCCH in a similar manner.

In consideration of a case in which a PUCCH is repeatedly transmitted by alternately using multiple PUCCH resources, repeated PUCCH transmission may not occur for each adjacent sub-slot, but may occur for each sub-slot of a predetermined period. FIG. 18A illustrates an example 18-05 in which the repeated transmission period is configured to 2 sub-slots. However, the period of 2 sub-slots is merely an example, and the period is not limited thereto. A preconfigured offset may be applied to the period of repeated transmission 18-15.

Next, repeated short PUCCH transmission may be performed in a slot or sub-slot.

FIG. 18B is a diagram illustrating repeated short PUCCH transmission in a slot or sub-slot according to the present disclosure.

The repeated short PUCCH transmission may be performed within one slot or sub-slot 18-20, or may be performed over multiple slots or sub-slots 18-30. If the repeated transmission is performed in one slot or sub-slot 18-20, an offset between repeated transmissions may be configured 18-25. The offset may be configured in units of symbols. The offset may be configured between respective repeated short PUCCH transmissions. Alternatively, if no change in transmission power occurs during the repeated short PUCCH transmission, an offset is not required, and thus an offset may be configured only between repeated transmissions in which a change in transmission power occurs.

The "between repeated transmissions in which a change in transmission power occurs" may be replaced with an expression such as "between repeated transmissions in which a beam change occurs" and "between repeated transmissions in which spatialRelationInfo changes."

Alternatively, depending on a length of the repeatedly transmitted PUCCH, whether an offset is configured and/or applied may vary. For example, an offset may be configured or applied only when repeated short PUCCH transmission is performed, and an offset may not be applied when repeated long PUCCH transmission is performed. This may be because whether a guard time between the transmissions in which a change in transmission power occurs is required may vary depending on a length of the transmitted PUCCH.

If repeated transmission is performed over multiple slots or sub-slots 18-30, an offset between the repeated transmission may be configured 18-35. The offset may be applied only between repeated transmissions within one slot or sub-slot. In this case, an offset between repeated transmissions between different slots or sub-slots may be given via a start symbol configuration of the short PUCCH 18-40.

That is, the start symbol configuration of the short PUCCH may be applied to first repeated short PUCCH transmission in every slot or sub-slot.

Alternatively, the offset may also be applied between repeated transmissions between different slots or sub-slots. In this case, a start symbol configured for the short PUCCH may be applied only to the first repeated short PUCCH transmission in all repeated short PUCCH transmission. The offset may be configured between respective repeated short PUCCH transmissions. Alternatively, if no change in transmission power occurs during the repeated short PUCCH transmission, an offset is not required, and thus an offset may be configured only between repeated transmissions in which a change in transmission power occurs.

The "between repeated transmissions in which a change in transmission power occurs" may be replaced with an expression, such as "between repeated transmissions in which a beam change occurs" and "between repeated transmissions in which spatialRelationInfo changes." Alternatively, depending on a length of the repeatedly transmitted PUCCH, whether an offset is configured and/or applied may vary. For example, an offset may be configured or applied only when repeated short PUCCH transmission is performed, and an offset may not be applied when repeated long PUCCH transmission is performed. This may be because whether a guard time between the transmissions in which a change in transmission power occurs is required may vary depending on a length of the transmitted PUCCH.

The above contents have been described with an example of repeated short PUCCH transmission for the sake of convenience of description, but the described contents may be also applied to a long PUCCH in a similar manner.

Figure 18C:
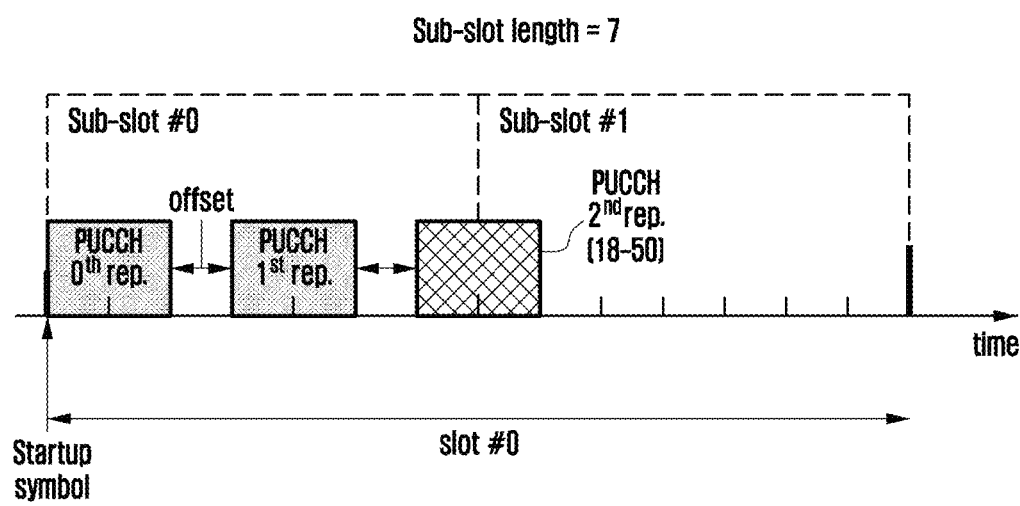
FIG. 18C is another diagram illustrating repeated PUCCH transmission in a slot or a sub-slot in the wireless communication system according to an embodiment of the present disclosure.

FIG. 18C is another diagram illustrating repeated PUCCH transmission in a slot or a sub-slot in the wireless communication system according to an embodiment of the present disclosure.

Referring to FIG. 18C, when repeated PUCCH transmission is performed within a slot or sub-slot, some PUCCHs in all repeated transmissions may span a boundary between slots or sub-slots 18-50. As a method of dealing with this case, at least one of the following methods may be included.

In one embodiment of Method 1, a symbol across a slot or sub-slot boundary in the repeatedly transmitted PUCCH is dropped. In this case, the configured number of repeated transmissions and the actual number of repeated transmissions are the same.

In one embodiment of Method 2, a symbol across a slot or sub-slot boundary in the repeatedly transmitted PUCCH is regarded as new repeated transmission. In this case, the actual number of repeated transmissions may be greater than the configured number of repeated transmissions.

In one embodiment of Method 3, the repeatedly transmitted PUCCH, i.e., repeated transmission across a slot or sub-slot boundary, is dropped. In this case, the actual number of repeated transmissions may be less than the configured number of repeated transmissions.

In one embodiment of Method 4, the repeatedly transmitted PUCCH, i.e., repeated transmission across a slot or sub-slot boundary, may be shifted to a subsequent slot or sub-slot. A shifted position may be a first symbol of the subsequent slot or sub-slot, or a position configured for a PUCCH start symbol.

In one embodiment of Method 5, scheduling may be performed so that there is no repeatedly transmitted PUCCH, i.e., repeated transmission across a slot or sub-slot boundary. In this case, the terminal may not expect repeated transmission across a slot or sub-slot boundary.

The aforementioned methods may be applied in a similar manner even when one or more DL symbols exist in a slot or sub-slot, and repeated PUCCH transmission overlaps the DL symbols.

Among the methods, according to method 1 and method 2, lengths of the repeatedly transmitted PUCCHs may not be the same. In this case, soft combining between PUCCHs having different lengths may not be performed. Therefore, at least one of the following constraints or change in PUCCH encoding may be required.

In one example of constraints, lengths of repeatedly transmitted PUCCHs with the same target TRP need to be the same, and lengths of repeatedly transmitted PUCCHs with different target TRPs may be different. This is because, in a case of the repeated transmissions with different target TRPs, soft combining of PUCCHs received in different TRPs may be difficult due to restrictions on backhaul capacity between the TRPs. Therefore, soft combining between different TRPs may not be necessarily supported. On the other hand, in a case of repeated transmissions with the same target TRP, although soft combining is possible, if soft combining is not supported, this may be due to occurrence of unnecessary performance degradation.

In one example of change in PUCCH encoding, when a PUCCH is encoded, the encoding may be performed using a Reed-Muller code if a length of UCI is 11 bits or less, and the encoding is performed using a Polar code if the length of UCI exceeds 11 bits. In a case of using the Polar code, if E is the total number of transmittable bits according to the amount of resources allocated to the PUCCH, a different encoding method may be applied according to E for each repeatedly transmitted PUCCH. Therefore, in the case of using the Polar code, the terminal may perform encoding while assuming that E values of all repeatedly transmitted PUCCHs are the same, and then may perform adaptive transmission according to the actual resource amount for each repeatedly transmitted PUCCH. For example, if the actual resource amount of the repeatedly transmitted PUCCH is less than an E value, a part of encoded code may be dropped (punctured) according to the E value. Alternatively, if the actual resource amount of the repeatedly transmitted PUCCH is greater than the E value, a part of the encoded code may be repeated according to the actual resource amount. At least one of the following may be included as criteria for determination of the E value:

Reference 1: A PUCCH corresponding to a specific order among the repeatedly transmitted PUCCHs. For example, a first PUCCH;

Reference 2: A PUCCH with the largest amount of resources among the repeatedly transmitted PUCCHs;

Reference 3: A PUCCH with the least amount of resources among the repeatedly transmitted PUCCHs;

Reference 4: An average value for each resource amount for each repeatedly transmitted PUCCH; or Reference 5: A PUCCH transmitted to a specific TRP among the repeatedly transmitted PUCCHs. For example, a PUCCH corresponding to a first beam.

For the repeated PUCCH transmission, the number of TRPs may be less than the number of repeated transmissions. In this case, a mapping rule for a TRP, to which each repeated transmission is to be performed, may be required. As an example, a transmission pattern for each TRP may be periodically configured.

Figure 19:
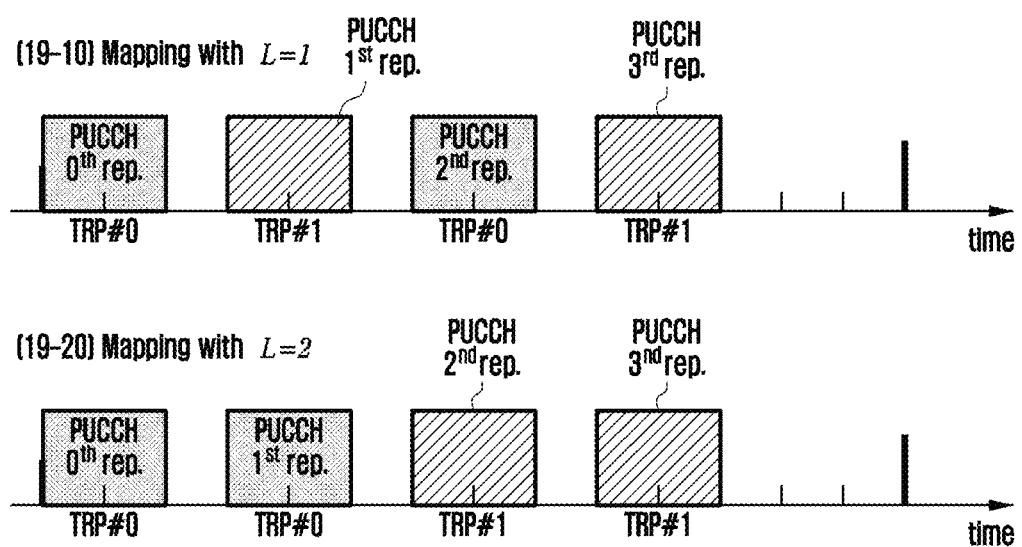
FIG. 19 is a diagram illustrating an example of a mapping rule between repeated PUCCH transmission and a transmission and reception point (TRP) according to an embodiment of the present disclosure.

FIG. 19 is a diagram illustrating an example of a mapping rule between repeated PUCCH transmission and a TRP according to an embodiment of the present disclosure.

Referring to FIG. 19, FIG. 19 illustrates a transmission pattern for each TRP when the total number of repeated transmissions is N, and the number of reception TRPs is K. Each TRP is assigned to L consecutive repeated transmissions in a round-robin manner. Value L may be configured to one of 1, 2, . . . , $\lfloor N/K \rfloor$, and $$\left\lfloor \frac{N}{K} + 1 \right\rfloor$$

19-10 and 19-20. If value L is small, TRP switching becomes more frequent, so that there is an advantage of an increase in a probability of early termination but a disadvantage of requiring more overheads for TRP switching. As another example, a transmission pattern for each TRP for all repeated transmissions may be indicated. For example, when two reception TRPs are designated for 4 repeated transmissions, and the TRPs are referred to as TRP #1 and TRP #2, the pattern for repeated transmission may be indicated as {TRP #1, TRP #1, TRP #1, TRP #2}.

3-2nd Embodiment: Resource Configuration for PUCCH Transmission to Multiple TRPs Via Multiple PUCCH Resources The same UCI may be transmitted to different TRPs via multiple PUCCH resources, respectively. In this case, different beams may be configured for each of the multiple PUCCH resources, and if repeated transmission is configured for the PUCCH resources, all the repeated transmissions may be performed to the same TRP. The terminal may need to determine whether specific UCI is transmitted via multiple PUCCH resources as described above or is transmitted via a single PUCCH resource as in the prior art, and to this end, at least one of the following methods may be used.

In one embodiment of explicit PUCCH set configuration, PUCCH resources for transmission of the same UCI may be grouped into one PUCCH set. The PUCCH set may be explicitly configured, and each PUCCH set may have a different ID. The base station may indicate to the terminal that the UCI is transmitted via multiple PUCCH resources, by indicating a PUCCH set ID for UCI transmission or multiple PUCCH resource IDs belonging to a PUCCH set. Alternatively, by indicating one PUCCH resource ID to the terminal, the base station may indicate that the UCI is transmitted via a single PUCCH resource. Alternatively, a PUCCH set is also defined in a PUCCH resource indicator, such as a PRI, and the terminal may thus determine, based on a PRI value, whether to use multiple PUCCH resources. For example, it may be configured that a specific PRI value indicates the PUCCH set, while another PRI value indicates a single PUCCH resource.

In one embodiment of implicit PUCCH set configuration, when the PUCCH resource group for each TRP is configured, a PUCCH resource may be selected according to a specific rule for each group, and a PUCCH set may be configured by gathering PUCCH resources selected for all groups. As an example of the rule, PUCCH resources having the same PUCCH resource ID within a group may be configured as a PUCCH set. In this case, the terminal may determine whether to use multiple PUCCH resources, according to whether there is a single PUCCH resource corresponding to the PUCCH resource ID or there are multiple PUCCH resources corresponding to the PUCCH resource ID.

A constraint for the PUCCH set may be configured. For example, if repeated transmission for PUCCH resources in the PUCCH set is not configured, all PUCCH resources in the PUCCH set may be transmitted in the same slot or sub-slot, and in this case, overlapping on the time axis between the PUCCH resources in the PUCCH set may not be allowed. As another example, a maximum value of the maximum number of PUCCH resources in the PUCCH set may be limited. As an example, the maximum value of the number of PUCCH resources may be 2.

Fourth Embodiment: UE Capability for Transmission to Multiple TRPs

Independent terminal capability (UE capability) may be required for each option related to the PUCCH transmission to multiple TRPs. For example, some terminals may not be able to support repeated short PUCCH transmission. Accordingly, the terminal may report whether to support repeated short PUCCH transmission, to the base station via a capability report, and the base station may configure, after reception of the terminal capability report, short PUCCH repetition only to a terminal supporting repeated short PUCCH transmission.

Even if the terminal supports repeated short PUCCH transmission, a minimum offset value between repetitions supportable for each terminal may be different. Accordingly, the terminal may report a minimum offset value between repetitions supportable during repeated short PUCCH transmission, to the base station via the capability report on a symbol, slot, sub-slot, or absolute time basis.

The base station may schedule the PUCCH by referring to a minimum supportable offset of the terminal after the terminal capability report. The minimum offset may be reported with respect to not only between short PUCCH repeated transmissions, but also between repeated short PUCCH-long PUCCH transmissions and between repeated long PUCCH-long PUCCH transmissions.

The minimum offset may not be an offset applied to all repeated PUCCH transmissions. According to the guaranteed transition time and the like, the minimum offset may be a value applied only between repeated PUCCH transmissions accompanied by a beam/transmission power change. For convenience of description, the contents have been described only for the same repeated PUCCH transmission of the 3-1st embodiment, but the contents are also applicable to multi-PUCCH resource transmission of the 3-2nd embodiment in a similar manner.

The maximum number of repeatedly transmitted PUCCHs in a slot or sub-slot may also be different for each terminal. Accordingly, the terminal may report the maximum number of repeatedly transmitted PUCCHs, to the base station via the capability report. A sub-slot length supported by the terminal may also differ for each terminal, and the terminal may report a length of a sub-slot, in which repeated transmission is performed, to the base station via the capability report. The terminal may report the combination of capabilities to the base station. For example, the terminal may report the maximum number of PUCCHs, which are repeatedly transmitted in a slot or for each sub-slot length, to the base station via the capability report. For convenience of description, the contents have been described only for the same repeated PUCCH transmission of the 3-1st embodiment, but the contents are also applicable to multi-PUCCH resource transmission of the 3-2nd embodiment in a similar manner.

Fifth Embodiment: Method of Repeated PUSCH Transmission in Consideration of Multiple TRPs The fifth embodiment of the disclosure describes a method of L1 signaling indication and configuration via higher layer signaling, for repeated PUSCH transmission in consideration of multiple TRPs. Repeated PUSCH transmission in consideration of multiple TRPs may be operated via a single or multi-DCI-based indication, each of which will be described in a 5-1st and a 5-2nd embodiment. A 5-3rd embodiment of the disclosure describes a method of repeated PUSCH transmission of configured grant in consideration of multiple TRPs. A 5-4th embodiment of the disclosure describes a method of an SRS resource set configuration for repeated PUSCH transmission in consideration of multiple TRPs.

5-1st Embodiment: Method of Single DCI-Based Repeated PUSCH Transmission in Consideration of Multiple TRPs As an embodiment of the disclosure, the 5-1st embodiment describes a method of single DCI-based repeated PUSCH transmission in consideration of multiple TRPs. The terminal may report that a method of single DCI-based repeated PUSCH transmission in consideration of multiple TRPs is possible, to the base station via a UE capability report. The base station may configure, via higher layer signaling, a repeated PUSCH transmission scheme to be used, for the terminal having reported corresponding UE capability (e.g., UE capability of supporting repeated PUSCH transmission in consideration of single DCI-based multiple TRPs). In this case, higher layer signaling may be configured by selecting one of both repeated PUSCH transmission type A or repeated PUSCH transmission type B.

In a case of a method for repeated PUSCH transmission in consideration of a single TRP in Rel-15/16, both a codebook-based transmission scheme and a non-codebook-based transmission scheme are performed based on single DCI. The terminal may apply the same value to each repeated PUSCH transmission, by using an SRI or TPMI indicated by one piece of DCI when codebook-based PUSCH transmission is performed. The terminal may also apply the same value to each repeated PUSCH transmission, by using an SRI indicated by one piece of DCI when non-codebook-based PUSCH transmission is performed. For example, if codebook-based PUSCH transmission and repeated PUSCH transmission type A are configured via higher layer signaling, and a time resource allocation index, in which the number of repeated PUSCH transmissions is configured to 4, an SRI index of 0, and a TMPI index of 0 are indicated via DCI, the terminal may apply both the SRI index of 0 and the TPMI index of 0 to each of the 4 repeated PUSCH transmissions.

Here, the SRI may be related to a transmission beam, and the TPMI may be related to a transmission precoder. Unlike the method of repeated PUSCH transmission in consideration of a single TRP, in the method of repeated PUSCH transmission in consideration of multiple TRPs, a transmission beam and a transmission precoder may need to be differently applied to transmission to each TRP. Therefore, the terminal may be indicated with multiple SRIs or TMPIs via DCI, and apply the same to respective repeated PUSCH transmissions, thereby performing repeated PUSCH transmission in consideration of multiple TRPs.

When the terminal is indicated with the method of single DCI-based repeated PUSCH transmission in consideration of multiple TRPs, in a case of a codebook-based or non-codebook-based PUSCH transmission method, the following methods may be considered as a method of indicating multiple SRIs or TPMIs.

[Method 1] Single DCI Transmission in which Multiple SRIs or TPMIs Fields Exist

In order to support the method of single DCI-based repeated PUSCH transmission in consideration of multiple TRPs, the base station may transmit, to the terminal, DCI in which multiple SRI or TPMI fields exist. This DCI may be a new format (e.g., DCI format 0_3) or an existing format (e.g., DCI format 0_1 or 0_2), but if additional higher layer signaling (e.g., signaling enabling determination of whether multiple SRI or TPMI fields are supportable) is configured and the configuration exists, the DCI may be DCI in which multiple SRI fields or TPMI fields exist, wherein there used to be only one SRI field or one TPMI field previously.

For example, when codebook-based PUSCH transmission is configured via higher layer signaling, if higher layer signaling which enables determination of whether multiple SRI or TPMI fields are supportable is configured, the terminal may receive DCI of an existing format or a new format having 2 SRI fields and 2 TPMI fields, so as to perform codebook-based repeated PUSCH transmission in consideration of multiple TRPs.

As another example, when non-codebook-based PUSCH transmission is configured via higher layer signaling, if higher layer signaling which enables determination of whether multiple SRI or TPMI fields are supportable is configured, the terminal may receive DCI of an existing format or a new format having 2 TPMI fields, so as to perform non-codebook-based repeated PUSCH transmission in consideration of multiple TRPs. If multiple SRI fields are used for both the codebook-based or non-codebook-based PUSCH transmissions, two or more SRS resource sets in which usage, higher layer signaling, is configured to codebook or non-codebook may be configured, each SRI field may indicate each SRS resource, and each SRS resource may be included in two different SRS resource sets. Contents of multiple SRS resource sets will be described in detail in the 5-4th embodiment.

[Method 2] Transmitting DCI to which Enhanced SRI and TPMI Fields are Applied

In order to support the method of single DCI-based repeated PUSCH transmission in consideration of multiple TRPs, the terminal may receive, from the base station, an MAC-CE for support of enhanced SRI or TPMI fields. The MAC-CE may include information indicating to change interpretation of a codepoint of a DCI field, so that multiple transmission beams are indicated for a specific codepoint of the SRI field in the DCI or multiple transmission precoders are indicated for a specific codepoint of the TPMI field in the DCI. The following two methods may be considered as a method of indicating multiple transmission beams.

In one embodiment, receiving an MAC-CE which activates a specific codepoint of an SRI field is considered so as to indicate one SRS resource connected to multiple pieces of SRS spatial relation info.

In one embodiment, receiving an MAC-CE which activates a specific codepoint of an SRI field is considered so as to indicate multiple SRS resources connected to one piece of SRS spatial relation info.

When multiple SRS resources are indicated using an enhanced SRI field, a transmission power control parameter of an SRS resource is configured for each SRS resource set, and therefore in order to configure a different transmission power control parameter for each TRP, respective SRS resources may exist in different SRS resource sets. Therefore, there may be two or more SRS resource sets in which usage, higher layer signaling, is configured to codebook or non-codebook.

5-2$^{nd}$ Embodiment: Method of Multi-DCI-Based Repeated PUSCH Transmission in Consideration of Multiple TRPs As an embodiment of the disclosure, the 5-2$^{nd}$ embodiment describes a method of multi-DCI-based repeated PUSCH transmission in consideration of multiple TRPs. As in the above, since all repeated PUSCH transmission methods in Rel-15/16 are methods in consideration of a single TRP, transmission beam, transmission precoder, resource allocation, and power control parameters may use the same values for each repeated transmission. However, when repeated PUSCH transmission in consideration of multiple TRPs is performed, each repeated PUSCH transmission to multiple TRPs may be configured via higher layer signaling, or different parameters for respective TRPs may be applied to PUSCH transmission-related parameters indicated via DCI.

For example, if multiple TRPs exist in different directions from the terminal, a transmission beam or a transmission precoder may be different, and thus a transmission beam or a transmission precoder for each TRP needs to be configured or indicated separately. As another example, if multiple TRPs exist at different distances from the terminal, independent power control schemes between the multiple TRPs and the terminal may be required, and therefore different time/frequency resource allocation may be performed. For example, a relatively small number of RBs and a large number of symbols may be allocated to a TRP existing at a relatively long distance compared to a specific TRP in order to increase power per RE. Therefore, in order to transfer different information applied to each TRP to the terminal separately via one piece of DCI, a bit length of the DCI may be very large, and it may be thus more efficient to indicate repeated PUSCH transmission to the terminal via multiple pieces of DCI.

The terminal may report that the method of multi-DCI-based repeated PUSCH transmission in consideration of multiple TRPs is possible, to the base station via a UE capability report. The base station may use, for the terminal having reported corresponding UE capability (e.g., UE capability of supporting multi-DCI-based repeated PUSCH transmission in consideration of multiple TRPs), configuration via higher layer signaling, indication via L1 signaling, or configuration and indication via a combination of higher layer signaling and L1 signaling, so as to notify, via multiple pieces of DCI, the terminal to perform repeated PUSCH transmission in consideration of multiple TRPs. The base station may use a method of configuring or indicating multi-DCI-based repeated PUSCH transmission in consideration of multiple TRPs, as follows.

When multi-DCI-based repeated PUSCH transmission in consideration of multiple TRPs is performed, the terminal may expect that time/frequency resource allocation information indicated via respective DCI is different in consideration of TRPs located at different distances from the terminal.

The terminal may report, as UE capability to the base station, whether different time/frequency resources can be allocated. The base station may configure, for the terminal, whether different time/frequency resources are allocated, via higher layer signaling, and the terminal having received the configuration may expect that time/frequency resource allocation information to be indicated via respective DCI is different. In this case, multi-DCI-based repeated PUSCH transmission in consideration of multiple TRPs may be configured for or indicated to the terminal by the base station in consideration of the higher layer signaling configuration and conditions between multiple DCI fields. When transmission beam and transmission precoder information are indicated via multiple pieces of DCI, the terminal may first apply an SRI and a TPMI in first-received DCI when a transmission beam mapping method is applied, and may secondly apply an SRI and a TPMI in second-received DCI when the transmission beam mapping method is applied.

The base station may configure CORESETPoolIndex, which is higher layer signaling, for the terminal for each CORESET, and when receiving a CORESET, the terminal may identify, via CORESETPoolIndex, a TRP from which the corresponding CORESET is transmitted. For example, if CORESETPoolIndex is configured to 0 with respect to CORESET #1 and CORESETPoolIndex is configured to 1 in CORESET #2, the terminal may identify that CORESET #1 is transmitted from TRP #0 and CORESET #2 is transmitted from TRP #1. Indicating a repeated PUSCH by DCI transmitted via each CORESET, in which CORESETPoolIndex values are configured to 0 and 1 respectively, may be implicitly indicated by conditions between specific fields in transmitted multiple pieces of DCI. For example, if HARQ process number field values in multiple pieces of DCI transmitted to the terminal by the base station are the same, and NDI field values are also the same, the terminal may implicitly consider that the multiple pieces of DCI are for scheduling of PUSCHs repeated in consideration of multiple TRPs, respectively.

If the HARQ process number field values are the same, and the NDI field values are also the same, there may be restrictions on reception of multiple pieces of DCI. For example, a maximum interval between receptions of the multiple pieces of DCI may be defined to be within the number of one or more specific slots or within the number of one or more specific symbols. In this case, the terminal may perform PUSCH transmission based on an obtained (or identified) minimum transport block size, based on time/frequency resource allocation information indicated differently in multiple pieces of DCI.

5-3$^{rd}$ Embodiment: Method of Repeated PUSCH Transmission of Configured Grant in Consideration of Multiple TRPs As an embodiment of the disclosure, the 5-3$^{rd}$ embodiment describes a method of repeated PUSCH transmission of configured grant in consideration of multiple TRPs. The terminal may report, as UE capability to the base station, whether repeated PUSCH transmission of configured grant in consideration of multiple TRPs is performed. The base station may use, for repeated PUSCH transmission of configured grant in consideration of multiple TRPs, the following various methods so as to perform, for the terminal, configuration via higher layer signaling, indication via L1 signaling, or configuration and indication using a combination of higher layer signaling and L1 signaling.

[Method 1] Single DCI-Based Single Configured Grant Configuration Activation

Method 1 is a method of indicating multiple SRIs or TPMIs to the terminal, based on a single piece of DCI, and activating a single configured grant configuration along with the indication. A method of indicating multiple SRIs or TPMIs via a single piece of DCI may follow the method in the 5-1$^{st}$ embodiment, and if only one configured grant configuration exists in the terminal, all bits of a HARQ process number field and a redundancy version field in corresponding DCI may be indicated as 0.

If multiple configured grant configurations exist in the terminal, and one of the configurations is activated by corresponding DCI, an HARQ process number field in the DCI may indicate an index of the configured grant configuration, and all bits of a redundancy version field are indicated as 0. The terminal may use multiple SRIs or TPMIs indicated via a single piece of DCI, to map a transmission beam and a transmission precoder to each activated repeated PUSCH transmission of configured grant according to a transmission beam mapping method.

[Method 2] Multi-DCI-Based Single Configured Grant Configuration Activation

Method 2 is a method of indicating respective SRIs or TPMIs to the terminal, based on the multiple pieces of DCI, and activating a single configured grant configuration along with the indication. A method of indicating respective SRIs or TPMIs based on multiple pieces of DCI may follow the method in the 5-2$^{nd}$ embodiment, and if only one configured grant configuration exists in the terminal, all bits of a HARQ process number field and a redundancy version field in the multiple pieces of DCI may be indicated as 0.

If multiple configured grant configurations exist in the terminal, and one of the configurations is activated by corresponding multiple pieces of DCI, all HARQ process number fields in the multiple pieces of DCI may indicate an index of the same configured grant configuration, and all bits of all redundancy version fields in the multiple pieces of DCI may be indicated as 0. According to conditions of DCI fields during multi-DCI-based repeated PUSCH transmission, an NDI field in addition to the HARQ process number field may also have the same value. The terminal may use multiple SRIs or TPMIs indicated by multiple pieces of DCI, to map a transmission beam and a transmission precoder to each activated repeated PUSCH transmission of configured grant according to a transmission beam mapping method. For example, if information relating to a transmission beam and a transmission precoder indicated by first-received DCI is SRI #1 and TPMI #1, if information relating to a transmission beam and a transmission precoder indicated by second-received DCI is SRI #2 and TPMI #2, and if a transmission beam mapping scheme configured via higher layer signaling is cyclical, the terminal may perform PUSCH transmission by applying SRI #1 and TPMI #1 to odd-numbered transmission (1, 3, 5, . . . ) of activated repeated PUSCH transmission of configured grant and applying SRI #2 and TPMI #2 to even-numbered transmission (2, 4, 6, . . . ) of the repeated transmission.

[Method 3] Multi-DCI-Based Multi-Configured Grant Configuration Activation

Method 3 is a method of indicating respective SRIs or TPMIs to the terminal, based on multiple pieces of DCI, and activating multiple configured grant configuration along with the indication. A method of indicating respective SRIs or TPMIs based on multiple pieces of DCI may follow the method in the 5-2$^{nd}$ embodiment, and if multiple configured grant configurations exist in the terminal, indexes of the respective configured grant configurations may be indicated via HARQ process number fields in respective DCI. All bits of all redundancy version fields in the multiple pieces of DCI may be indicated as 0. According to conditions of DCI fields during multi-DCI-based repeated PUSCH transmission, an NDI field in addition to the HARQ process number field may also have the same value.

The terminal may receive MAC-CE signaling indicating (commanding) connections between multiple configured grant configurations activated by multiple pieces of DCI. The terminal may receive multiple pieces of DCI from the base station 3 ms after performing HARQ-ACK transmission for MAC-CE signaling, and if configured grant configuration indexes indicated by respective pieces of DCI match indexes of the configured grant configurations, in which connections therebetween have been indicated (commanded) via the MAC-CE signaling, the terminal may perform repeated PUSCH transmission in consideration of multiple TRPs, based on the indicated configured grant configurations. In this case, some configurations may be shared with the same value between the connected multiple configured grant configurations. For example, repK which is higher layer signaling indicating the number of repeated transmissions, repK-RV which is higher layer signaling indicating the order of redundancy version during repeated transmission, and periodicity which is higher layer signaling indicating a period of repeated transmission may be configured to have the same value within the connected configured grant configurations.

5-4$^{th}$ Embodiment: Method of Configuring an SRS Resource Set for Repeated PUSCH Transmission in Consideration of Multiple TRPs>

As an embodiment of the disclosure, the 5-4$^{th}$ embodiment describes a method of configuring an SRS resource set for repeated PUSCH transmission in consideration of multiple TRPs. A power control parameter of an SRS (e.g., alpha, p0, pathlossReferenceRS, srs-PowerControlAjdustmentStates, etc. which may be configured via higher layer signaling) may vary for each SRS resource set. Therefore, when repeated PUSCH transmission in consideration of multiple TRPs is performed, the number of SRS resource sets is increased to two or more for different SRS power control for each TRP, and different SRS resource sets may be used for the purpose of supporting different TRPs. The method of configuring an SRS resource set considered in the embodiment may be applied to the 5-1$^{st}$ embodiment to the 5-3$^{rd}$ embodiment.

When single DCI-based repeated PUSCH transmission in consideration of multiple TRPs is performed, multiple SRIs indicated via a single piece of DCI may be selected from among SRS resources existing in different SRS resource sets. For example, if a single piece of DCI indicates two SRIs, a first SRI may be selected from SRS resource set #1, and a second SRI may be selected from SRS resource set #2.

When multi-DCI-based repeated PUSCH transmission in consideration of multiple TRPs is performed, SRIs indicated by two pieces of DCIs respectively may be selected from among SRS resources existing different SRS resource sets, and each SRS resource set may be explicitly or implicitly connected (corresponding) to higher layer signaling (e.g., CORESETPoolIndex) which refers to each TRP. As an explicit connection method, the base station may configure a CORESETPoolIndex value within the configuration of the SRS resource set configured via a higher layer, so as to notify the terminal of a semi-static connection state between a CORESET and the SRS resource set.

As another example, as a more dynamic explicit connection method, a MAC-CE which activates a connection between a specific CORESET (including both a case where a value of CORESETPoolIndex is configured to 0 or 1, and a case where the value is not configured) and an SRS resource set may be used. After receiving the MAC-CE which activates a connection between a specific CORESET (including both a case where a value of CORESETPoolIndex is configured to 0 or 1, and a case where the value is not configured) and an SRS resource set, the terminal may consider that the connection between the CORESET and the SRS resource set is activated from 3 ms after transmission of the HARQ-ACK.

An implicit method is a method of assuming an implicit connection state by using a specific criterion between CORESETPoolIndex and an index of the SRS resource set. For example, if it is assumed that the terminal receives both SRS resource sets #0 and #1, the terminal may assume that CORESETs in which CORESETPoolIndex is not configured or is configured to 0 are connected to SRS resource set #0, and may assume that SRS resource set #1 is connected to a CORESET in which CORESETPoolIndex is configured to 1.

For the aforementioned single DCI or multi-DCI-based methods, the terminal having been explicitly or implicitly configured or indicated for connections between different SRS resource sets and respective TRPs may expect that sameAsFci2 is configured for an srs-PowerControlAdjustmentStates value configured via higher layer signaling within respective SRS resource sets, and may not expect configuration to separateClosedLoop. The terminal may also expect that usage configured via higher layer signaling within each SRS resource set is configured to be the same, such as codebook or noncodebook.

5-5$^{th}$ Embodiment; Dynamic Switching Method of Determining Codebook-Based PUSCH Transmission in Consideration of a Single TRP or PUSCH Transmission in Consideration of Multiple TRPs As an embodiment of the disclosure, the 5-5$^{th}$ embodiment describes a dynamic switching method of determining codebook-based PUSCH transmission in consideration of a single TRP or PUSCH transmission in consideration of multiple TRPs.

According to the 5-1$^{th}$ embodiment and the 5-4$^{th}$ embodiment, the base station may receive a UE capability report from a terminal capable of performing codebook-based repeated PUSCH transmission in consideration of multiple TRPs based on a single piece of DCI, and may transmit, to the terminal, higher layer signaling for transmitting repeated PUSCH transmission via multiple TRPs. In this case, as in the 5-4$^{th}$ embodiment, when single DCI-based repeated PUSCH transmission in consideration of multiple TRPs is performed, the base station may transmit, to the terminal, a single piece of DCI including multiple SRI fields in order to indicate SRS resources existing in different SRS resource sets. Each of the multiple SRI fields may be interpreted in the same way as in NR Release 15/16. More specifically, in a first SRI field, an SRS resource selected from a first SRS resource set may be indicated, and in a second SRI field, an SRS resource selected from a second SRS resource set may be indicated.

Similar to multiple SRI fields, in order to perform repeated PUSCH transmission in consideration of multiple TRPs, the base station may transmit, to the terminal, a single piece of DCI including multiple TPMI fields so that TPMIs corresponding to SRS resources indicated by SRI fields may be selected respectively. The multiple TPMI fields may be indicated via the same DCI as that including the aforementioned multiple SRI fields. Multiple TPMIs to be used during repeated PUSCH transmission to respective TRPs may be selected via the following methods using multiple TPMI fields.

[Method 1] Each TPMI field may be interpreted in the same way as in NR Release 15/16. For example, a first TPMI field may indicate a TPMI index and layer information for an SRS resource indicated by a first SRI field, and a second TPMI field may indicate a TPMI index and layer information for an SRS resource indicated by a second SRI field. The first TPMI field and the second TPMI field may indicate the same layer information.

[Method 2] A first TPMI field may indicate a TPMI index and layer information for an SRS resource indicated by a first SRI field in the same way as in NR Release 15/16. On the contrary, since a second TPMI field is to select a TPMI index for the same layer as that indicated by the first TPMI field, layer information may not be indicated, and TPMI index information for an SRS resource indicated by a second SRI field may be indicated.

When multiple TPMIs are selected via method 2, a bit length of the second TPMI field may be shorter than that of the first TPMI field. This is because the second TPMI field indicates one value (index) among TPMI index candidates that are the same as the layer indicated by the first TPMI field, and accordingly, layer information may not be indicated.

The terminal may receive a single piece of DCI including multiple SRI fields and multiple TPMI fields, and may support, based thereon, a dynamic switching method of determining repeated PUSCH transmission in consideration of multiple TRPs or repeated PUSCH transmission in consideration of a single TRP. The terminal may support dynamic switching by using a reserved value having no meaning at all from among values that multiple TPMI fields or SRI fields, which are included in the received DCI, may have.

For example, if a bit length of the SRI field is 2 bits, a total of 4 cases may be expressed, and each expressible case may be defined as a codepoint. If 3 codepoints out of a total of 4 codepoints have a meaning of indicating an SRI to be indicated, and one remaining codepoint does not have any meaning, this codepoint may be referred to as a codepoint indicating a reserved value (In the following description, a codepoint indicating a reserved value may be expressed that the codepoint has been configured to reserved). More specific descriptions may be provided via contents to be described later.

In order to describe, using a specific example, a dynamic switching method in which multiple TPMI fields are supportable via a reserved value, a case in which the number of PUSCH antenna ports is 4 is assumed. It is assumed that a first TPMI field is configured by 6 bits, higher layer parameter codebookSubset is configured to fullyAndPartialAndNonCoherent, and indication is performed in the same way as in NR Release 15/16. In this case, in the first TPMI field, indexes 0 to 61 may be configured to indicate valid TPMI indexes and layer information, and indexes 62 and 63 may be configured to reserved. If a second TPMI field includes only TPMI index information excluding layer information, as in method 2, the second TPMI field may indicate only a TPMI index of a case where a layer for PUSCH transmission is limited to one value (e.g., one value among 1 to 4) according to the first TPMI field.

The number of bits of the second TPMI field may be configured based on the number of bits capable of expressing a layer with the largest number of candidates among TPMI index candidates configurable for each layer. For example, according to an example in which candidates of layer 1 are 0 to 27, candidates of layer 2 are 0 to 21, candidates of layer 3 are 0 to 6, and candidates of layer 4 are 0 to 4, layer 1 has the largest number of candidates. Therefore, the number of bits in the second TPMI field may be configured to 5 according to the number of TPMI index candidates of layer 1.

When specifically describing the configuration of the second TPMI field, if the first TPMI field indicates layer 1 and a TPMI index according thereto, the terminal may interpret the second TPMI field as a codepoint indicating one value among TPMI indexes 0 to 27 for layer 1 and a codepoint indicating a reserved value.

For example, if the first TPMI field indicates layer 2 and a TPMI index according thereto, the terminal may interpret the second TPMI field as a codepoint indicating one value among TPMI indexes 0 to 21 for layer 2 and a codepoint indicating a reserved value.

For example, also in a case where the first TPMI field indicates layer 3 or layer 4 and a TPMI index according thereto, the terminal may interpret the second TPMI field in a similar manner to the above.

In this case, if two or more codepoints indicating a reserved value exist in the second TPMI field in addition to a codepoint indicating a TPMI index, two codepoints indicating a reserved value may be used to indicate dynamic switching. That is, among codepoints of the second TPMI field configured by 5 bits, a second from the last codepoint (i.e., a 31st codepoint in the example) corresponding to a codepoint indicating a reserved value may be used to indicate repeated PUSCH transmission in consideration of a single TRP with respect to a first TRP, and the last codepoint (i.e., a 32nd codepoint in the example) may be used to indicate repeated PUSCH transmission in consideration of a single TRP with respect to a second TRP. TPMI index information and layer information for repeated PUSCH transmission in consideration of a single TRP may be indicated to the terminal via the first TPMI field. The assumption as described above is for convenience of description, and the disclosure is not limited thereto.

For convenience of explanation, when generalizing the above specific examples for two TRPs, the terminal may receive a single piece of DCI including two SRI fields and two TPMI fields, and may perform dynamic switching according to a codepoint indicated by a second TPMI field. If a codepoint of the second TPMI field indicates a TPMI index for a layer indicated by a first TPMI field, the terminal may perform repeated PUSCH transmission in consideration of multiple TRPs. If the second TPMI field indicates a second from the last codepoint corresponding to a codepoint indicating a reserved value, the terminal may perform repeated PUSCH transmission in consideration of a single TRP with respect to TRP 1, and may identify, from the first TPMI field, TPMI index information and layer information for codebook-based PUSCH transmission. If the second TPMI field indicates the last codepoint corresponding to a codepoint indicating a reserved value, the terminal may perform repeated PUSCH transmission in consideration of a single TRP with respect to TRP 2, and may identify, from the first TPMI field, TPMI index information and layer information for codebook-based PUSCH transmission.

The aforementioned example has described a method of using, to indicate dynamic switching, two reserved codepoints in the last codepoint of the second TPMI field, but the embodiment is not limited thereto. That is, dynamic switching may be indicated using codepoints indicating two different reserved values of the second TPMI field, repeated PUSCH transmission in consideration of a single TRP with respect to TRP 1 or repeated PUSCH transmission in consideration of a single TRP with respect to TRP 2 may be mapped to codepoints indicating the respective reserved values so as to be indicated.

The aforementioned example describes a case where the second TPMI field is determined by method 2, but even when the second TPMI field is determined in the same manner as in NR Release 15/16 as in method 1, dynamic switching may be supported using reserved codepoints of TPMI in the same manner as shown in the aforementioned example.

For example, if the number of codepoints indicating a reserved value in the second TPMI field is less than 2, the number of bits of the second TPMI field is increased by 1, and a second from the last codepoint and the last codepoint may be used to support dynamic switching, based on the increased number of bits.

When two TPMI fields are determined as in method 1, a method of supporting dynamic switching may be additionally considered depending on whether each TPMI field is indicated as a codepoint indicating a reserved value. That is, if the first TPMI field is indicated as a codepoint indicating a reserved value, the terminal may perform repeated PUSCH transmission in consideration of a single TRP with respect to TRP 2, and if the second TPMI field is indicated as a codepoint indicating a reserved value, the terminal may perform repeated PUSCH transmission in consideration of a single TRP with respect to TRP 1. If two TPMI fields both indicate a codepoint for TPMI instead of a codepoint indicating a reserved value, the terminal may perform repeated PUSCH transmission in consideration of multiple TRPs. If no codepoint having a reserved value exists, the number of bits of the TPMI field is increased by 1, and the last codepoint may be used to support dynamic switching, based on the increased number of bits.

As another method of supporting dynamic switching, dynamic switching may be indicated via two SRI fields, and the terminal may identify, from two TPMI fields, TPMI index information and layer information for repeated PUSCH transmission in consideration of a single TRP or for repeated PUSCH transmission in consideration of multiple TRPs. If one or more codepoints indicating a reserved value exist in each SRI field, dynamic switching may be supported according to whether a corresponding SRI field indicates a codepoint indicating a reserved value.

If a first SRI field indicates a codepoint indicating a reserved value, and a second SRI field indicates an SRS resource of a second SRS resource set, the terminal may perform repeated PUSCH transmission in consideration of a single TRP with respect to TRP 2. In this case, the terminal may identify TPMI index information and layer information from a first TPMI field in order to perform repeated PUSCH transmission in consideration of a single TRP with respect to TRP 2.

If the second SRI field indicates a codepoint indicating a reserved value, and the second SRI field indicates the SRS resource of the second SRS resource set, the terminal may perform repeated PUSCH transmission in consideration of a single TRP with respect to TRP 1. In this case, the terminal may identify TPMI index information and layer information from a first TPMI field in order to perform repeated PUSCH transmission in consideration of a single TRP with respect to TRP 1.

If two SRI fields both indicate an SRS resource of each SRS resource set instead of a codepoint indicating a reserved value, the terminal may perform repeated PUSCH transmission in consideration of multiple TRPs. The terminal may identify TPMI index information and layer information from the first TPMI field in order to perform repeated PUSCH transmission with respect to TRP 1, and may identify TPMI index information from the second TPMI index in order to perform repeated PUSCH transmission with respect to TRP 2. When repeated PUSCH transmission is performed with respect to TRP 1 and TRP 2, the layers may be configured to be the same.

If no codepoint indicating a reserved value exists in two SRI fields, the number of bits of each SRI field is increased by 1, and the last codepoint among codepoints indicating a reserved value may be used to support dynamic switching, based on the increased number of bits.

5-6th Embodiment; Dynamic Switching Method of Determining Non-Codebook-Based PUSCH Transmission in Consideration of a Single TRP or PUSCH Transmission in Consideration of Multiple TRPs As an embodiment of the disclosure, the 5-6th embodiment describes a dynamic switching method of determining non-codebook-based PUSCH transmission in consideration of a single TRP or PUSCH transmission in consideration of multiple TRPs.

According to the 5-1st embodiment and the 5-4th embodiment, the base station may receive a UE capability report from a terminal capable of performing non-codebook-based repeated PUSCH transmission in consideration of multiple TRPs based on a single piece of DCI, and may transmit, to the terminal, higher layer signaling for transmitting repeated PUSCH transmission via multiple TRPs. In this case, as in the 5-4th embodiment, when single DCI-based repeated PUSCH transmission in consideration of multiple TRPs is performed, the base station may transmit, to the terminal, a single piece of DCI including multiple SRI fields in order to indicate SRS resources existing in different SRS resource sets. Multiple SRI fields may be selected according to the following methods.

In one example of Method 1, each SRI field may be selected in the same way as in NR Release 15/16. For example, a first SRI field may indicate an SRS resource for PUSCH transmission in a first SRS resource set, and a second SRI field may indicate an SRS resource for PUSCH transmission in a second SRS resource set. The first SRI field and the second SRI field may indicate the same layer information.

In one example of Method 2, a first SRI field may indicate SRS resource(s) for PUSCH transmission in a first SRS resource set in the same way as in NR Release 15/16. A second SRI field may indicate SRS resource(s) for PUSCH transmission in a second SRS resource set for the same layer as that indicated by the first SRI field.

When multiple SRI fields are selected via method 2, a bit length of the second SRI field may be shorter than that of the first SRI field. This is because a second SRI is determined from among SRI candidates for the same layer as that determined by the first SRI field from among SRI candidates for all supportable layers.

The terminal may receive a single piece of DCI including multiple SRI fields, and may support, based thereon, a dynamic switching method of determining repeated PUSCH transmission in consideration of multiple TRPs or repeated PUSCH transmission in consideration of a single TRP. The terminal may support dynamic switching by using codepoints indicating a reserved value in multiple SRI fields included in the received DCI.

In order to describe, as a specific example, a dynamic switching method supportable via codepoints indicating a reserved value in multiple SRI fields, it is assumed that the maximum number of PUSCH antenna ports is 4 and the number of SRS resources in each SRS resource set is 4. It is assumed that the first SRI field is configured by 4 bits, and indication is performed in the same way as in NR Release 15/16. In this case, in a first SRI area, indexes 0 to 14 may be configured to indicate a layer according to a selected SRS resource and an SRS resource for repeated PUSCH transmission, and index 15 may be configured to a codepoint indicating a reserved value. If the second SRI field selects the same number of SRS resources as the number of layers indicated by the first SRI as in method 2, the second SRI field may indicate an SRS resource selection candidate of a case in which a layer for PUSCH transmission is limited to one value (e.g., a value among 1 to 4) according to the first SRI field.

The number of bits of the second SRI field may be configured based on a layer having the largest number of candidates among the number of SRS resource selection candidates for each layer. For example, an SRI field value indicating an SRS resource selection candidate for layer 1 may be 0 to 3 and may have a total of 4 candidates, an SRI field value indicating an SRS resource selection candidate for layer 2 may be 4 to 9 and may have a total of 6 candidates, an SRI field value indicating an SRS resource selection candidate for layer 3 may be 10 to 13 and may have a total of 4 candidates, and an SRI field value indicating an SRS resource selection candidate for layer 4 may be 14 and may have a total of 1 candidate. In this case, the number of candidates for layer 2 has a largest value with a total of 6, and the number of bits of the second SRI field may be thus configured to 3 according to the number of SRS field candidates for layer 2.

When specifically describing the configuration of the second SRI field, if the first SRI field indicates an SRI value of a case where a layer for PUSCH transmission is 1, the terminal may interpret the second SRI field as a codepoint indicating one value among SRI candidates 0 to 3 for layer 1 or a codepoint having a reserved value other than the one value.

For example, if the first SRI field indicates an SRI value of a case where the layer for PUSCH transmission is 2, the terminal may interpret the second SRI field as a codepoint indicating one value among SRI candidates 0 to 5 for layer 2 and a codepoint having a reserved value other than the one value.

For example, also when the first SRI field indicates an SRI value of a case where the layer for PUSCH transmission is 3 or 4, the terminal may interpret the second SRI field in a similar manner.

In this case, if two or more codepoints indicating a reserved value exist in the second SRI field in addition to a codepoint indicating an SRI index according to a layer, two codepoints indicating a reserved value may be used to indicate dynamic switching. That is, among codepoints of the second SRI field configured by 3 bits, a second from the last codepoint (i.e., a 7th codepoint in the example) corresponding to a codepoint indicating a reserved value may be used to indicate repeated PUSCH transmission in consideration of a single TRP to with respect to first TRP, and the last codepoint (i.e., an 8th codepoint in the example) may be used to indicate repeated PUSCH transmission in consideration of a single TRP with respect to a second TRP. In this case, an SRI for repeated PUSCH transmission in consideration of a single TRP may be indicated to the terminal via the first SRI field. The assumption as described above is for convenience of description, and the disclosure is not limited thereto.

For convenience of explanation, when generalizing the above specific examples for two TRPs, the terminal may receive a single piece of DCI including two SRI fields, and may perform dynamic switching according to a codepoint indicated by a second SRI field. If a codepoint of the second SRI field indicates an SRI value for a layer indicated by a first SRI field, the terminal may perform repeated PUSCH transmission in consideration of multiple TRPs. If the second SRI field indicates a second from the last codepoint corresponding to a codepoint indicating a reserved value, the terminal may perform repeated PUSCH transmission in consideration of a single TRP with respect to TRP 1, and may identify, from the first SRI field, an SRI for non-codebook-based PUSCH transmission. If the second SRI field indicates the last codepoint corresponding to a codepoint indicating a reserved value, the terminal may perform repeated PUSCH transmission in consideration of a single TRP with respect to TRP 2, and may identify, from the first SRI field, an SRI for non-codebook-based PUSCH transmission.

The aforementioned example has described a method of using, to indicate dynamic switching, codepoints indicating two reserved values in the last codepoint of the second SRI field, but the embodiment is not limited thereto. That is, dynamic switching may be indicated using codepoints indicating two different reserved values of the second SRI field, repeated PUSCH transmission in consideration of a single TRP with respect to TRP 1 or repeated PUSCH transmission in consideration of a single TRP with respect to TRP 2 may be mapped to codepoints indicating the respective reserved values so as to be indicated.

The aforementioned example describes a case where the second SRI field is determined by method 2, but even when the second SRI field is determined in the same manner as in NR Release 15/16 as in method 1, dynamic switching may be supported using a codepoint indicating a reserved value in the SRI field in the same manner as shown in the aforementioned example.

For example, if the number of codepoints indicating a reserved value in the second SRI field is less than 2, the number of bits of the second SRI field is increased by 1, and a second from the last codepoint and the last codepoint may be used to support dynamic switching, based on the increased number of bits.

When two SRI fields are determined as in method 1, a method of supporting dynamic switching may be additionally considered depending on whether each SRI field is indicated as a codepoint indicating a reserved value. That is, if the first SRI field is indicated as a codepoint indicating a reserved value, the terminal may perform repeated PUSCH transmission in consideration of a single TRP with respect to TRP 2, and if the second SRI field is indicated as a codepoint indicating a reserved value, the terminal may perform repeated PUSCH transmission in consideration of a single TRP with respect to TRP 1. If two SRI fields both indicate a codepoint for indicating an SRI instead of a codepoint indicating a reserved value, the terminal may perform repeated PUSCH transmission in consideration of multiple TRPs. If no codepoint indicating a reserved value exists, the number of bits of an SRI area is increased by 1, and the last codepoint may be used to support dynamic switching, based on the increased number of bits.

Figure 17A:
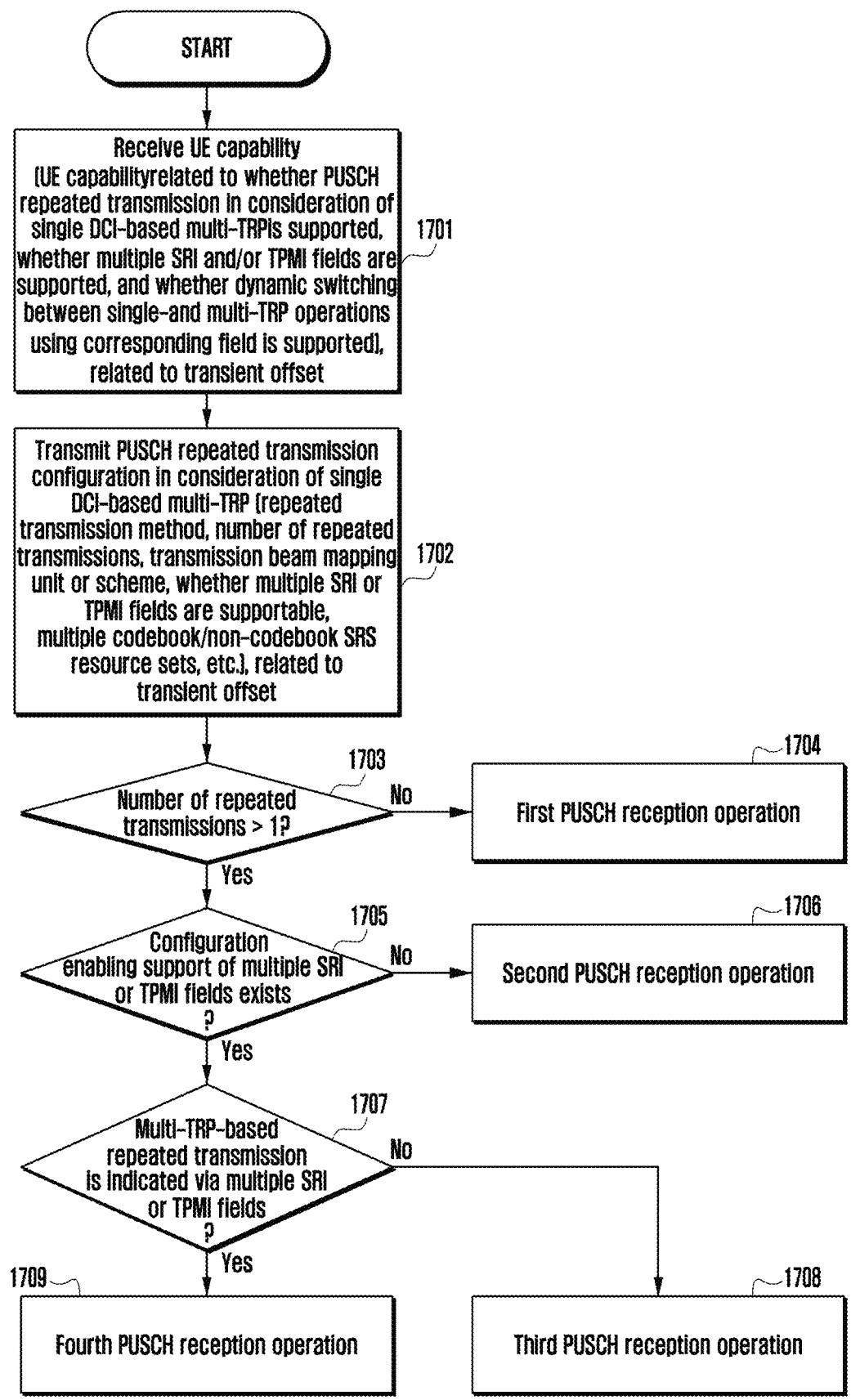
FIG. 17A illustrates operations of a base station and a terminal for repeated PUSCH transmission in consideration of single DCI transmission-based multi-TRP in which multiple SRS resource indicator (SRI) or TPMI fields exist, according to an embodiment of the present disclosure.
Figure 17B:
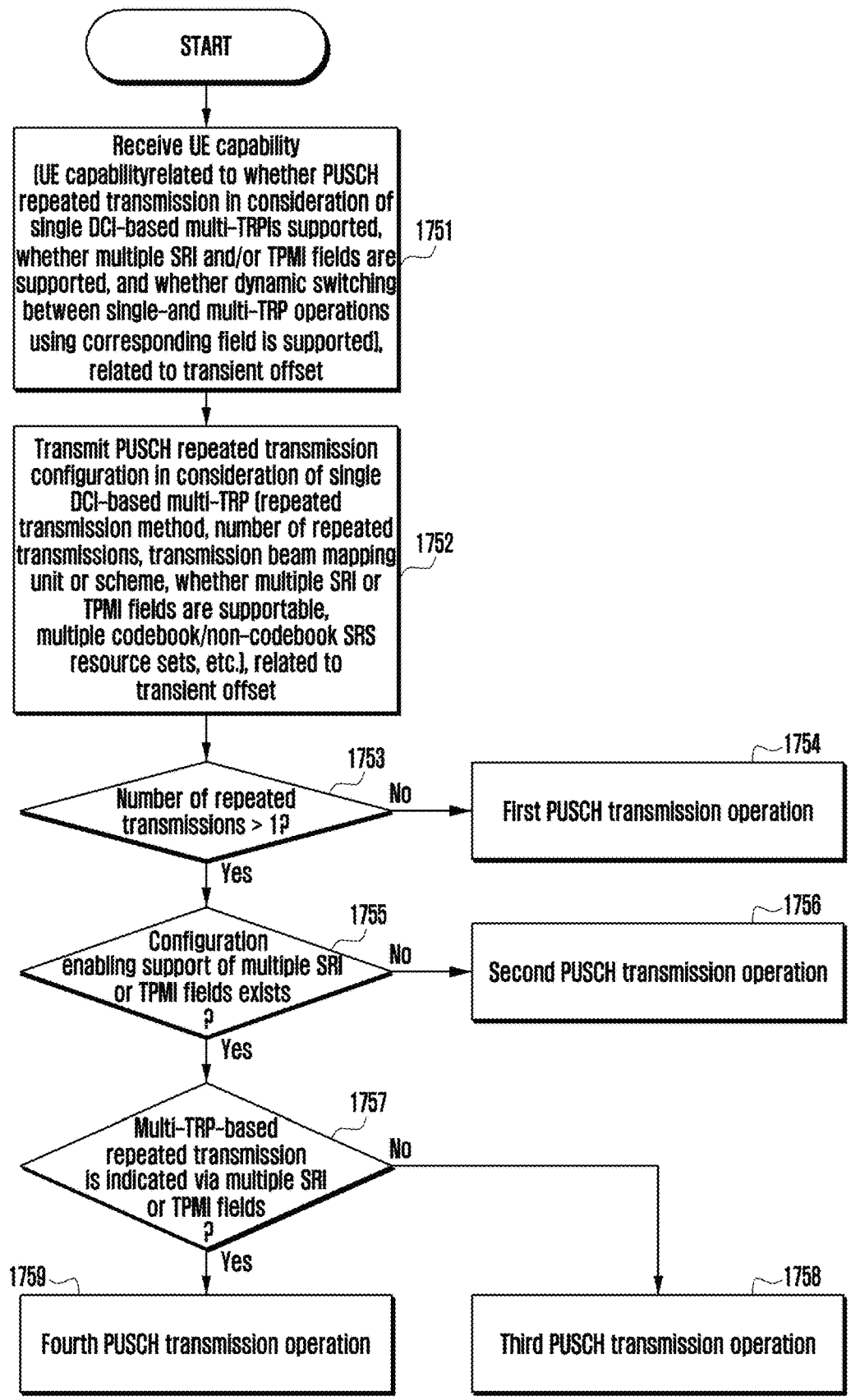
FIG. 17B illustrates operations of a base station and a terminal for repeated PUSCH transmission in consideration of single DCI transmission-based multi-TRP in which multiple SRS resource indicator (SRI) or TPMI fields exist, according to an embodiment of the present disclosure.

FIG. 17A and FIG. 17B illustrates operations of a base station and a terminal for single DCI transmission-based repeated PUSCH transmission in consideration of multiple TRPs, in which multiple SRI or TPMI fields exist, according to an embodiment of the present disclosure. The terminal may perform 1751 UE capability reporting for whether single DCI-based repeated PUSCH transmission in consideration of multiple TRPs is supported, whether multiple SRI or TPMI fields are supported, whether dynamic switching between single/multi-TRP operations using corresponding fields is supported, and information on a transient offset when a transmission beam is changed.

The base station having received 1701 the UE capability report transmits 1702, to the terminal, a configuration of single DCI-based repeated PUSCH transmission in consideration of multiple TRPs. In this case, transmitted configuration information may include a repeated transmission method, the number of repeated transmissions, a transmission beam mapping unit or scheme, whether multiple SRI or TPMI fields are supportable, multiple codebook or non-codebook SRS resource sets, information on a transient offset when a transmission beam is changed, and the like.

The terminal having received 1752 the corresponding configuration may have been configured via higher layer signaling, or may identify the number of repeated PUSCH transmissions via a time resource allocation field in DCI. If the number of repeated transmissions is not greater than one 1753, i.e., if no repeated transmission is performed, the terminal may perform a first PUSCH transmission operation 1754. The first PUSCH transmission operation may be an operation of single PUSCH transmission to a single TRP by using one SRI field and one TPMI field in a case of codebook-based PUSCH transmission and by using one SRI field in a case of non-codebook-based PUSCH transmission, that is, by using one transmission beam.

If the number of repeated transmissions is greater than two 1753, if the terminal has not received 1755 a configuration enabling support of multiple SRI or TPMI fields from the base station, the terminal may perform a second PUSCH transmission operation 1756. The second PUSCH transmission operation is an operation of repeated PUSCH transmission to a single TRP by using one SRI field and one TPMI field in a case of codebook-based PUSCH transmission and by using one SRI field in a case of non-codebook-based PUSCH transmission, that is, by using one transmission beam.

If the terminal has received 1755 a configuration enabling support of multiple SRI or TPMI fields from the base station, and if multiple SRI or TPMI fields in the DCI that the terminal has received indicate 1757 a codepoint referring to single TRP-based repeated transmission as described in the 5-5th and 5-6th embodiments, instead of indicating a codepoint referring to multi-TRP-based repeated transmission, the terminal may perform a third PUSCH transmission operation 1758. The third PUSCH transmission operation is a terminal operation of repeated PUSCH transmission to a specific single TRP via a codepoint indicating single-TRP transmission from among codepoints in each field, that is, by using one transmission beam, while using two SRI fields and two TPMI fields in a case of codebook-based PUSCH transmission and using two SRI fields in a case of non-codebook-based PUSCH transmission. Therefore, repeated transmission to a first or a second TRP may be indicated according to codepoints indicated via multiple SRT or TPMI fields.

If the terminal has received 1755 a configuration enabling support of multiple SRI or TPMI fields from the base station, and if multiple SRI or TPMI fields in the DCI that the terminal has received indicate 1757 a codepoint referring to multi-TRP-based repeated transmission, the terminal may perform a fourth PUSCH transmission operation 1759. The fourth PUSCH transmission operation is a terminal operation of repeated PUSCH transmission to multiple TRPs via a codepoint indicating multi-TRP transmission from among codepoints in each field, that is, by using two transmission beams, while using two SRI fields and two TPMI fields in a case of codebook-based PUSCH transmission and using two SRI fields in a case of non-codebook-based PUSCH transmission.

Sixth Embodiment: Method of TPC Command Indication and Application in Consideration of Multiple TRPs The terminal may increase or decrease power for PUCCH transmission by identifying a configured PUCCH resource and TPC command information indicated by a PDCCH.

The base station may allocate resources of PDSCH #1 and PDSCH #2 by using DCI formats 1_0, 1_1, and 1_2 of PDCCH #1. The base station may use at least one of DCI formats 1_0, 1_1, and 1_2 to indicate a field for allocation of a PDSCH resource transmitted by the base station. The base station may include, in at least one of DCI format 1_0, 1_1, and 1_2, information (e.g., a PRI) indicating a PUCCH resource for transmission of HARQ-ACK/NACK information indicating whether the terminal has successfully received the PDSCH, and information (e.g., TPC command) indicating to control power of the PUCCH resource. In this case, a case in which one PUCCH resource is configured in one slot may be referred to as inter-slot repetition. A case in which multiple PUCCH resources are configured in one slot may be referred to as intra-slot repetition, configuration of one or multiple PUCCH resources in one slot and information on a period thereof may be configured via a higher layer parameter.

HARQ ACK/NACK information transmitted by the terminal may be transmitted via the same encoding on each of repeated PUCCH resources (e.g., PUCCH #1-1 to #1-4, and PUCCH #2-1 to #2-4) configured by the base station. A basic uplink beamforming direction for PUCCH transmission of the terminal, which is configured by the base station, may be determined by various parameters and index values (e.g., PUCCH-PathlossReferenceRS, referenceSignal p0-PUCCH-Id, etc.) in each higher layer parameter PUCCH-SpatialRelationInfo. Various parameters and index values (e.g., PUCCH-PathlossReferenceRS, referenceSignal p0-PUCCH-Id, etc.) included in PUCCH-SpatialRelationInfo may be configured as in Table 31 below.

TABLE 31

| PUCCH-SpatialRelationInfo ::= | SEQUENCE { |
|---|---|
| pucch-SpatialRelationInfoId | PUCCH-SpatialRelationInfoId, |
| servingCellId OPTIONAL, -- Need S | ServCellIndex |
| referenceSignal | CHOICE { |
| ssb-Index | SSB-Index, |
| csi-RS-Index | NZP-CSI-RS-ResourceId, |
| srs | PUCCH-SRS |
| }, | |

TABLE 31-continued

| pucch-PathlossReferenceRS-Id | PUCCH-PathlossReferenceRS-Id, |
|---|---|
| p0-PUCCH-Id | P0-PUCCH-Id, |
| closedLoopIndex | ENUMERATED { i0, i1 } |
| } | |

Hereinafter, a method of higher layer signaling for repeated PUCCH/PUSCH transmission according to an embodiment of the disclosure and a close loop power control method performed based on a higher layer parameter configured via the method will be described in detail.

Method A-1: The base station configures various higher layers for single beamforming direction and power control when the terminal performs uplink (PUCCH) transmission.

Method A-2: The base station configures various higher layers for multiple beamforming directions and power controls when the terminal performs uplink (PUCCH) transmission.

Method A-3: The base station configures various higher layers (and DCI) for single beamforming direction and power control when the terminal performs uplink (PUSCH) transmission.

Method A-4: The base station configures various higher layers (and DCI) for multiple beamforming directions and power controls when the terminal performs uplink (PUSCH) transmission.

As in method A-1 and A-2, when the terminal performs uplink (PUCCH) transmission based on a higher layer configuration, various methods B-1 to B-4 below may be considered together. Separately from method A-1 and method A-2, when uplink (PUSCH) transmission is performed based on a higher layer configuration for a PUSCH as in method A-3 and method A-4, various embodiments of methods B-1 to B-4 below are described together.

In one embodiment of Method B-1, operation of determining power control by the terminal, as in rel-15, using one TPC field in DCI.

In one embodiment of Method B-2, when one TPC field is configured, selectively applying a TPC value, which is indicated to the terminal, to one or multiple PUCCH/PUSCH transmissions.

In one embodiment of Method B-3, when multiple (e.g., two) TPC fields are configured, applying a TPC value, which is indicated to the terminal, to each of multiple PUCCH/PUSCH transmissions.

In one embodiment of Method B-4, configuring one TPC field indicating two TPC values, and applying the TPC values, which are indicated to the terminal, to multiple PUCCH/PUSCH transmissions respectively.

<Method A-1>

For one or more repeated PUCCH configurations, the base station may configure the various parameters and index values (e.g., PUCCH-SpatialRelationInfo, PUCCH-PathlossReferenceRS, referenceSignal p0-PUCCH-Id, closedLoopIndex, etc. of Table 31) as one set or individually within one PUCCH-SpatialRelationInfo via a higher layer. As such, if each parameter is configured to one value instead of multiple values, the terminal may determine that information corresponding to the beamforming direction configured by the base station for PUCCH transmission is the same.

As another example, for one or more repeated PUCCH configurations, the base station may configure the various parameters and index values (e.g., PUCCH-SpatialRelationInfo, PUCCH-PathlossReferenceRS, referenceSignal p0-PUCCH-Id, closedLoopIndex, etc. of Table 31) as one set or individually within one PUCCH-SpatialRelationInfo via a higher layer. As such, if each parameter is configured to one set instead of multiple sets, and a repeated PUCCH resource allocated to correspond to one or repeated PDSCH resources is repeated within one slot or within one sub-slot, the terminal may apply, to the slot or sub-slot, a set of the various parameters and indexes in the one configured PUCCH-SpatialRelationInfo. In addition, if a repeated PUCCH resource allocated to correspond to one or repeated PDSCH resources is repeated within one slot or within one sub-slot, the terminal may apply, to the designated slot or sub-slot, a set of the various parameters and indexes in the one configured PUCCH-SpatialRelationInfo. As another example, even if a repeated PUCCH resource allocated to correspond to one or repeated PDSCH resources is repeated within multiple slots or within multiple sub-slots, the terminal may apply, to the designated slot or sub-slot, a set of the various parameters and indexes in the one configured PUCCH-SpatialRelationInfo.

<Method A-2-1>

For a repeated PUCCH operation based on one set with different beamforming directions, the base station may configure one parameter or index value constituting PUCCH-SpatialRelationInfo-r17. For example, the base station may configure one parameter of pucch-SpatialRelationInfoId via a higher layer as shown in Table 31, and may configure closedLoopIndex corresponding to each of pucch-PathlossReferenceRS-Id and p0-PUCCH-Id to i0 or i1.

For example, a value of pucch-SpatialRelationInfoId may be configured to 1, a value of pucch-PathlossReferenceRS-Id may be configured 1, a value of P0-PUCCH-Id may be configured to 2, and a value of closedLoopIndex may be configured to i0.

In addition, a value of pucch-SpatialRelationInfoId may be configured to 2, a value of pucch-PathlossReferenceRS-Id may be configured 1, and a configuration value of closedLoopIndex may be configured to i1.

In this case, based on a 1-bit value (e.g., 0 or 1) of a closedLoopIndex field included in DCI where a command to execute group common PUCCH-based power control is possible as in DCI format 2_2, the terminal may identify whether i0 has been configured (0) or whether i1 has been configured (1).

<Method A-2-2>

For a repeated PUCCH operation based on one set with different beamforming directions, the base station may configure at least two parameters or index values constituting PUCCH-SpatialRelationInfo-r17.

For example, PUCCH-SpatialRelationInfo-r17 may be configured as in [Table 32] below.

TABLE 32

| | |
|---|---|
| PUCCH-SpatialRelationInfo-r17 ::= | SEQUENCE { |
| pucch-SpatialRelationInfoId1-v17 | PUCCH-SpatialRelationInfoId-v17 |
| servingCellId | ServCellIndex   OPTIONAL, -- Need S |
| referenceSignal | CHOICE { |
|   ssb-Index |   SSB-Index, |
|   csi-RS-Index |   NZP-CSI-RS-ResourceId, |
|   srs |   PUCCH-SRS |
| }, | |
| pucch-SpatialRelationInfoId2-v17 | PUCCH-SpatialRelationInfoId-v17 |
| servingCellId | ServCellIndex   OPTIONAL, -- Need S |
| referenceSignal | CHOICE { |
|   ssb-Index |   SSB-Index, |
|   csi-RS-Index |   NZP-CSI-RS-ResourceId, |
|   srs |   PUCCH-SRS |
| }, | |
| pucch-PathlossReferenceRS-Id1-v17 | PUCCH-PathlossReferenceRS-Id-v17 |
| p0-PUCCH-Id1 | P0-PUCCH-Id, |
| closedLoopIndex1 | ENUMERATED { i0, i1 } |
| pucch-PathlossReferenceRS-Id2-v17 | PUCCH-PathlossReferenceRS-Id-v17 |
| p0-PUCCH-Id2 | P0-PUCCH-Id, |
| closedLoopIndex2 | ENUMERATED { i0, i1 } |
| ... | |
| } | |

As shown in Table 32, each of two parameters pucch-SpatialRelationInfoId1 and pucch-SpatialRelationInfoId2 may be configured via a higher layer. For example, by configuring two parameters pucch-SpatialRelationInfoId1 and pucch-SpatialRelationInfoId2, a parameter and an index value (e.g., pucch-PathlossReferenceRS-Id1, p0-PUCCH-Id1, ClosedLoopIndex1 etc.) corresponding to pucch-SpatialRelationInfoId1 and a parameter and an index value (e.g., pucch-PathlossReferenceRS-Id2, p0-PUCCH-Id2, ClosedLoopIndex2, etc.) corresponding to pucch-SpatialRelationInfoId2 may be configured.

In addition, by combining the parameters with nrofSlots for determination of the number of repeated PUCCH transmissions, the terminal may determine information related to a beamforming direction according to the number of repetitions. For example, if a value of nrofSlots is configured to 2, the terminal may determine that pucch-SpatialRelationInfoId1 is configured as a resource for a first transmitted PUCCH, and pucch-SpatialRelationInfoId2 is configured as a resource for a second transmitted PUCCH.

According to an embodiment of the disclosure, the configuration shown in Table 33 may be considered for a PUCCH operation that is repeated based on one set with different beamforming directions.

TABLE 33

| | |
|---|---|
| PUCCH-Config ::= | SEQUENCE { |
| ... | |
| spatialRelationInfoToAddModList<br>SpatialRelationInfo | SEQUENCE (SIZE (1..maxNrofSpatialRelationInfos)) OF PUCCH- |
| spatialRelationInfoToAddModList2-r17<br>PUCH-SpatialRelationInfo<br>Need N | SEQUENCE (SIZE (1..maxNrofSpatialRelationInfosDiff-r16)) OF<br>OPTIONAL, -- |
| spatialRelationInfoToAddModListExt-r17<br>PUCCH-SpatialRelationInfoExt-r17 | SEQUENCE (SIZE (1..maxNrofSpatialRelationInfos-r16)) OF<br>OPTIONAL, -- Need N |
| ... | |
| SpatialMapping-r17 | ENUMERATED {cyclicMapping, sequenticalMapping}, |
| Repetition-r17 | CHOICE { |
|   pucch-RepType | ENUMERATED {intraSlot, interSlot}, |
| } | |

For a PUCCH operation that is repeated based on one set with different beamforming directions as shown in Table 33, the base station may additionally configure spatialRelation-InfoToAddModListExt in addition to a configuration of spatialRelationInfoToAddModList, or may perform an additional configuration by substituting the configuration of spatialRelationInfoToAddModList with spatialRelationInfoToAddModList2.

When multiple spatialRelationInfo is configured, a mapping relationship between the PUCCH resource and the beamforming direction may be configured as in SpatialMapping of Table 33. For example, if higher layer parameter SpatialMapping is configured to cyclicMapping, the terminal may determine that information related to multiple beamforming directions configured in SpatialRelationInfoToAddMod-List and patialRelationInfoToAddModListExt is configured to be alternately applied. Conversely, if higher layer parameter SpatialMapping is configured to sequenticalMapping, the terminal may determine that information related to multiple beamforming directions configured in SpatialRelationInfoToAddModList and patialRelationInfoToAddModListExt is configured to be sequentially applied.

For example, if a value of nrofSlots is configured to 4, and SpatialMapping is configured to cyclicMapping, the terminal may determine that pucch-SpatialRelationInfoId1 is configured as a resource for a third transmitted PUCCH, and pucch-SpatialRelationInfoId2 is configured as a resource for a fourth transmitted PUCCH.

As another example, if a value of nrofSlots is configured to 4, and SpatialMapping is configured to sequenticalMapping, it may be determined that pucch-SpatialRelationInfoId1 is configured as resources for the first and second transmitted PUCCHs, and pucch-SpatialRelationInfoId2 is configured as resources for the third and fourth transmitted PUCCHs.

<Method A-2-3>

For a PUCCH operation repeated based on one set with different beamforming directions, the base station may configure a parameter by using a MAC CE message in addition to the configuration of PUCCH-SpatialRelationInfo, PUCCH-SpatialRelationInfo-r16, or PUCCH-SpatialRelationInfo-r17. For example, a MAC CE message of FIG. 20 shows a scheme in which PUCCH-SpatialRelationInfo is first configured by default via a higher layer (RRC) according to the aforementioned method A-1 and method A-2, and then is additionally updated via a MAC layer at a later time.

FIG. 20 is a diagram illustrating formats of PUCCH Spatial Relation Activation/Deactivation MAC CE and enhanced PUCCH Spatial Relation Activation/Deactivation MAC CE messages according to an embodiment of the disclosure.

Here, a serving cell ID may refer to an ID of a serving cell to which a terminal is connected, and a BWP ID may refer to a frequency side resource index corresponding to the BWP ID among BWPs corresponding to the serving cell ID. A PUCCH resource ID may indicate a PUCCH resource corresponding to a specific PUCCH ID among PUCCH resources configured in the BWP ID.

Si of 20-00 in FIG. 20 corresponds to i+1 of PUCCH-SpatialRelationInfoId of PUCCH-SpatialRelationInfo configured via RRC, and if a value of a corresponding area is configured to 1, PUCCH-SpatialRelationInfo configured to PUCCH-SpatialRelationInfoId corresponding to Si configured to 1 is activated for a corresponding PUCCH resource.

In order to perform the described operation, a base station may transmit spatial relation info ID 1 and ID 2 indicating pucch-SpatialRelationInfoId configured via the RRC to the terminal, by configuring two S1 areas (S0 and S1) to 1 in 20-00 of FIG. 20 or configuring an MAC CE to enable mapping or reconfiguration to one PUCCH resource ID as shown in 20-20 or 20-25 of FIG. 20. In this case, indicators, such as C0 to CN–2, may be added to indicate whether two spatial relation info IDs are mapped to one PUCCH resource ID, as in 20-20 or 20-25. If C0 is configured to 1, a PUCCH resource matching corresponding PUCCH resource ID 0 is mapped to two PUCCH spatial relation info IDs, and if CN–2 is configured to 0, corresponding PUCCH resource ID N–2 may be mapped to one PUCCH spatial relation info ID.

20-20 or 20-25 is an example of enhanced PUCCH spatial relation activation/deactivation MAC CE, and a position of Ci for indicating whether two spatial relation info IDs are mapped may be located in one area of reserved bits.

If the terminal receives the MAC CE message including spatial relation info ID 1 and spatial relation info ID 2, information relating to multiple beamforming directions configured in the spatial relation information may be alternately or sequentially applied in the order of spatial relation info ID 1 and spatial relation info ID 2 according to cyclicMapping or sequenticalMapping configured via the RRC.

FIG. 20 has been designed in a structure of additionally configuring and changing N–1 PUCCH resource ID(s) at the same time, but if additional configuration and change of spatial relation info ID in PUCCH resource ID(s) is unnecessary, an Oct resource of a corresponding MAC CE may be omitted.

<Method A-3>

For one or more repeated PUSCH configurations, the base station may configure as many SRI-PUSCH-PowerControl as the number of SRI candidates in sri-PUSCH-MappingToAddModeList within PUSCH-PowerControl via a higher layer. SRI-PUSCH-PowerControl may include PUSCH- PathlossReferenceRS-Id indicating PUSCH-PathlossReferenceRS, P0-PUSCH-AlphaSetId indicating P0-PUSCH-AlphaSet in p0-AlphaSets, and a corresponding closed loop index (e.g., i0 or i1). As such, transmission power information included in SRI-PUSCH-PowerControl may be configured via a higher layer with respect to each of SRI candidate values, and if the base station indicates one SRI to the terminal via DCI, the terminal may determine that a PUSCH is transmitted, according to the transmission power information included in SRI-PUSCH-PowerControl having SRI-PUSCH-PowerControlId which has the same value as that of a corresponding SRI. In this case, the terminal may determine that a beamforming direction of the transmitted PUSCH is the same as a beamforming direction in which an SRS resource in an SRS resource set referenced when the base station selects the SRI has been transmitted. Even if a repeated PUSCH resource is repeated within multiple slots or within multiple sub-slots, the terminal may apply, to a designated slot or sub-slot, the various parameters and indexes within the configured one SRI-PUSCH-PowerControl.

<Method A-4-1>

For repeated PUSCH transmission with different beamforming directions, the base station may configure two or more sri-PUSCH-MappingToAddModList (e.g., sri-PUSCH-MappingToAddModList1 or sri-PUSCH-MappingToAddModList2). SRI-PUSCH-PowerControl in each sri-PUSCH-MappingToAddModList may include a transmission power parameter (PUSCH-PathlossReferenceRS-Id, P0-PUSCH-AlphaSetId, and closed loop index) for each beamforming direction, that is, a corresponding TRP. The base station may indicate two or more SRI fields in DCI for scheduling of repeated PUSCH transmissions having different beamforming directions. Alternatively, two srs-ResourceIndicator may be configured in higher layer configuration information for configured grant PUSCH transmission. If two SRI fields are included in DCI, the terminal may determine PUSCH transmission power for TRP 1 by referring to a PUSCH power transmission parameter within SRI-PUSCH-PowerControl, which has the same SRI-PUSCH-PowerControlId as a value indicated by a first SRI field within first sri-PUSCH-MappingToAddModList (e.g., sri-PUSCH-MappingToAddModList1), and may determine PUSCH transmission power for TRP 2 by referring to a PUSCH power transmission parameter within SRI-PUSCH-PowerControl, which has the same SRI-PUSCH-PowerControlId as a value indicated by a second SRI field within second sri-PUSCH-MappingToAddModList (e.g., sri-PUSCH-MappingToAddModList2).

That is, the terminal may determine transmission power of repeated PUSCH transmission performed in each beamforming direction (i.e., each TRP), by using two sri-PUSCH-MappingToAddModList and two SRI fields. In this case, a first SRI field may be determined by the base station by referring to a first SRS resource set among two SRS resource sets in which usage is configured to "codebook" or "nonCodebook," and a second SRI field may be determined by the base station by referring to a second SRS resource set among the two SRS resource sets in which usage is configured to "codebook" or "nonCodebook."

<Method A-4-2>

For repeated PUSCH transmission with different beamforming directions, the base station may configure to include two or more transmission power parameters (e.g., PUSCH-PathlossReferenceRS-Id1, PUSCH-PathlossReferenceRS-Id2, P0-PUSCH-AlphaSetId1, P0-PUSCH-AlphaSetId2, closed loop index1, and closed loop index2) for SRI-PUSCH-PowerControl in one sri-PUSCH-MappingToAddModList. A first transmission power parameter (e.g., PUSCH-PathlossReferenceRS-Id1, P0-PUSCH-AlphaSetId1, and closed loop index1) may be defined as a first beamforming direction, i.e., a transmission power parameter for TRP 1, and a second transmission power parameter (e.g., PUSCH-PathlossReferenceRS-Id2, P0-PUSCH-AlphaSetId2, and closed loop index2) may be defined as a second beamforming direction, i.e., a transmission power parameter for TRP 2. The base station may indicate two or more SRI fields in DCI in order to schedule repeated PUSCH transmissions having different beamforming directions. Alternatively, the base station may configure two srs-ResourceIndicator in higher layer configuration information for configured grant PUSCH transmission.

If DCI includes two SRI fields, the terminal may determine PUSCH transmission power for TRP 1 by referring to a first transmission power parameter (e.g., PUSCH-PathlossReferenceRS-Id1, P0-PUSCH-AlphaSetId1, and closed loop index1) within SRI-PUSCH-PowerControl, which has the same SRI-PUSCH-PowerControlId as a value indicated by a first SRI in sri-PUSCH-MappingToAddModList, and may determine PUSCH transmission power for TRP 2 by referring to a second transmission power parameter (e.g., PUSCH-PathlossReferenceRS-Id2, P0-PUSCH-AlphaSetId2, and closed loop index2) within SRI-PUSCH-PowerControl, which has the same SRI-PUSCH-PowerControlId as a value indicated by a second SRI in sri-PUSCH-MappingToAddModList. That is, the terminal may determine transmission power of repeated PUSCH transmission performed in each beamforming direction (i.e., each TRP) by using two SRI fields and SRI-PUSCH-PowerControl (as many candidates of one SRI as SRI-PUSCH-PowerControl are configured) configured with two sets of transmission power parameters in one sri-PUSCH-MappingToAddModList. The number of candidates for each SRI field may be the same.

Alternatively, if the numbers of candidates of respective SRI fields are different, SRI-PUSCH-PowerControl may be configured according to a larger value among the numbers of candidates of the two fields. In this case, a first SRI field may be determined by the base station by referring to a first SRS resource set among two SRS resource sets in which usage is configured to "codebook" or "nonCodebook," and a second SRI field may be determined by the base station by referring to a second SRS resource set among the two SRS resource sets in which usage is configured to "codebook" or "nonCodebook."

<Method A-4-3>

For repeated PUSCH transmission with different beamforming directions, the base station may configure SRI-PUSCH-PowerControl including an ID of an associated SRS resource set among two SRS resource sets, in which usage is configured to "codebook" or "nonCodebook," in one sri-PUSCH-MappingToAddModList. That is, SRI-PUSCH-PowerControl may include an associated SRS resource set Id in addition to a transmission power parameter (PUSCH-PathlossReferenceRS-Id, P0-PUSCH-AlphaSetId, and closed loop index). In this case, SRI-PUSCH-PowerControl including a first SRS resource set Id among the two SRS resource sets may be defined as a transmission power parameter for a first beamforming direction, i.e., TRP 1, and SRI-PUSCH-PowerControl including a second SRS resource set Id may be defined as a transmission power parameter for a second beamforming direction, i.e., TRP 2. The base station may indicate two or more SRI fields in DCI for scheduling of repeated PUSCH transmissions having different beamforming directions.

Alternatively, two srs-ResourceIndicator may be configured in a higher layer for configured grant PUSCH transmission. If DCI includes two SRI fields, the terminal may determine PUSCH transmission power for transmission to TRP 1 by referring to a PUSCH transmission power parameter within SRI-PUSCH-PowerControl of the same number as a value indicated by a first SRI field in SRI-PUSCH-PowerControl including an SRS resource set Id for a first SRS resource set in sri-PUSCH-MappingToAddModList, and may determine PUSCH transmission power for transmission to TRP 2 by referring to a PUSCH transmission power parameter within SRI-PUSCH-PowerControl of the same number as a value indicated by a second SRI field in SRI-PUSCH-PowerControl including an SRS resource set Id for a second SRS resource set in sri-PUSCH-MappingToAddModList.

This will be described as a specific example as follows. SRI-PUSCH-PowerControl in which SRI-PUSCH-PowerControlId is 0 to 7 may include the SRS resource set ID for the first SRS resource set, and SRI-PUSCH-PowerControl in which SRI-PUSCH-PowerControlId is 8 to 15 may include the SRS resource set ID for the second SRS resource set. In this case, if a value of the first SRI field among two SRI fields indicated by DCI is m (m=0, 1, 2, . . . , 7), the terminal may determine the PUSCH transmission power for transmission to TRP 1 by referring to a transmission power parameter within SRI-PUSCH-PowerControl, in which m-th SRI-PUSCH-PowerControlId is m, among SRI-PUSCH-PowerControl associated with the first SRS resource set. If a value of the second SRI field among two SRI fields indicated by DCI is p (µ=0, 1, 2, . . . , 7), the terminal may determine the PUSCH transmission power for transmission to TRP 2 by referring to a transmission power parameter within SRI-PUSCH-PowerControl, in which p-th SRI-PUSCH-PowerContorolId is 8+p, among SRI-PUSCH-PowerControl associated with the second SRS resource set.

Alternatively, two SRI-PUSCH-PowerContol having the same SRI-PUSCH-PowerContolId may exist and may include different SRS resource set IDs, respectively. Even if SRI-PUSCH-PowerControlId associated with an SRS resource set is different from the above example, each SRI field and SRI-PUSCH-PowerContol may be mapped by applying a similar method. According to the above method, the maximum number of SRI-PUSCH-PowerContol configurable in sri-PUSCH-MappingToAddModList may increase according to the number of supported TRPs. In this case, the first SRI field may be determined by the base station by referring to the first SRS resource set among two SRS resource sets in which usage is configured to "codebook" or "nonCodebook," and the second SRI field may be determined by the base station by referring to the second SRS resource set among the two SRS resource sets in which usage is configured to "codebook" or "nonCodebook."

Table 34 below shows a power control calculation equation for PUCCH transmission.

For PUCCH transmission occasion i on active UL BWP b of carrier f of primary cell c and p is a SCS configuration.

$P_{CMAX,f,c}(i)$ the UE configured maximum output power defined in TS 38.101-1

$P_{O\_PUCCH,f,c}(q_N)$ is a parameter composed of the sum of a component $P_{O\_NOMINAL\_PUCCH}$, provided by higher layer parameter P0-nominal, or $P_{O\_NOMINAL\_PUCCH}=0$ dBm if P0-nominal is not provided.

$M_{RB,b,f,c}^{PUCCH}(i)$ is a bandwidth of the PUCCH resource assignment expressed in number of resource blocks $PL_{b,f,c}(q_d)$ is a downlink pathloss estimate in dB calculated by the UE using RS resource index $q_d$.

$\Delta_{F\_PUCCH}(F)$ The parameter $\Delta_{F\_PUCCH}(F)$ is a value of deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4, if provided; otherwise $\Delta_{F\_PUCCH}(F)=0$.

$\Delta_{TF,b,f,c}(i)$ is a PUCCH transmission power adjustment component according to the PUCCH format $g_{b,f,c}(i,l)$ the PUCCH power control adjustment state $g_{b,f,c}(i,l)=g_{b,f,c}(i-i_0,l)+\sum_{m=0}^{C(D_i)-1} \delta_{PUCCH,b,f,c}(m,l)$ is the current PUCCH power control adjustment state l for active UL BWP b of carrier f of primary cell c and PUCCH transmission occasion i, where The $\delta_{PUCCH,b,f,c}$ values are given in Table below

TABLE 7.2.1-1

| Mapping of TPC Command Field in a DCI format to accumulated $\delta_{PUCCH,b,f,c}$ values ||
|---|---|
| TPC Command Field | Accumulated $\delta_{PUCCH,b,f,c}$ [dB] |
| 0 | −1 |
| 1 | 0 |
| 2 | 1 |
| 3 | 3 |

$\delta_{PUCCH,b,f,c}(i,l)$ is a TPC command value included in a DCI format 1_0 or DCI format 1_1 l∈{0,1} if the UE is provided twoPUCCH-PC-AdjustmentStates and PUCCH-SpatialRelationInfo and l=0 if the UE is not provided twoPUCCH-PC-AdjustmentStates or PUCCH-SpatialRelationInfo If the UE obtains a TPC command value from a DCI format associated with the PUCCH transmission and if the UE is provided PUCCH-SpatialRelationInfo, the UE obtains a mapping, by an index provided by p0-PUCCH-Id, between a set of pucch-SpatialRelationInfoId values and a set of values for closedLoopIndex that provide the 1 value(s). If the UE receives an activation command indicating a value of pucch-SpatialRelationInfoId, the UE determines the value closedLoopIndex that provides the value of 1 through the link to a corresponding p0-PUCCH-Id index

TABLE 34

$P_{PUCCH,b,f,c}(i, q_u, q_d, l) =$ $\min\left\{\begin{array}{l} P_{CMAX,f,c}(i), \\ P_{O\_PUCCH,b,f,c}(q_n) + 10\log_{10}\left(2^\mu \cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i,l) \end{array}\right\}$ [dBm]

If the UE obtains one TPC command from a DCI format 2_2 with CRC scrambled by a TPC-PUCCH-RNTI, the l value is provided by the closed loop indicator field in DCI format 2_2

In description of the table, g(i) is a parameter for performing power control in a closed-loop, and accumulation-based power control is performed. $P_{OPUCCH,f,c}$ refers to a OPUCCH value at frequency f of serving-cell c, is a parameter configured by $P_{O\_NOMINAL\_PUCCH}+P_{O\_UE\_PUCCH}$, and is a value notified to the terminal by the base station via higher layer signaling (RRC signaling). In $P_{OPUCC}$, qu refers to an index of $P_{OPUCCH}$, and different indexes may be available according to a beam used for PUCCH transmission or a service type (i.e., for eMBB or URLLC) of a corresponding PUCCH.

PL, which is a path loss value calculated by the terminal, may be calculated via reception power of a downlink RS transmitted by the base station. In NR, there is no cell-specific reference signal (CRS), and PL may be thus measured by the terminal via an RS resource indicated from the base station via qu. For example, qu may be a resource index of a channel state information-reference signal (CSI-RS) or may be a resource index of a synchronization signal block (SSB) source.

The equation below shows a power control calculation equation for PUSCH transmission.

[Equation 2]

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M^{PUSCH}_{RB,b,f,c}(i)) + \alpha_{b,f,c}(j) \cdot PL_{b,f,c}(q_d) + \Delta_{TF,b,f,c}(i) + f_{b,f,c}(i, l) \end{cases} [dBm]$$

Here, $P_{CMAX,f,c}(i)$ refers to maximum output power for carrier f of support-cell c with respect to PUSCH transmission occasion i configured for the terminal. $P_{O\_PUSCH,b,f,c}(j)$ refers to the sum of $P_{O\_NOMINAL\_PUSCH,f,c}(j)$ configured via a higher layer parameter and $P_{O\_UE\_PUSCH,b,f,c}(j)$ configurable via a higher layer configuration and an SRI. Here, j=0 indicates a PUCCH for transmission of msg3, j=1 indicates a configured grant PUSCH, and if j={2, . . . , J−1} is satisfied (j is one of 2, . . . , J−1), a grant PUSCHis indicated. $M_{RB,b,f,c}^{PUSCH}(i)$ is a bandwidth for PUSCH resource allocation, and $\Delta_{TF,b,f,c}(i)$ is a type of information transmitted on a PUSCH and is a value determined according to bits per resource element (BPRE: the number of transmission bits per RE). $\alpha_{b,f,c}(j)$ and $PL_{b,f,c}(q_d)$ are an alpha value and a path loss value estimated from a path loss reference signal, respectively, and a reference alpha value and the path loss reference signal may be determined via a higher layer configuration and an SRI. $f_{b,f,c}(i,l)$ is a closed-loop power control value and may refer to a value for closed-loop index l which may be determined via a higher layer configuration and an SRI for a PUSCH.

The closed-loop power control for PUSCH transmission may be supported by divided methods of an accumulation method of accumulating and applying a value indicated by a TPC command and an absolute method of directly applying a value indicated by a TPC command, and this may be determined according to whether higher layer parameter tpc-Accumulation has been configured. If higher layer parameter tpc-Accumulation is configured to disabled, the closed-loop power control for PUSCH transmission may be performed by the absolute method, and if tpc-Accumulation is not configured, the closed-loop power control for PUSCH transmission may be performed by the accumulation method.

Hereinafter, detailed description will be provided for a method in which a power control command indicated by the TPC command described above is applied according to repeated PUCCH or PUSCH resource configurations. First, in a method of a higher layer configuration for a closed-loop power control, the base station and the terminal may configure a fixed closed-loop power control for PUCCH/PUSCH resources allocated and transmitted for multiple TRPs so as to be configured with a fixed bit width size. For example, it may be understood that the terminal decodes a PDCCH transmitted by the base station, and a TPC field is configured by fixed 2 to 4 bits in DCI format 1_1/1_2/0_1/0_2. However, the aforementioned bit width is merely an example of the disclosure, and the TPC field may be fixed to bit information of various sizes. As another example, the base station may configure a TPC field to have various bit width sizes in DCI format 1_1/1_2/0_1/0_2, for the terminal via a higher layer.

Specifically, if the terminal supports PUCCH/PUSCH operations for multiple TRPs, the base station may configure, via a higher layer, whether to configure one TPC field or to configure multiple (e.g., two) TPC fields. Even when one TPC field is configured, the base station may perform configuration to distinguish whether a TPC value indicated to the terminal is applied to all multiple PUCCH/PUSCH transmissions (method B-1) or is selectively applied to only one PUCCH/PUSCH transmission (method B-2). Alternatively, a method of configuring one among various options may also be considered, such as whether the base station configures 2 TPC fields (method B-3) or whether the base station configures one TPC field in which 2 TPC values are included (method B-4). In this case, a new RRC parameter (e.g., ClosedLoopPC-r17 ENUMERATED {"Option-2," "Option-3," "Option-4" }) may be added, and if a ClosedLoopPC-r17 field is disabled or absent, the terminal may determine that a default option (e.g., option 1) among the multiple options is supported.

A field size configuring a TPC field in DCI may have a bit width of, for example, 2 to 4 bits according to the above options. In the disclosure, ClosedLoopPC refers to information indicating a method of applying TPC, and a method of indicating any one of option-2 to option-4 as a new RRC parameter and supporting option-1 as a default option is described as an example in the disclosure. However, the scope of the disclosure is not limited thereto. That is, depending on considerable options, options that ClosedLoopPC can indicate may be configured in various ways, one of option-2 to option-4, other than option-1, may be configured as the default option, and a method of configuring a candidate, which can be indicated by a new RRC parameter, via all or some of remaining options other than the default option may also be used.

The base station may transmit DCI signaling or an MAC CE message, based on TPC command-related information newly configured via a higher layer.

Here, the TPC command-related information newly configured via a higher layer may be configuration information on a specific beam, to which a TPC field value is to be applied, from among multiple beams. For example, if a newly configured TPC command-related parameter value is 0, the terminal may determine that a TPC command is applied to a first or an odd-numbered beam among PUCCH beams for repeated transmission. As another example, if a newly configured TPC command-related parameter value is 1, the terminal may determine that a TPC command is applied to a second or an even-numbered beam among PUCCH or PUSCH beams for repeated transmission.

The TPC command-related information newly configured via a higher layer may be configuration information on whether a configuration value corresponding to TPC execution is newly added or is applied to a changed specific beam (e.g., a second beam). For example, a most basic TPC configuration value is applied to a first beam in one slot by default, and whether to apply TPC to other additionally configured beams (e.g., a second beam) may be determined based on a value of the TPC command-related information. For example, if a newly configured TPC command-related parameter value is 0, the terminal may not apply a TPC command indicated to a second or an even-numbered beam among PUCCH beams for repeated transmission. As another example, if a newly added TPC command-related parameter value is 1, the terminal may determine to apply a TPC command indicated to a second or an even-numbered beam in different slots/sub-slots from among PUCCH or PUSCH beams for repeated transmissions.

<Method B-1: When One TPC Field is Configured, Applying One Indicated TPC Value to all Multiple PUCCH/PUSCH Transmissions>

The terminal may receive TPC command information (a value indicating a degree of increase or reduction in power by using a $\delta_{PUCCH,b,f,c}$ value) in DCI format 1_0, 1_1, or 1_2 to schedule a PUCCH, wherein a bit width size of a TPC command field received by the terminal is maintained to 2 bits (TPC command for scheduled PUCCH). If the bit width of the TPC command field is fixed to 2 bits, and one Spatialrelationinfo is configured via a higher layer in order to configure a beamforming direction corresponding to a repeated PUCCH resource as in various embodiments described in methods A-1 and A-2, a closed-loop power control method for the PUCCH transmission is required.

The terminal may receive TPC command information (a value indicating a degree of increase or reduction in power by using a $f_{b,f,c}$ value) in DCI format 0_0, 0_1, or 0_2 to schedule a PUSCH repeatedly transmitted to multiple TRPs, wherein a bit width size of a TPC command field received by the terminal is maintained to 2 bits (TPC command for scheduled PUCCH). If the bit width of the TPC command field is fixed to 2 bits, and SRI-PUSCH-PowerControl is configured via a higher layer in order to configure a beamforming direction corresponding to a repeated PUSCH resource as in various embodiments described in methods A-3 and A-4, a closed-loop power control method for the PUSCH transmission is required.

As an example, if a TPC command field value in DCI received by the terminal is a predetermined value (e.g., 00), the terminal may equally apply power reduction to all repeated PUCCH/PUSCH resources scheduled in the DCI. In this case, in order to determine an amount of power reduction, a value of accumulated $\delta_{PUCCH,b,f,c}$ or $f_{b,f,c \text{ may be configured to}}$ -1 (dB) in the equation for determination of PUCCH/PUSCH transmission power described in Table 34.

If the TPC command field value in the DCI received by the terminal is a predetermined value (e.g., 01), the terminal may apply power reduction to maintain the same power for all repeated PUCCH/PUSCH resources scheduled in the DCI. In this case, in order to determine an amount of power reduction, a value of accumulated $S_{PUCCH,b,f,c}$ or $f_{b,f,c}$ may be configured to 0 (dB) in the equation for determination of PUCCH/PUSCH transmission power.

If the TPC command field value in the DCI received by the terminal is a predetermined value (e.g., 10 or 11), the terminal may equally apply power increase to all repeated PUCCH/PUSCH resources scheduled in the DCI. In this case, in order to determine an amount of power increase, a value of accumulated $\delta_{PUCCH,b,f,c}$ or $f_{b,f,c}$ may be configured to 1/3 (dB) in the equation for determination of PUCCH/PUSCH transmission power.

As another example, if the TPC command field value in the DCI received by the terminal is a predetermined value (e.g., 00), the terminal may recursively and repeatedly apply power reduction to all repeated PUCCH/PUSCH resources scheduled in the DCI. In this case, in order to determine an amount of power reduction, a value of accumulated $\delta_{PUCCH,b,f,c}$ or $f_{b,f,c}$ may be configured to −1 (dB) in the equation for determination of PUSCH transmission power and may be configured to reflect reduction or increase by the number of repeated transmissions.

If the TPC command field value in the DCI received by the terminal is a predetermined value (e.g., 10 or 11), the terminal may recursively and repeatedly apply power increase to all repeated PUCCH resources scheduled in the DCI. In this case, in order to determine an amount of power increase, a value of accumulated $\delta_{PUCCH,b,f,c}$ or $f_{b,f,c}$ may be configured to 1 dB (if the TPC command field value is 10) or 3 dB (if the TPC command field value is 11) in the equation for determination of PUCCH transmission power and may be configured to reflect reduction or increase by the number of repeated transmissions.

<Method B-2: When One TPC Field is Configured, Selectively Applying a TPC Value, which is Indicated to the Terminal, to One of Multiple PUCCH/PUSCH Transmissions>

In a DCI signaling method, basically one TPC field may exist in DCI. An indicated TPC value may be applied to first PUCCH/PUSCH resource transmitted for a first TRP at a first timing point (e.g., a first slot/sub-slot). In addition, an indicated TPC value may be applied to second PUCCH/PUSCH resource which is different from the first PUCCH/PUSCH resource and is transmitted for a second TRP at a second timing point (e.g., a first slot/sub-slot or a second slot/sub-slot). Specifically, the base station may perform allocation by fixing, to 2 bits (TPC command for scheduled PUCCH/PUSCH), a bit width including TPC command information (a value indicating a degree of increase/reduction in power by using a $\delta_{PUCCH,b,f,c}$ or $f_{b,f,c}$ value) in DCI format 1_0, 1_1, or 1_2 and DCI format 00, 0_1 or 0_2. Here, a difference from method B-1 is that a TPC operation is performed based on new/changed higher layer information. That is, TPC command-related/associated information newly configured via a higher lay may be explicit configuration information on a specific timing or beam, to which a TPC control value is applied, from among multiple timings or multiple beams, or may be explicit configuration information on whether the TPC control value is applied to a specific timing or beam (e.g., a second beam) in addition to a default timing or beam operation.

For example, if a TPC command-related parameter value newly configured via a higher layer is 0, the terminal may determine that a TPC command is applied to a first or an odd-numbered timing or beam among PUCCH/PUSCH beams for repeated transmission. As another example, if a TPC command-related parameter value newly configured via a higher layer is 1, the terminal may determine that a TPC command is applied to a second or an even-numbered timing or beam among PUCCH/PUSCH beams for repeated transmission. In this case, information indicated in a TPC field in DCI may be applied to a transmission timing or beamforming direction corresponding to the new TPC command-related parameter value.

As another example, the terminal may determine that the information indicated by the TPC field in the DCI is basically applied in a first beamforming direction at a first or odd-numbered timing. If the newly added TPC command-related parameter value configured for the terminal is 0, it may be understood that the terminal does not apply a TPC command in a second beamforming direction at a second or even-numbered timing. If the newly added TPC command-related parameter value configured for the terminal is 1, it may be understood that the terminal applies the TPC command in a second beamforming direction at a second or even-numbered timing. The aforementioned timing point may be considered to operate over the same slot/sub-slot or multiple slots/sub-slots.

As another example, if the DCI for the TPC command is 2 bits, and one Spatialrelation-info for configuration of a beamforming direction is configured to a repeated PUCCH resource as shown in various embodiments of method A, a method of selectively performing power control for the PUCCH transmission with respect to multiple PUCCH resources may be required.

In this case, if a TPC command field value in the DCI received by the terminal is a predetermined value (e.g., 00), the power for the PUCCH transmission may be, according to the total number of repeated transmissions of the configured PUCCH resource, reduced or increased for at least a part of the total number of repeated transmissions. For example, if the total number of repetitions is 2, the power control may be applied only to an initial transmission or a last transmission. For example, if the total number of repetitions is 4, the power control may be applied to either initial first and second transmissions or to third or fourth transmissions.

As another example, if the TPC command field value in the DCI received by the terminal is a predetermined value (e.g., 00), the terminal may recursively and repeatedly apply power reduction to all repeated PUCCH resources scheduled in the DCI. In this case, in order to determine an amount of power reduction, a value of accumulated $\delta_{PUCCH,b,f,c}$ may be configured to −1 (dB) in the equation for determination of the PUSCH transmission power and may be configured to reflect reduction or increase by the number of repeated transmissions.

If the TPC command field value in the DCI received by the terminal is a predetermined value (e.g., 10/11), the terminal may recursively and repeatedly apply power increase to all repeated PUCCH resources scheduled in the DCI. Conversely, a case of an increase may also be applied in a similar manner.

As another example, repeated PUCCH transmission, to which TPC command information in the DCI received by the terminal, is to be applied may be determined by an implicit method based on another transmission power control parameter. For example, the terminal may determine repeated PUCCH transmission, to which the TPC command is to be applied, according to a repetition period of a path loss reference signal (PL RS) determined by two PUCCH-SpatialRelationInfo for repeated PUCCH transmission to two TRPs. If two PUCCH-SpatialRelationInfo is activated for one PUCCH resource, and reference signals of PUCCH-PathlossReferenceRS according to respective PUCCH-SpatialRelationInfo are configured to different NZP CSI-RSs having different periods, the terminal may apply the TPC command in the received DCI to repeated PUCCH transmission performed by the terminal, according to PUCCH-SpatialRelationInfo in which an NZP CSI-RS of a longer period is configured as the reference signal of PUCCH-PathlossReferenceRS.

As another example, the terminal may determine repeated PUCCH transmission to which the TPC command is to be applied, by comparing the most recent reception time points of reference signals configured in PUCCH-PathlossReferenceRS of respective PUCCH-SpatialRelationInfo from a time point before reception of DCI including the TPC command regardless of a reference signal period. That is, a most recently received reference signal for a first PUCCH-SpatialRelationInfo has been received earlier than a most recently received reference signal for a second PUCCH-SpatialRelationInfo, the TPC command may be applied to repeated PUCCH transmission according to the first PUCCH-SpatialRelationInfo.

Similarly, repeated PUSCH transmission to which TPC command information in DCI received by the terminal is to be applied may be determined by an implicit method based on another transmission power control parameter. The terminal may determine repeated PUCCH transmission, to which a TPC command is to be applied, according to a repetition period of a path loss reference signal (PL RS) determined based on two SRIs for repeated PUSCH transmission to two TRPs. If reference signals of two PUSCH-PathlossReferenceRS determined based on two SRIs are configured as different NZP CSI-RSs having different periods, the terminal may apply the TPC command in the received DCI to repeated PUSCH transmission performed by the terminal, according to SRI-PUSCH-PowerControl in which an NZP CSI-RS having a longer period is configured as the reference signal of PUSCH-PathlossReferenceRS.

As another example, the terminal may determine repeated PUSCH transmission to which the TPC command is to be applied, by comparing the most recent reception time points of reference signals configured in PUSCH-PathlossReferenceRS of respective SRI-PUSCH-PowerControl from a time point before reception of the DCI including the TPC command regardless of a reference signal period. That is, if a reference signal for most recently received PUSCH-PathlossReferenceRS of SRI-PUSCH-PowerControl for a first SRI has been received earlier than a reference signal for most recently received PUSCH-PathlossReferenceRS of SRI-PUSCH-PowerControl for a second SRI, the TPC command may be applied to repeated PUSCH transmission according to SRI-PUSCH-PowerControl for the first SRI.

<Method B-3: Configuring Multiple (e.g., Two) TPC Fields and Applying TPC Values, which are Indicated to the Terminal, to Multiple PUCCH/PUSCH Transmissions, Respectively>

In a DCI signaling method, it is a basic principle that a new second TPC field similar to a first TPC field is used, wherein, in a case of FR2, the first TPC field may be applied to PUCCH transmission associated with first PUCCH-SpatialRelationInfo, or the first TPC field may be applied to beam-related information associated with SRI-PUSCH-PowerControl determined based on a first SRI for a first PUSCH. In a case of FR1, the first TPC field may be applied to information associated with a parameter set in a power control parameter. Here, the first TPC field may be the same as a rel-15/16-based TPC field.

In the case of FR2, the second TPC field may be applied to PUCCH-SpatialRelationInfo and beam-related information associated with SRI-PUSCH-PowerControl determined based on a second SRI for a second PUSCH, and in the case of FR1, the second TPC field may be applied to information associated with a parameter set in the power control parameter. Specifically, the base station may configure a bit width of the TPC command to 3 bits or 4 bits (TPC command for scheduled PUCCH) so that a TPC command (a value indicating a degree of increase or reduction in power by using a $\delta_{PUCCH,b,f,c}$ value) field in DCI format 1_0, 1_1, or 1_2 includes the first TPC field or the second TPC field.

For example, interpretation of the second TPC field and a configuration of the TPC command field may be as follows.

First, in order to be interpreted in the same way as in the structure of rel-15 described above, the corresponding field may be configured by a bit width of 4 bits by further adding a bit width of 2 bits to an existing bit width of 2 bits.

For example, a first (or last) 2 bits of 4 bits may be indicated to be mapped to a beamforming direction of a PUCCH/PUSCH resource repeatedly transmitted for the first TRP. Specifically, if the first (MSB) 2 bits are 00 or 11, the terminal may determine that the power transmitted to the PUCCH resource (set) (repeatedly) transmitted for the first TRP, which has been determined via a higher layer, is increased/reduced by $\delta_{PUCCH,b,f,c}$ or $f_{b,f,c}$ corresponding to 00 or 11.

The remaining 2 bits may be indicated to be mapped to a beamforming direction of (repeatedly) transmitted PUCCH resource for the second TRP. Specifically, if the remaining (LSB) 2 bits are 00 or 11, the terminal may determine that the power transmitted to the PUCCH/PUSCH resource (set) repeatedly transmitted for the second TRP, which has been determined via a higher layer, is increased/reduced by $\delta_{PUCCH,b,f,c}$ or $f_{b,f,c}$ corresponding to 00 or 11.

As another example, the first (or last) 2 bits of 4 bits may be indicated to be mapped to a repeatedly transmitted PUCCH/PUSCH resource (set) at a first timing. Specifically, a case in which the 2 bits are 00, the terminal may determine that the case corresponds to a first transmitted PUCCH/PUSCH resource, the terminal may determine a case of 01 corresponds to a second transmitted PUCCH/PUSCH resource, may determine a case of 10 corresponds to a third transmitted PUCCH/PUSCH resource, and may determine a case of 11 corresponds to a fourth transmitted PUCCH/PUSCH resource. If the number of repeated PUCCH/PUSCH transmissions is 8, the PUCCH/PUSCH resources may be sequentially interpreted by matching one set of two to one bit information in the order of being transmitted first. Subsequent 2 bits may be applied in the same way as in the embodiment of method B-1.

As another example, in first 2 bits of 4 bits, 00 may be interpreted as information indicating to correspond to all PUCCH/PUSCH resources included in a slot or sub-slot to which a first configured PUCCH resource is allocated, 01 may be interpreted as information indicating to correspond to a PUCCH/PUSCH resource allocated immediately after the slot or sub-slot, 10 may be interpreted as information indicating to correspond to a PUCCH/PUSCH resource allocated immediately after the slot or sub-slot indicated in 01, and 11 may be interpreted as information indicating to correspond to a PUCCH/PUSCH resource allocated immediately after the slot or sub-slot indicated 10. Subsequent 2 bits may be applied in the same way as in the embodiment of method B-1.

Second, the corresponding field may be configured by 3 bits by adding a bit width of 1 bit to indicate increase or reduction via relative comparison with a value of the first TPC field. In this case, the second TPC field may be determined depending on a value of the first TPC field.

For example, if a value of the added bit is 0, the base station and the terminal may understand that a second TPC value indicates a value reduced by X dB (e.g., 1 dB) from a value indicated by the first TPC. If the value of the added bit is 1, it may be understood that the second TPC value indicates a value increased by X dB (e.g., 1 dB) from the value indicated by the first TPC.

Third, the corresponding field may be configured by 3 bits by adding a value of the first TPC field and an independent bit width of 1 bit.

For example, if a second TPC value is 0, the base station and the terminal may understand that the second TPC value is determined based on a standard or indicates a value increased/decreased by a specific value (e.g., 0 dB) configured in a higher layer. As another example, if the second TPC value is 1, the base station and the terminal may understand that the second TPC value is determined based on a standard or indicates a value increased/decreased by a specific value (e.g., 1 dB) configured in a higher layer.

As another example, when the PUCCH/PUSCH transmission is repeated twice, if a first 1 bit of the 3 bits is 0, this may be interpreted as information indicating to correspond to a first configured PUCCH/PUSCH resource, and if the first 1 bit is 1, this may be interpreted as information indicating to correspond to a second configured PUCCH/PUSCH resource.

As another example, when the PUCCH/PUSCH transmission is repeated four times, if a first 1 bit of the 3 bits is 0, this may be interpreted as information indicating to correspond to a first and a second configured PUCCH/PUSCH resource, and if the first 1 bit is 1, this may be interpreted as information indicating to correspond to a third and a fourth configured PUCCH/PUSCH resource.

As another example, if the first bit of the 3 bits is 0, this may be interpreted as information indicating to correspond to all PUCCH resources included in a slot or sub-slot to which a first configured PUCCH resource is allocated, and if the first bit is 1, this may be interpreted as information indicating to correspond to a PUCCH resource allocated after the slot or sub-slot.

As another example, the first (or last) 1 bit that is added among the 3 bits may indicate whether to apply a different beam to another slot. If a value of the added 1 bit is 0, the terminal may determine that a different beam is not applied in another slot having a different TPC value. If a value of the added 1 bit is 1, the terminal may determine that a different beam is not applied in another slot having a different TPC value.

In the aforementioned various embodiments, it has been described that a first 1 bit is information for selecting of beamforming direction-related information or a PUCCH/PUSCH resource to which TPC is applied, but the disclosure is not limited to these embodiments and a last bit may be used. The aforementioned various embodiments have provided descriptions mainly with an added 1 bit, but the remaining 2 bits are applicable in a similar manner as shown in the embodiment of method B-1.

<Method B-4: Configuring One TPC Field Indicating Two TPC Values, and Applying the TPC Values, which are Indicated to the Terminal, to Multiple PUCCH/PUSCH Transmissions Respectively> or In a DCI signaling method, a TPC value may be configured via a higher layer so that one TPC field indicates two TPC values. Specifically, a bit width including TPC command information (a value indicating a degree of increase or reduction in power by using a $\delta_{PUCCH,b,f,c}$ value) in DCI format 1_0, 1_1, or 1_2 may be allocated with 2 bits (TPC command for scheduled PUCCH) or 3 bits. In this case, a TPC field value of 2 bits or 3 bits may be configured by a TPC mapping table including a combination of $\delta_{PUCCH,b,f,c}$ determined in a higher layer or standard.

For example, the following shows a mapping relationship between the TPC field value in DCI described above and accumulated $\delta_{PUCCH,b,f,c}$ values. $\delta_{PUCCH,b,f,c}$ may be configured by two values, wherein a first value is a value corresponding to a first TRP among multiple TRPs, and a second value refers to a value corresponding to a second TRP. A procedure of determining the first TRP and the second TRP follows the aforementioned PUCCH/PUSCH resource (set), PUCCH-Spatialrelationinfo, SRI-PUSCH-PowerControl, SRS Resource Set, and the like.

TABLE 35

| TPC command field | Accumulated $\delta_{PUCCH, b, f, c}$ values {value for TRP 1, value for TRP 2} |
|---|---|
| 0 | {−1, −1} |
| 1 | {0, 1} |
| 2 | {1, 0} |
| 3 | {3, 3} |

As another example, the following shows another mapping relationship between the TPC field value in DCI described above and accumulated $\delta_{PUCCH,b,f,c}$ values. In this case, when $\delta_{PUCCH,b,f,c}$ is configured by two values (e.g., −1 and 1), a value indicated by an MSB of the TPC field is a value corresponding to the first TRP among multiple TRPs, and a value indicated by an LSB of the TPC field refers to a value corresponding to the second TRP. A procedure of determining the first TRP and the second TRP may follow the aforementioned PUCCH/PUSCH resource (set), PUCCH-Spatialrelationinfo, SRI-PUSCH-PowerControl, SRS resource set, the number of SRI fields in DCI, and the like.

TABLE 36

| TPC command field of MSB | Accumulated $\delta_{PUCCH, b, f, c}$ values for TRP 1 | TPC command field of LSB | Accumulated $\delta_{PUCCH, b, f, c}$ values for TRP 2 |
|---|---|---|---|
| 0 | −1 | 0 | −1 |
| 1 | 1 | 1 | 1 |

After the above mapping table is configured, the base station may update the related table to the terminal, based on a MAC CE message or RRC signaling to change the combination and $\delta_{PUCCH,b,f,c}$ value.

The terminal may perform, in at least one slot, dynamic switching of receiving a PDCCH transmitted from one TRP while receiving a PDCCH transmitted from multiple TRPs. Conversely, the terminal may perform, in at least one slot, dynamic switching of receiving a PDCCH transmitted from multiple TRPs while receiving a PDCCH transmitted from one TRP according to UE capability.

The terminal may perform dynamic switching of, while receiving transmission timing-related information and a PUCCH/PUSCH resource (set) so as to perform repeated PUCCH transmission in consideration of multiple TRPs in at least one slot, receiving transmission timing-related information and a PUCCH/PUSCH resource (set) so as to perform repeated PUCCH transmission in consideration of a single TRP.

Conversely, the terminal may perform dynamic switching of, while receiving PUCCH/PUSCH resource (set) and transmission timing-related information so as to perform repeated PUCCH transmission in consideration of a single TRP in at least one slot, receiving PUCCH/PUSCH resource (set)-related information so as to perform repeated PUCCH/PUSCH transmission in consideration of multiple TRPs.

The terminal may consider (repeated) PUCCH transmission in consideration of multiple TRPs according to UE capability, and in order to identify whether PUCCH transmission is (repeated) PUCCH transmission in consideration of multiple TRPs or (repeated) PUCCH transmission in consideration of a single TRP, the terminal may consider at least one of the number of activated spatial relation info (e.g., 1 or 2 configurations), the number of power control parameter sets (e.g., 1 or 2 configurations), a PRI bit-field (e.g., 1 bit or more) information, and TPC fields in DCI with respect to a PUCCH resource to be transmitted.

The terminal may consider (repeated) PUSCH transmission in consideration of multiple TRPs according to UE capability, and in order to identify whether PUSCH transmission is (repeated) PUSCH transmission in consideration of multiple TRPs or (repeated) PUSCH transmission in consideration of a single TRP, the terminal may consider at least one of activated p0-PUSCH-AlphaSetId, the number of P0-PUSCH-Set (e.g., 1 or 2 configurations), SRI bit-field (e.g., 2 fields or more) information, SRS-ResourceSet (e.g., two sets or more) information in which usage is codebook or nonCodebook, sri-PUSCH-MappingToAddModList (e.g., two lists or more) information, and the TPC field in DCI with respect for a PUSCH resource to be transmitted. A PUCCH/PUSCH resource (set) allocated over at least one slot may be configured in consideration of both intra-slot and inter-slot.

Hereinafter, detailed descriptions are provided about a terminal operation of, in order to identify whether PUCCH transmission is (repeated) PUCCH transmission in consideration of multiple TRPs or (repeated) PUCCH transmission in consideration of a single TRP, identifying the number of activated spatial relation info or the number of power control parameter sets with respect to a PUCCH resource indicated by a PRI field in DCI, and then identifying the TPC field in the DCI, and a terminal operation of interpreting the TPC field and controlling power according to the number of TRPs for transmission. Hereinafter, detailed descriptions are provided about a terminal operation of, in order to identify whether PUSCH transmission is (repeated) PUSCH transmission in consideration of multiple TRPs or (repeated) PUSCH transmission in consideration of a single TRP, identifying the number of power control parameter sets or the number of SRI-PUSCH-PowerControl indicated by the SRI field in DCI, and then identifying the TPC field in the DCI, and a terminal operation of interpreting the TPC field and controlling power according to the number of TRPs for transmission.

When the terminal performs switching of (repeated) PUCCH transmission from multiple TRPs to a single TRP, reinterpretation of information on a TPC field of the same size in DCI, such as DCI format 1_0, 1_1, or 1_2, is required. During repeated PUCCH transmission, switching between multiple TRPs and a single TRP may be determined based on the number of PUCCH-SpatialRelationInfo associated with a transmitted PUCCH resource. If two PUCCH-SpatialRelationInfo is activated in one PUCCH resource, the terminal may perform repeated PUCCH transmission to multiple TRPs, and if one PUCCH-SpatialRelationInfo is activated in one PUCCH resource, the terminal may perform repeated PUCCH transmission to a single TRP.

When the terminal performs (repeated) PUCCH transmission in consideration of multiple TRPs, in order to perform TPC, various operations of identifying a TPC field in DCI shown in aforementioned method B-2 to method B-4 are required. When the terminal performs switching of (repeated) PUSCH transmission from multiple TRPs to a single TRP as in the aforementioned 5-5th embodiment or 5-6th embodiment, reinterpretation of information on a TPC field of the same size in DCI, such as DCI formats 0_0, 0_1, 0_2, etc., is required. When the terminal performs (repeated) PUSCH transmission in consideration of multiple TRPs, in order to perform TPC, various operations of identifying a TPC field in DCI shown in aforementioned methods B-2 to B-4 are required.

For example, when switching is performed to scheduling of (repeated) PUCCH/PUSCH transmission in consideration of a single TRP during scheduling of (repeated) PUCCH/PUSCH transmission in consideration of multiple TRPs as in method B-2, the terminal may interpret the TPC field used in rel-15/16 in the same way as in method B-1. That is, power may be controlled according to $\delta_{PUCCH,b,f,c}$ corresponding to information 00 to 11 received in the 2-bit TPC field.

As another example, if switching is performed to scheduling of (repeated) PUCCH/PUSCH transmission in consideration of a single TRP during scheduling of (repeated) PUCCH/PUSCH transmission in consideration of multiple TRPs as in method B-3, the terminal may assume that a first 2-bit field (MBS field) of two TPC fields configured by 4 bits is applied to a single TRP, and the remaining 2-bit field is disregarded. The remaining field may be indicated as 00 depending on implementation.

Alternatively, the terminal may apply TPC, based on a value indicated for an actually configured TRP among multiple TRPs according to the aforementioned higher layer signaling. A TPC command field indicated for a TRP other than the actually configured TRP may be disregarded.

As another example, when switching is performed to scheduling of (repeated) PUCCH/PUSCH transmission in consideration of a single TRP during scheduling of (repeated) PUCCH/PUSCH transmission in consideration of multiple TRPs as in method B-4, the terminal may interpret, if a TPC field size is configured to 2 bits, the TPC field used in rel-15/16 in the same way as in method B-1. That is, the terminal may control power according to $\delta_{PUCCH,b,f,c}$ corresponding to information 00 to 11 received in the 2-bit TPC field. If the TPC field size is configured to 3 bits, the terminal may disregard a first 1 bit (MSB) or a last 1 bit (LSB) among the 3 bits. Alternatively, an operation may be performed by configuring a new TPC table to fit 3 bits newly configured via a higher layer.

Alternatively, an operation of distinguishing a TRP and controlling power, based on a new TPC command related/associated parameter configured via a higher layer may be performed.

<Seventh Embodiment: Open-Loop Power Control Method in Consideration of Multiple TRPs>

Figure 21:
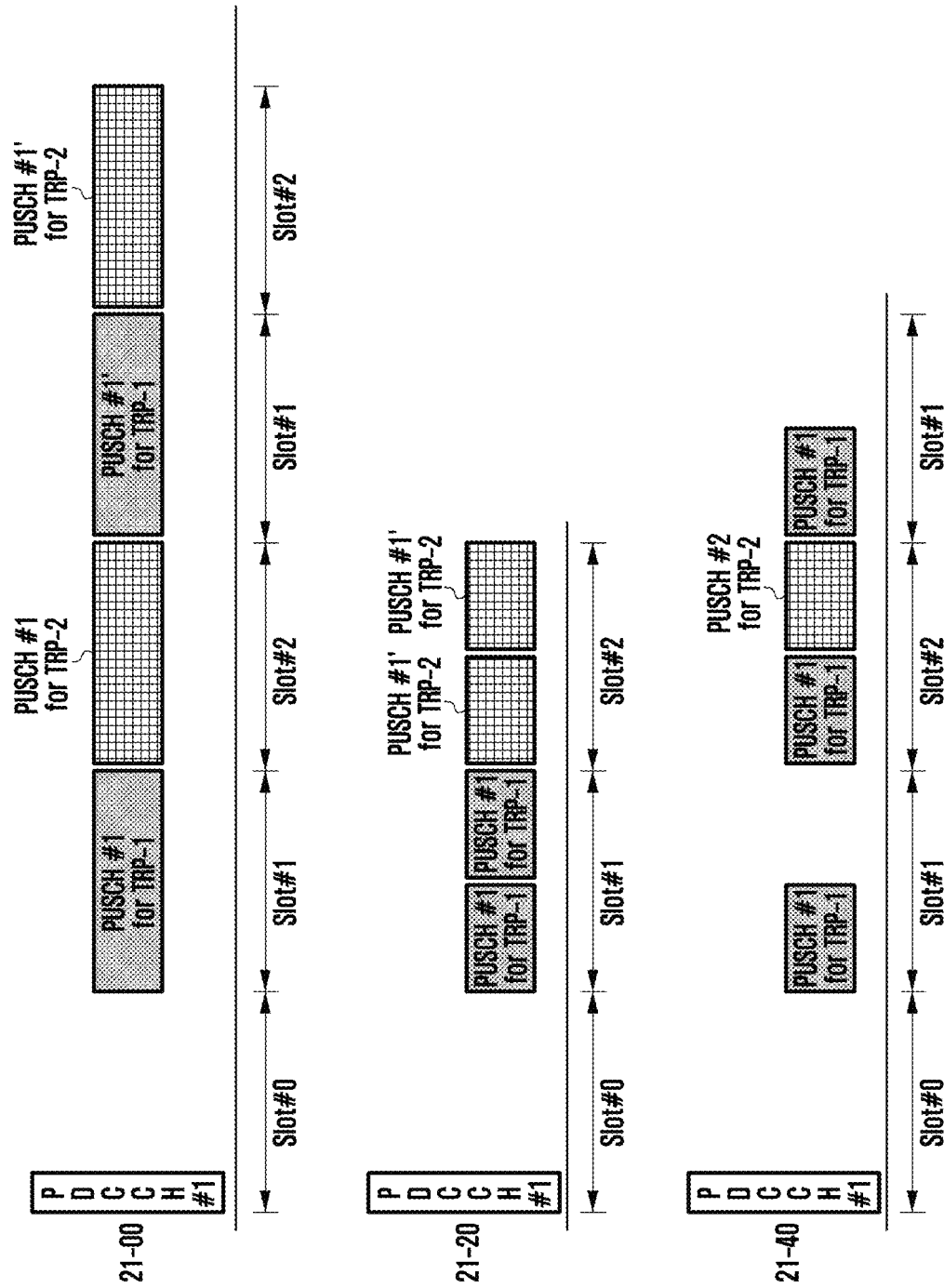
FIG. 21 is a diagram illustrating an example of mapping between repeated PUSCH transmission and a transmission and reception point (TRP) according to an embodiment of the present disclosure.

Hereinafter, as shown in FIG. 21, a method of open-loop power control during repeated PUSCH transmission for multiple TRPs is provided.

First, reference numeral 21-00 of FIG. 21 (a PUSCH repeatedly transmitted in different directions in each slot) relates to a case of single-PDCCH-based NC-JT, and illustrates an example in which a terminal performs scheduling to repeatedly transmit a PUSCH in multiple beamforming directions.

In reference numeral 21-00, a PUSCH resource (PUSCH #1 or #1') illustrates transmission performed based on the same TB or same HARQ process ID in each slot in multiple slot intervals.

In reference numeral 21-20, a PUSCH resource (PUSCH #1 or #1') illustrates transmission performed based on the same TB, same HARQ process ID, and same beamforming direction in a slot in multiple slot intervals.

In reference numeral 21-40, a PUSCH resource (PUSCH #1 or #1') illustrates an operation in which multiple repeated PUSCH transmissions and a single PUSCH transmission are switched in at least one slot.

In NR release 16, an open-loop power control operation of a terminal may be used to support different target reception SINRs by configuring different p0 values according to whether a PUSCH to be transmitted by the terminal is eMBB traffic or URLLC traffic. That is, if the PUSCH to be transmitted by the terminal is eMBB traffic, a p0 value may be determined via higher layer parameter SRI-PUSCH-PowerControl and an SRI indicated by DCI, and if the PUSCH to be transmitted by the terminal is URLLC traffic, a p0 value may be determined via P0-PUSCH-Set configured in higher layer parameter PUSCH-PowerControl-v1610, an open-loop power control (OLPC) parameter set indication field in DCI, and an SRI field (if the SRI field exists in DCI 0_1 or 0_2) in the DCI.

For the open-loop power control operation, a base station may additionally transmit power control-related information to the terminal via a higher layer configuration as shown in Table 37. According to a higher layer configuration or DCI field-related information associated with a higher layer, there are mainly two divided cases, and solutions for the respective cases are provided.

First, the base station may provide one or more p0-PUSCH-AlphaSetId to the terminal via SRI-PUSCH-PowerControl in a higher layer, and when the base station schedules a repeatedly transmitted PUSCH for the terminal via DCI (format) for scheduling of PUSCH, if the DCI includes an SRI field, the terminal may identify a mapping relationship between p0-PUSCH-AlphaSetId configured in P0-PUSCH-AlphaSetd and a set of values (e.g., 0 to 7) for the existing SRI field from sri-PUSCH-PowerControlId configured in SRI-PUSCH-PowerControl. That is, the terminal may identify p0 and alpha values used to determine open-loop power control-related transmission power from a p0-PUSCH-AlphaSetId value mapped to an SRI field value received from DCI, and may calculate a value of transmission power ($P_{O\_UE\_PUSCH,b,f,c}(j)$), based on the value. In addition, if the DCI (or DCI format) received by the terminal includes a 1-bit open-loop power control parameter set indicator (OLPC parameter set indication) field, and a value indicated by the open-loop power control parameter set indication field is 1, the terminal may calculate a value of $P_{O\_UE\_PUSCH,b,f,c}(j)$ by using first value p0 of p0-List configured in P0-PUSCH-Set having p0-PUSCH-SetId equal to the SRI field value. If the value indicated by the open-loop power control parameter set indication field is 0, the terminal may calculate a value of $P_{O\_UE\_PUSCH,b,f,c}(j)$ by using p0 configured in p0-PUSCH-AlphaSet mapped to the SRI field value.

Second, if the base station does not configure SRI-PUSCH-PowerControl-related information for the terminal via a higher layer, or if DCI for scheduling of PUSCH does not include an SRI field when the base station schedules, via the DCI (format), a repeatedly transmitted PUSCH, instead of retransmission for RAR uplink grant, j=2 may be configured, and if P0-PUSCH-Set is additionally configured for the terminal, the terminal may determine that a value of olpc-ParameterSetForDCI-Format0-1-r16 (or olpc-ParameterSetForDCI-Format0-2-r16) in Pusch-PowerControl-r16 is configured to 1 or 2, and the DCI includes an open-loop power control parameter set indicator. In this case, as described above, a case in which j=2 to J−1 is configured may indicate that transmission power of a scheduled PUSCH may be determined based on a transmission power parameter for a dynamic grant PUSCH when PUSCH scheduling is performed via dynamic grant (a case of scheduling via the DCI), and a case in which j=2 may indicate that a first transmission power parameter of entry from among transmission power parameters for the dynamic grant PUSCH is associated with the scheduled PUSCH. That is, the terminal may determine p0 and alpha by referring to first P0-PUSCH-AlphaSet corresponding to a first entry in higher layer configuration p0-AlpharSets (if no P0-PUSCH-Set has been configured).

If an olpc-ParameterSetForDCI-Format0-1-r16 value is configured to 1, the terminal may determine that the open-loop power control parameter set indicator in the DCI includes 1 bit, and if the olpc-ParameterSetForDCI-Format0-1-r16 value is configured to 2, the open-loop power control parameter set indicator in the DCI includes 2 bits.

If an open-loop power control parameter set indication field (e.g., 1 bit) value in the DCI is indicated as 1, the terminal may calculate a value of $P_{O\_UE\_PUSCH,b,f,c}(j)$ by using a first p0-PUSCH value in p0-List of P0-PUSCH-Set having lowest p0-PUSCH-SetID in p0-PUSCH-SetList configured via a higher layer. If a value indicated by the open-loop power control parameter set indication field is 0, the terminal may calculate a value of $P_{O\_UE\_PUSCH,b,f,c}(j)$ by using p0 configured via first P0-PUSCH-AlphaSet, when p0-AlphaSets is configured in PUSCH-PowerControl configured via a higher layer.

If the open-loop power control parameter set indication field (e.g., 2 bits) value in the DCI is indicated as 01, the terminal may calculate a value of $P_{O\_UE\_PUSCH,b,f,c}(i)$ by using the first p0-PUSCH value in p0-List of P0-PUSCH-Set having lowest p0-PUSCH-SetID in p0-PUSCH-SetList configured via a higher layer. If the open-loop power control parameter set indication field (e.g., 2 bits) value in the DCI is indicated as 10, the terminal may calculate a value of $P_{O\_UE\_PUSCH,b,f,c}(j)$ by using a second p0-PUSCH value in p0-List of P0-PUSCH-Set having lowest p0-PUSCH-SetID in p0-PUSCH-SetList configured via a higher layer. If the open-loop power control parameter set indication field (e.g., 2 bits) value in the DCI is indicated as 00, the terminal may calculate a value of $P_{O\_UE\_PUSCH,b,f,c}(j)$ by using p0 configured via first P0-PUSCH-AlphaSet, when p0-AphaSets is configured in PUSCH-PowerControl configured via a higher layer.

If the base station does not configure SRI-PUSCH-PowerControl-related information for the terminal via a higher layer, or if an SRI field does not exist and P0-PUSCH-Set is not configured when the base station schedules a repeatedly transmitted PUSCH via DCI (format) for scheduling of PUSCH, the terminal may calculate a value of $P_{O\_UE\_PUSCH,b,f,c}(j)$ by using a p0 value of first P0-PUSCH-AlphaSet in p0-AlpahSets.

TABLE 37

```
PUSCH-PowerControl-v1610 ::=                          SEQUENCE {
    pathlossReferenceRSToAddModListSizeExt-v1610         SEQUENCE (SIZE (1..maxNrofPUSCH-
PathlossReferenceRSsDiff-r16)) OF PUSCH-PathlossReferenceRS-r16
                                                          OPTIONAL, -- Need N
    pathlossReferenceRSToReleaseListSizeExt-v1610        SEQUENCE (SIZE (1..maxNrofPUSCH-
PathlossReferenceRSsDiff-r16)) OF PUSCH-PathlossReferenceRS-Id-v1610
                                                          OPTIONAL, -- Need N
    p0-PUSCH-SetList-r16                                  SEQUENCE (SIZE (1..maxNrofSRI-PUSCH-
Mappings)) OF P0-PUSCH-Set-r16                        OPTIONAL, -- Need R
    olpc-ParameterSet                                     SEQUENCE {
        olpc-ParameterSetDCI-0-1-r16                            INTEGER (1..2)
                                                          OPTIONAL, -- Need R
        olpc-ParameterSetDCI-0-2-r16                            INTEGER (1..2)
                                                          OPTIONAL  -- Need R
    }
                                                          OPTIONAL, -- Need M
    ...
}
P0-PUSCH-Set-r16 ::=                                  SEQUENCE {
    p0-PUSCH-SetId-r16                                   P0-PUSCH-SetId-r16,
    p0-List-r16                                          SEQUENCE (SIZE (1..maxNrofP0-PUSCH-Set-r16))
OF P0-PUSCH-r16
OPTIONAL, -- Need R
    ...
}
P0-PUSCH-SetId-r16 ::=                                INTEGER (0..maxNrofSRI-PUSCH-Mappings−1)
P0-PUSCH-r16 ::=                                      INTEGER (−16..15)
```

In the above two cases, a method of open-loop power control during repeated PUSCH transmission for multiple TRPs is required. Methods C-1 to C-5 may be extended and applied similarly to the aforementioned TPC-based power control methods B-1 to B-4.

The base station and the terminal may support open-loop power control during repeated PUSCH transmission for multiple TRPs, based on an RRC configuration or MAC CE message as follows.

For example, in order to support an open-loop power control method in an operation of repeated PUSCH transmission based on multiple TRPs, the base station may configure an RRC parameter for TRP 2. To this end, the base station may configure open-loop power control information for TRP 2 by doubling a maxNrofSRI-PUSCH-Mapping value in p0-PUSCH-SetList-r16, or adding one set, such as p0-PUSCH-SetList1-r16 and p0-PUSCH-SetList2-r16, instead of p0-PUSCH-SetList-r16.

As another example, in order to support the open-loop power control method in the operation of repeated PUSCH transmission based on multiple TRPs, the base station may configure an RRC parameter for TRP 2. To this end, the base station may configure open-loop power control information for TRP 2 by doubling a maxNrofSRI-PUSCH-Set value in p0-PUSCH-Set or adding one set, such as p0-List1-r16 and p0-List2-r16, instead of p0-List-r16.

As another example, in order to support the open-loop power control method in the operation of repeated PUSCH transmission based on multiple TRPs, the base station may add an existing or new RRC parameter for TRP 2 to the terminal and transmit a MAC CE message based thereon. Specifically, the MAC CE message transmitted by the base station may indicate, to a specific terminal, information related to p0 or alpha value for operation of open-loop power control from among p0-PUSCH-SetList-r16 or {p0-PUSCH-SetList1-r16, p0-PUSCH-SetList2-r16}.

The base station and the terminal may support open-loop power control during repeated PUSCH transmission for multiple TRPs, based on a higher layer configuration and a DCI field change or re-interpretation as follows. In the following embodiment, when two or more SRI fields are indicated via DCI so as to perform PUSCH transmission to multiple TRPs, the terminal does not expect a case in which a bit width of each SRI field is 0 bit. Alternatively, if a bit width of an SRI field is configured to 0 bit, including a case in which the number of SRS resources in an SRS resource set is 1, the terminal expects that bit widths of both SRI fields are configured to 0 bit.

<Method C-1: Method of Adding an Additional Open-Loop Power Control Parameter Set Indication Field>

Among the two cases described above, a case in which an open-loop power control parameter set indication field is configured to 1 bit or 2 bits by default, the open-loop power control parameter set indication field may be configured to bits 2 bits or 4 bits for multiple TRPs in consideration of open-loop power control operation for repeated PUSCH transmission for multiple TRPs. Alternatively, an open-loop power control parameter set indication field may be added and, at the same time, multiple SRI fields for repeated PUSCH transmission for multiple TRPs may correspond to open-loop power control parameter set indication fields, respectively.

First, if both open-loop power control parameter set indication fields are 2 bits, the terminal may determine that a first bit (MSB) is a value indicated for a first TRP or a first timing point, and the remaining bit (LSB) is a value indicated for a second TRP or a second timing point. That is, if MSB 1 bit is configured to 1, according to the aforementioned improved p0-PUSCH-SetList configuration method or improved p0-List configuration method, the terminal may use a p0 value of first p0-PUSCH in p0-List of P0-PUSCH-Set configured with p0-PUSCH-SetId equal to a first SRI field value in p0-PUSCH-SetList1-r16, or may use a p0 value of first p0-PUSCH in p0-List1-r16 of P0-PUSCH-Set in p0-PUSCH-SetList configured with p0-PUSCH-SetId equal to the first SRI value, thereby calculating a value of $P_{O\_UE\_PUSCH,b,f,c}(j)$ for the first TRP or the first timing point.

In addition, if LSB 1 bit is configured to 1, the terminal may use a p0 value of first p0-PUSCH in p0-List of P0-PUSCH-Set configured with p0-PUSCH-SetId equal to a second SRI field value in p0-PUSCH-SetList2-r16, or may use a p0 value of first p0-PUSCH in p0-List2-r16 of P0-PUSCH-Set in p0-PUSCH-SetList configured with p0-PUSCH-SetId equal to the second SRI value, thereby calculating a value of $P_{O\_UE\_PUSCH,b,f,c}(j)$ for the second TRP or the second timing point. If MSB 1 bit or LSB 1 bit is configured to 0, a value of $P_{O\_UE\_PUSCH,b,f,c}(j)$ for each TRP and each timing point may be calculated using a p0 value obtained by referring to P0-PUSCH-AlphaSet corresponding to each SRI field. The p0 value obtained by referring to P0-PUSCH-AlphaSet corresponding to each SRI field may specifically refer to a p0 value of P0_PUSCH-AlphaSet1 or P0_PUSCH-AlphaSet2. Alternatively, the p0 value obtained by referring to P0-PUSCH-AlphaSet corresponding to each SRI field may specifically refer to a p0-1 value for the TRP 1 or a p0-2 value for the TRP 2 in P0_PUSCH-AlphaSet.

Second, if the base station does not configure SRI-PUSCH-PowerControl-related information for the terminal via a higher layer, or DCI (format) for scheduling of PUSCH has no SRI field during scheduling of repeated PUSCH transmission, if both open-loop power control parameter set indication fields are 2 bits, the terminal may determine that a first bit (MSB) is a value indicated for a first TRP or a first timing point, and the remaining bit (LSB) is a value indicated for a second TRP or a second timing point.

For example, if the open-loop power control parameter set indication fields are 2 bits, the terminal may determine that the first bit (MSB) is a value indicated for the first TRP or a first timing point, and the remaining bit (LSB) is a value indicated for the second TRP or the second timing point.

That is, if both MSB 1 bit and LSB 1 bit are configured to 1, the terminal may calculate a value of $P_{O\_UE\_PUSCH,b,f,c}(j)$ for the first TRP or the first timing point by using a first p0-PUSCH value in p0-List of P0-PUSCH-Set having a lowest p0-PUSCH-SetID configured in p0-PUSCH-SetList configured via a higher layer, and may calculate a value of $P_{O\_UE\_PUSCH,b,f,c}(j)$ for the second TRP or the second timing point by using a first p0-PUSCH value in a p0-List set (e.g., {p0-PUSCH, p0-PUSCH}) of p0-PUSCH-SetID having a value (lowest+1) larger than that of the lowest one by 1.

Alternatively, if MSB 1 bit is configured to 1, according to the aforementioned improved p0-PUSCH-SetList configuration method or improved p0-List configuration method, the terminal may use a p0 value of first p0-PUSCH in p0-List of P0-PUSCH-Set configured with lowest p0-PUSCH-SetId in p0-PUSCH-SetList1-r16, or may use a p0 value of first p0-PUSCH in p0-List1-r16 of P0-PUSCH-Set in p0-PUSCH-SetList configured with lowest p0-PUSCH-SetId, thereby calculating a value of $P_{O\_UE\_PUSCH,b,f,c}(j)$ for the first TRP or the first timing point. If LSB 1 bit is configured to 1, according to the aforementioned improved p0-PUSCH-SetList configuration method or improved p0-List configuration method, the terminal may use a p0 value of first p0-PUSCH in p0-List of P0-PUSCH-Set configured with lowest p0-PUSCH-SetId in p0-PUSCH-SetList2-r16, or may use a p0 value of first p0-PUSCH in p0-List2-r16 of P0-PUSCH-Set in p0-PUSCH-SetList configured with lowest p0-PUSCH-SetId, thereby calculating a value of $P_{O\_UE\_PUSCH,b,f,c}(j)$ for the second TRP or the second timing point.

If MSB 1 bit or LSB 1 bit is configured to 0, the terminal may use a p0 value obtained by referring to P0-PUSCH-AlphaSet1 or P0-PUSCH-AlphaSet2 corresponding to each TRP, or may use a p0-1 or p0-2 value corresponding to each TRP in P0-PUSCH-AlphaSet, thereby calculating a value of $P_{O\_UE\_PUSCH,b,f,c}(j)$ for each TRP or each timing point. Alternatively, if MSB 1 bit or LSB 1 bit is configured to 0, the terminal may calculate a value of $P_{O\_UE\_PUSCH,b,f,c}(j)$ for the first TRP or the first timing point by using a p0 value obtained by referring to first P0-PUSCH-AlphaSet in p0-AlphaSets, or may calculate a value of $P_{O\_UE\_PUSCH,b,f,c}(j)$ for the second TRP or the second timing point by using a p0 value obtained by referring to second P0-PUSCH-AlphaSet in p0-AlphaSets.

As another example, if the open-loop power control parameter set indication fields are 4 bits, the terminal may determine that first 2 bits (MSB) correspond to a value indicated for the first TRP or a first timing point, and the remaining bits (LSB) correspond to a value indicated for the second TRP or the second timing point.

That is, if a first bit field (MSB) (e.g., 2 bits) value of the open-loop power control parameter set indication field in the DCI is indicated as 01, the terminal may calculate a value of $P_{O\_UE\_PUSCH,b,f,c}(j)$ for the first TRP or the first timing point by using a first p0-PUSCH value in p0-List of P0-PUSCH-Set having lowest p0-PUSCH-SetID configured in p0-PUSCH-SetList configured via a higher layer.

If the first bit field (MSB) (e.g., 2 bits) value of the open-loop power control parameter set indication field in the DCI is indicated as 10, the terminal may calculate a value of $P_{O\_UE\_PUSCH,b,f,c}(j)$ for the first TRP or the first timing point by using a second p0-PUSCH value in p0-List of P0-PUSCH-Set having lowest p0-PUSCH-SetID configured in p0-PUSCH-SetList configured via a higher layer.

If the first bit field (MSB) (e.g., 2 bits) value of the open-loop power control parameter set indication field in the DCI is indicated as 00, the terminal may calculate, when configuring p0-AlphaSets in PUSCH-PowerControl configured via a higher layer, a value of $P_{O\_UE\_PUSCH,b,f,c}(j)$ for the first TRP or the first timing point by using p0 configured in first P0-PUSCH-AlphaSet (e.g., PUSCH-AlphaSet1) among at least two P0-PUSCH-AlphaSet (e.g., PUSCH-AlphaSet1 and P0-PUSCH-AlphaSet2).

Alternatively, if the first bit field (MSB) (e.g., 2 bits) value of the open-loop power control parameter set indication field in the DCI is indicated as 00, the terminal may calculate, when configuring p0-AlphaSets in PUSCH-PowerControl configured via a higher layer, a value of $P_{O\_UE\_PUSCH,b,f,c}(j)$ for the first TRP or the first timing point by using a first p0 value (e.g., p0-1) in at least two p0 values (e.g., p0-1 or p0-2) configured in first P0-PUSCH-AlphaSet.

Alternatively, if the first bit field (MSB) (e.g., 2 bits) value of the open-loop power control parameter set indication field in the DCI is indicated as 00, the terminal may calculate, when configuring p0-AlphaSets in PUSCH-PowerControl configured via a higher layer, a value of $P_{O\_UE\_PUSCH,b,f,c}(j)$ for the first TRP or the first timing point by using p0 configured in first P0-PUSCH-AlphaSet.

If the remaining bit field (LSB) (e.g., 2 bits) value of the open-loop power control parameter set indication field in the DCI is indicated as 01, the terminal may calculate a value of $P_{O\_UE\_PUSCH,b,f,c}(j)$ for the second TRP or the second timing point by using a first p0-PUSCH value in a p0-List set (e.g., {p0-PUSCH, p0-PUSCH}) of p0-PUSCH-Set, which has a value (lowest+1) larger than that of the lowest one by 1, configured in p0-PUSCH-SetList via a higher layer.

If the remaining bit field (LSB) (e.g., 2 bits) value of the open-loop power control parameter set indication field in the DCI is indicated as 10, the terminal may calculate a value of $P_{O\_UE\_PUSCH,b,f,c}(j)$ for the second TRP and the second timing point by using a second p0-PUSCH value in p0-List of P0-PUSCH-Set, which has p0-PUSCH-SetID with a value (lowest+1) larger than that of the lowest one by 1, configured in p0-PUSCH-SetList via a higher layer.

If the remaining bit field (LSB) (e.g., 2 bits) value of the open-loop power control parameter set indication field in the DCI is indicated as 00, the terminal may calculate, when configuring p0-AlphaSets in PUSCH-PowerControl configured via a higher layer, a value of $P_{O\_UE\_PUSCH,b,f,c}(j)$ for the second TRP or the second timing point by using p0 configured in second P0-PUSCH-AlphaSet (e.g., PUSCH-AlphaSet2) among at least two P0-PUSCH-AlphaSet (e.g., PUSCH-AlphaSet1 and P0-PUSCH-AlphaSet2).

Alternatively, if the remaining bit field (LSB) (e.g., 2 bits) value of the open-loop power control parameter set indication field in the DCI is indicated as 00, the terminal may calculate, when configuring p0-AlphaSets in PUSCH-PowerControl configured via a higher layer, a value of $P_{O\_UE\_PUSCH,b,f,c}(j)$ for the second TRP or the second timing point by using a second p0 value (e.g., p0-2) in at least two p0 values (e.g., p0-1 or p0-2) configured in one P0-PUSCH-AlphaSet.

Alternatively, if the remaining bit field (LSB) (e.g., 2 bits) value of the open-loop power control parameter set indication field in the DCI is indicated as 00, the terminal may calculate a value of $P_{O\_UE\_PUSCH,b,f,c}(j)$ for the second TRP and the second timing point by using p0 configured in second P0-PUSCH-AlphaSet, when p0-AlphaSets is configured in PUSCH-PowerControl configured via a higher layer.

As another example, if first 2 bits (MSB) are indicated as 01, according to the aforementioned improved p0-PUSCH-SetLis configuration method or improved p0-List configuration method, the terminal may use a p0 value of first p0-PUSCH in p0-List of P0-PUSCH-Set configured with lowest p0-PUSCH-SetId in p0-PUSCH-SetList1-r16, or may use a p0 value of first p0-PUSCH in p0-List1-r16 of P0-PUSCH-Set in p0-PUSCH-SetList configured with lowest p0-PUSCH-SetId, thereby calculating a value of $P_{O\_UE\_PUSCH,b,f,c}(j)$ for the first TRP or the first timing point.

Alternatively, if the first 2 bits (MSB) are indicated as 10, according to the aforementioned improved p0-PUSCH-SetList configuration method or improved p0-List configuration method, the terminal may use a p0 value of second p0-PUSCH in p0-List of P0-PUSCH-Set configured with lowest p0-PUSCH-SetId in p0-PUSCH-SetList1-r16, or may use a p0 value of second p0-PUSCH in p0-List1-r16 of P0-PUSCH-Set in p0-PUSCH-SetList configured with lowest p0-PUSCH-SetId, thereby calculating a value of $P_{O\_UE\_PUSCH,b,f,c}(j)$ for the first TRP or the first timing point.

If the remaining 2 bits (LSB) are configured to 01, according to the aforementioned improved p0-PUSCH-SetList configuration method or improved p0-List configuration method, the terminal may use a p0 value of first p0-PUSCH in p0-List of P0-PUSCH-Set configured with lowest p0-PUSCH-SetId in p0-PUSCH-SetList2-r16, or may use a p0 value of first p0-PUSCH in p0-List2-r16 of P0-PUSCH-Set in p0-PUSCH-SetList configured with lowest p0-PUSCH-SetId, thereby calculating a value of $P_{O\_UE\_PUSCH,b,f,c}(j)$ for the second TRP or the second timing point.

If the first 2 bits (MSB) are indicated as 10, according to the aforementioned improved p0-PUSCH-SetList configuration method or improved p0-List configuration method, the terminal may use a p0 value of second p0-PUSCH in p0-List of P0-PUSCH-Set configured with lowest p0-PUSCH-SetId in p0-PUSCH-SetList2-r16, or may use a p0 value of second p0-PUSCH in p0-List2-r16 of P0-PUSCH-Set in p0-PUSCH-SetList configured with lowest p0-PUSCH-SetId, thereby calculating a value of $P_{O\_UE\_PUSCH,b,f,c}(j)$ for the second TRP or the second timing point.

If MSB 2 bits or LSB 2 bits are configured to 00, the terminal may use a p0 value obtained by referring to P0-PUSCH-AlphaSet1 or P0-PUSCH-AlphaSet2 corresponding to each TRP, or may use a p0-1 or p0-2 value corresponding to each TRP in P0-PUSCH-AlphaSet, thereby calculating a value of $P_{O\_UE\_PUSCH,b,f,c}(j)$ for each TRP or each timing point.

Alternatively, if MSB 2 bits or LSB 2 bits are configured to 00, the terminal may, when configuring p0-AlphaSets in higher layer PUSCH-PowerControl, calculate a value of $P_{O\_UE\_PUSCH,b,f,c}(j)$ for the first TRP or first timing point by using p0 configured in first P0-PUSCH-AlphaSet, or calculate a value of $P_{O\_UE\_PUsCH,b,f,c}(j)$ for the second TRP or second timing point by using p0 configured in second P0-PUSCH-AlphaSet.

<Method C-2: Method of Applying the Same Open-Loop Power Control Parameter Set Indication Field for Multiple TRPs>

First, the base station may provide one or more p0-PUSCH-AlphaSetId to the terminal via SRI-PUSCH-PowerControl in a higher layer, and when the base station schedules a repeatedly transmitted PUSCH for the terminal via DCI (format) for scheduling of PUSCH, if the DCI includes an SRI field, the terminal may identify a mapping relationship between p0-PUSCH-AlphaSetId configured in P0-PUSCH-AlphaSetd and a set of values (e.g., 0 to 7) for the existing SRI field from sri-PUSCH-PowerControlId configured in SRI-PUSCH-PowerControl. That is, the terminal may identify p0 and alpha values used to determine open-loop power control-related transmission power from a p0-PUSCH-AlphaSetId value mapped to each SRI field value received from DCI, and may calculate a value of transmission power $(P_{O\_UE\_PUSCH,b,f,c}(j))$, based on the value.

In addition, if the DCI (or DCI format) received by the terminal includes a 1-bit open-loop power control (OLPC) parameter set indication field, and a value indicated by the open-loop power control parameter set indication field is 1, the terminal may calculate the same $P_{O\_UE\_PUSCH,b,f,c}(j)$ value for a first TRP and a second TRP or a first timing point and a second timing point by using first value p0 of P0-PUSCH-Set configured with p0-PUSCH-SetId equal to each SRI field value. If the value indicated by the open-loop power control parameter set indication field is 0, the terminal may calculate a value of $P_{O\_UE\_PUSCH,b,f,c}(j)$ by using p0 configured in p0-PUSCH-AlphaSet mapped to the SRI field value.

Second, if the base station does not configure SRI-PUSCH-PowerControl-related information for the terminal via a higher layer, or if DCI for scheduling of PUSCH does not include an SRI field when the base station schedules, via the DCI (format), a repeatedly transmitted PUSCH, the terminal may determine that a value of olpc-ParameterSetForDCI-Format0-1-r16 (or olpc-ParameterSetForDCI-Format0-2-r16) is configured in Pusch-PowerControl-r16, and the DCI includes an OLPC parameter set indicator. If an olpc-ParameterSetForDCI-Format0-1-r16 value is configured to 1, the terminal may determine that the open-loop power control parameter set indicator in the DCI includes 1 bit, and if the olpc-ParameterSetForDCI-Format0-1-r16 value is configured to 2, the open-loop power control parameter set indicator in the DCI includes 2 bits.

If the open-loop power control parameter set indication field (e.g., 1 bit) value in the DCI is indicated as 1, the terminal may calculate the same $P_{O\_UE\_PUSCH,b,f,c}(j)$ value for the first TRP and second TRP or the first timing point and second timing point by using a first p0-PUSCH value in p0-List of P0-PUSCH-Set having (lowest) p0-PUSCH-SetID configured in higher layer p0-PUSCH-SetList. If a value indicated by the open-loop power control parameter set indication field is 0, the terminal may calculate a value of $P_{O\_UE\_PUSCH,b,f,c}(j)$ by using p0 configured via first P0-PUSCH-AlphaSet, when p0-AlphaSets is configured in PUSCH-PowerControl configured via a higher layer.

If the open-loop power control parameter set indication field (e.g., 2 bits) value in the DCI is indicated as 01, the terminal may calculate the same $P_{O\_UE\_PUSCH,b,f,c}(j)$ value for the first TRP and second TRP or the first timing point and second timing point by using a first p0-PUSCH value in p0-List of P0-PUSCH-Set having (lowest) p0-PUSCH-SetID configured in p0-PUSCH-SetList configured via a higher layer.

If the open-loop power control parameter set indication field (e.g., 2 bits) value in the DCI is indicated as 10, the terminal may calculate a value of $P_{O\_UE\_PUSCH,b,f,c}(j)$ by using a second p0-PUSCH value in p0-List of P0-PUSCH-Set having (lowest) p0-PUSCH-SetID configured in p0-PUSCH-SetList configured via a higher layer.

If the open-loop power control parameter set indication field (e.g., 2 bits) value in the DCI is indicated as 00, the terminal may calculate a value of $P_{O\_UE\_PUSCH,b,f,c}(j)$ by using p0 configured via first P0-PUSCH-AlphaSet, when p0-AlphaSets is configured in PUSCH-PowerControl configured via a higher layer.

<Method C-3: Method of Configuring New Mapping Table in Higher Layer>

First, the base station may provide one or more p0-PUSCH-AlphaSetId to the terminal via SRI-PUSCH-PowerControl in a higher layer, and when the base station schedules a repeatedly transmitted PUSCH for the terminal via DCI (format) for scheduling of PUSCH, if the DCI includes an SRI field, the terminal may identify a mapping relationship between p0-PUSCH-AlphaSetId configured in P0-PUSCH-AlphaSetd and a set of values (e.g., 0 to 7) for the existing SRI field from sri-PUSCH-PowerControlId configured in SRI-PUSCH-PowerControl. That is, the terminal may calculate a value of transmission power $(P_{O\_UE\_PUSCH,b,f,c}(j))$ based on a p0 value and an alpha value used to determine open-loop power control-related transmission power from a p0-PUSCH-AlphaSetId value mapped to an SRI field value received from DCI.

In addition, DCI (or DCI format) received by the terminal may include a 1-bit open-loop power control (OLPC) parameter set indication field, wherein, if a value indicated by the field is 1, the terminal may determine that, as shown in Table 38, values of both open-loop parameter set indicators {first TRP, second TRP} and {first timing point, second timing point} are configured to 1 and may calculate a value of $P_{O\_UE\_PUSCH,b,f,c}(j)$ as described above. If the value indicated by the field is 0, the terminal may determine that values of open-loop parameter set indicators {first TRP, second TRP} and {first timing point, second timing point} are configured to {1, 0} as in Table 38 below, and may calculate a value of $P_{O\_UE\_PUSCH,b,f,c}(j)$ as described above. Table 39 shows a case in which a field size of the open-loop parameter set indicator is 2 bits, which may be extended as described above.

TABLE 38

| OLPC parameter set indication | Value |
| --- | --- |
| 0 | {1, 0} |
| 1 | {1, 1} |

TABLE 39

| OLPC parameter set indication | Value |
|---|---|
| 0 | {01, 01} |
| 1 | {01, 10} |
| 2 | {10, 01} |
| 3 | {10, 10} |

<Method C-4: Method of Applying One Open-Loop Parameter Set Indicator Value to One TRP or Multiple TRPs Configured Via a Higher Layer>

The following embodiments (1) and (2) may be considered as method C-4.

In one embodiment of (1), the terminal may determine whether to apply an open-loop power control parameter set indicator in DCI to a first TRP or to a second TRP, by using a new RRC parameter (e.g., OLPC_setID).

If the base station configures, for the terminal, a new RRC parameter (e.g., OLPC_setID) to 0, the terminal may determine that the open-loop power control parameter set indicator in DCI as a value indicated for the first TRP so as to determine a p0 value for the first TRP. Here, all the operations of cases where open-loop power control parameter set indicator field values are 00 to 11 and the operation according to the presence or absence of an SRI field, described above in method C-1 to C03 may be extended and considered. For example, if the new RRC parameter (e.g., OLPC_setID) received by the terminal is configured to 0, and an open-loop power control parameter set indication field value is 1, the terminal may select a p0 value of first p0-PUSCH in p0-List of P0-PUSCH-Set configured with p0-PUSCH-SetId equal to a first SRI field value in p0-PUSCH-SetList1-r16, as described in method C-1.

As another example, if the new RRC parameter (e.g., OLPC_setID) received by the terminal is configured to 0, and DCI includes no SRI field, the terminal may select a p0 value of first p0-PUSCH in p0-List of P0-PUSCH-Set having lowest p0-PUSCH-SetID configured in p0-PUSCH-SetList configured via a higher layer.

If the base station configures, for the terminal, the new RRC parameter (e.g., OLPC_setID) to 1, the terminal may determine that the open-loop power control parameter set indicator in DCI as a value indicated for the second TRP so as to determine a p0 value for the second TRP. In addition, the operations of cases where open-loop power control indication field values are 0 or 1 or are 00 to 11 and the operation according to the presence or absence of an SRI field, described above in method C-1 to C03 may be extended and applied to determination of a p0 value for the second TRP. In this case, TRP 1 may be determined based on p0-PUSCH-AlphaSet described above.

In one embodiment of (2), basically, an open-loop power control parameter set indication field value is applied to TRP 1, and a new RRC parameter (e.g., OLPC_setID) is used to determine whether to apply an open-loop power control parameter set indicator to the second TRP. If a new RRC parameter (e.g., OLPC_setID) is configured to 0, the terminal may operate based on an open-loop power control parameter set indicator only for the first TRP, and if the RRC parameter (e.g., OLPC_setID) is configured to 1, the terminal may apply the aforementioned method to each of TRP 1 and TRP 2 as in method C-2.

<Method C-5: Method of Combining Aforementioned Methods C-1 to C-4 to Perform Configuration Via a Higher Layer>

In order to support at least two methods among aforementioned methods C-1 to C-4, the base station may indicate to determine at least one of methods C-1 to C-4 by configuring a new parameter for the terminal. That is, the base station may indicate at least one of the aforementioned methods by using information transmitted via a higher layer, wherein, for example, a value mapped to method C-1 may be 00, a value mapped to method C-2 may be 01, a value mapped to method C-3 may be 10, and a value mapped to method C-4 may be 11. However, the embodiment of the disclosure is not limited thereto, and it is apparent that some or all of the aforementioned methods and other methods may be additionally used, and accordingly, a bit size may be changed.

Hereinafter, a method of switching between multi-TRP-based repeated PUSCH transmission and single TRP-based repeated PUSCH transmission, or identifying associated PUSCH power control. When PUSCH transmission corresponding to multiple TRPs is repeated, the terminal may perform open-loop power control for PUSCH transmission, based on DCI information and higher layer-related information configured as follows. In this case, DCI formats to be considered correspond to DCI formats 0_1 and 0_2, and switching may be considered according to the presence or absence of an open-loop power control parameter set indication field in DCI or an SRI field.

First, when PUSCH transmission corresponding to multiple TRPs is repeated, the terminal may receive DCI (e.g., DCI formats 0_1 and 0_2) from the base station, and the DCI may include at least one SRI field (1 bit to 4 bits) and at least one open-loop power control parameter set indication field (1 bit to 4 bits) as described in methods C-1 to C-4. The terminal may determine, based on the received information, that switching is performed to open-loop power control related to repeated PUSCH transmission for a single TRP.

The terminal may determine that switching is performed to PUSCH transmission for a single TRP as shown in the 5-5th and 5-6th embodiments, based on at least two SRI field values (e.g., a first SRI field or a second SRI field) as in method C-1.

If there are two SRI fields in the DCI transmitted by the base station, the terminal may perform open-loop power control by identifying SRI field and open-loop power control parameter set indication field values corresponding to (repeated) PUSCH transmission for the first TRP and (repeated) PUSCH transmission for the second TRP, respectively. Specifically, if an SRI field indicates PUSCH transmission for the first TRP and no PUSCH transmission for the second TRP, the terminal may use only a first 1 bit (MSB) when a value of the SRI field corresponding to (repeated) PUSCH transmission for the first TRP and the total fields of two open-loop power control parameter set indication fields are 2 bits, and may perform open-loop power control calculation using only first 2 bits (MBS) if the same are 4 bits. The terminal may disregard remaining bit (LSB) information. When switching is performed to repeated PUSCH transmission for a single TRP, the terminal may, for the first TRP, identify whether a first 1-bit or 2-bit (MSB) value of the open-loop power control parameter set indication field is 0 or 1 or is 00 to 11, thereby calculating $P_{O\_UE\_PUSCH,b,f,c}(j)$ as described above.

Similarly, if two SRI fields indicate PUSCH transmission for the second TRP and no PUSCH transmission for the first TRP, the terminal uses only a subsequent 1 bit (LSB) when a value of the SRI field corresponding to (repeated) PUSCH transmission for the second TRP and the total fields of two open-loop power control parameter set indication fields are 2 bits, and performs open-loop power control calculation using only subsequent 2 bits (LSB) when the total fields are 4 bits. The terminal may disregard remaining bit (MSB) information.

A detailed operation of calculating P0 is the same as that in various embodiments described above, the descriptions of C-1 to C-5, and will be thus omitted hereinafter.

The terminal may determine whether first bit (MSB) or last bit (LSB) information of an open-loop power control parameter set indication field is 0 or 1 so as to calculate $P_{O\_UE\_PUSCH,b,f,c}(j)$. If MSB 1 bit is used for repeated PUSCH transmission for a single TRP, LSB 1 bit may be disregarded, and the base station may configure LSB 1 bit to 0. Alternatively, when the open-loop power control parameter set indication field is configured to 4 bits for {first TRP, second TRP}, {first time point, second time point} by default, if switching is performed to repeated PUCCH transmission for a single TRP, the terminal may identify whether first two bit (MSB) information or remaining bit (LSB) information are 00 to 11, thereby calculating $P_{O\_UE\_PUSCH,b,f,c}(j)$ as described above. If MSB 2 bits are used for repeated PUSCH transmission for a single TRP, LSB 2 bits may be disregarded, and the base station may configure LSB 2 bits to 00.

Second, when PUSCH transmission corresponding to multiple TRPs is repeated, if no SRI field exists in DCI (e.g., DCI format 0_1 or 0_2) of the base station (SRI-PUSCH-PowerControl is not configured), the terminal may receive at least one open-loop power control parameter set indication field (1 bit to 4 bits) as in methods C-1 to C-4. The terminal may determine, based on the received information, that switching is performed to open-loop power control related to repeated PUSCH transmission for a single TRP. In this case, since no SRI field exists in the DCI, the terminal may determine whether PUSCH transmission is repeated PUCCH transmission for a single TRP or repeated PUCCH transmission for multiple TRPs, via a TPMI field other than an SRI field, a TPC field, or another field in the DCI, which is indicated to perform PUSCH transmit to multiple TRPs.

For example, if no SRI field exists in DCI (e.g., DCI format 0_1 or 0_2) of the base station, which is received by the terminal, the terminal may, as in method C-1, identify 2 bits of an open-loop power control parameter set indication field value and identify whether first bit (MSB) or last bit (LSB) information is 0 or 1 so as to calculate $P_{O\_UE\_PUSCH,b,f,c}(j)$. If MSB 1 bit is used for repeated PUSCH transmission for a single TRP, LSB 1 bit may be disregarded, and the base station may configure LSB 1 bit to 0. Alternatively, when the open-loop power control parameter set indication field is configured to 4 bits for {first TRP, second TRP}, {first time point, second time point}, if switching is performed to repeated PUCCH transmission for a single TRP, the terminal may identify whether first two bit (MSB) information or remaining bit (LSB) information are 00 to 11, thereby calculating $P_{O\_UE\_PUSCH,b,f,c}(j)$ as described above. If MSB 2 bits are used for repeated PUSCH transmission for a single TRP, LSB 2 bits may be disregarded, and the base station may configure LSB 2 bits to 00.

As another example, if no SRI field exists in DCI (e.g., DCI format 0_1 or 0_2) of the base station, which is received by the terminal, the terminal may identify that switching is performed to a single transmission, as in method C-2, based on a specific value of the open-loop power control parameter set indication field or a configuration value of olpc-ParameterSetForDCI-Format0-1-r16 (or olpc-ParameterSetForDCI-Format0-2-r16) in higher layer Pusch-PowerControl-r16. In this case, an additional operation of identifying MSB or LSB in DCI may be omitted.

As another, if no SRI field exists in DCI (e.g., DCI format 0_1 or 0_2) of the base station, which is received by the terminal, the terminal may identify that switching is performed to a single transmission, as in method C-3, by identifying, in a higher layer, whether to apply a new mapping table for multiple TRPs (e.g., Table 39) or to apply an existing configuration/mapping table for a single TRP (e.g., Table 38). In this case, an additional operation of identifying MSB or LSB in DCI may be omitted.

As another, if no SRI field exists in DCI (e.g., DCI format 0_1 or 0_2) of the base station, which is received by the terminal, the terminal may, as in method C-4, identify a new RRC parameter (e.g., OLPC_setID) configured via a higher layer, and identify whether open-loop power control parameter set indicator-related information is configured for both the first TRP and the second TRP or an open-loop power control parameter set indicator is configured for one of the first TRP or the second TRP, so as to identify that switching is performed to a single transmission. If the base station configures, for the terminal, a new RRC parameter (e.g., OLPC_setID) to a specific value (e.g., 2), the terminal may identify open-loop power control information for two TRPs via open-loop power control parameter set indication fields for the respective first TRP and second TRP in the DCI. If the base station configures, for the terminal, the new RRC parameter (e.g., OLPC_setID) to a specific value (e.g., 0 or 1), the terminal may determine that open-loop power control parameter set indicators in DCI as values indicated for the respective first TRP and second TRP, so as to identify that switching is performed to configuration for the first TRP or the second TRP.

A detailed operation of calculating P0 overlaps with various embodiments described above, the descriptions of C-1 to C-5, and a repeated description will be thus omitted hereinafter.

Eighth Embodiment: Method of, when No SRI Exists in DCI, Performing Open-Loop Power Control in Consideration of Multiple TRPs, Based on a Higher Layer Parameter Configuration for Each TRP If the base station does not configure SRI-PUSCH-PowerControl-related information for the terminal via a higher layer, or if the DCI for scheduling of PUSCH does not include an SRI field during scheduling of a repeatedly transmitted PUSCH via the DCI (format), the terminal may determine that a value of olpc-ParameterSetForDCI-Format0-1-r16 (or olpc-ParameterSetForDCI-Format0-2-r16) is configured in Pusch-PowerControl-r16, and the DCI includes an open-loop power control parameter set indicator. If an olpc-ParameterSetForDCI-Format0-1-r16 value is configured to 1, the terminal may determine that the open-loop power control parameter set indicator in the DCI includes 1 bit, and if the olpc-ParameterSetForDCI-Format0-1-r16 value is configured to 2, the open-loop power control parameter set indicator in the DCI includes 2 bits.

In addition, in order to support open-loop power control in the operation of repeated PUSCH transmission based on multiple TRPs, the base station may configure an RRC parameter for TRP 2, as in the method described in the seventh embodiment. To this end, the base station may configure p0-PUSCH-SetList1-r16 and p0-PUSCH-SetList2-r16 instead of one p0-PUSCH-SetList-r16, or may configure open-loop power control information for TRP 2 by adding one set in addition to existing p0-PUSCH-SetList-r16, as in a method of configuring p0-PUSCH-SetList-r16 and p0-PUSCH-SetList-r17. etc. In the above, a case of additionally configuring open-loop power control information for TRP 2 has been described as an example, but open-loop power control information for multiple TRPs may be configured and, accordingly, p0-PUSCH-SetList-r16 may be configured for each of multiple TRPs.

Hereinafter, a method of configuring open-loop power control information for two TRPs is provided, but the disclosure may be applied to two or more TRPs. A name of p0-PUSCH-SetList added to support repeated PUSCH transmission based on multiple TRPs may be different from the above example, and even if the name is different, p0-PUSCH-SetList may be understood as a higher layer parameter used for the purpose of indicating p0 for URLLC for each TRP. In the following embodiment, it is assumed that the base station configures a higher layer parameter, such as p0-PUSCH-SetList1-r16 and p0-PUSCH-SetList2-r16, for the terminal in order to indicate p0 for URLLC, as an open-loop power control method for each TRP. Here, p0-PUSCH-SetList1-r16 may be used to indicate a p0 value for URLLC use for TRP 1, and p0-PUSCH-SetLIst2-r16 may be used to indicate a p0 value for URLLC use for TRP 2.

In addition, for repeated PUSCH transmission in consideration of multiple TRPs, the base station may configure multiple PUSCH-PowerControl (e.g., PUSCH-PowerControl is a higher layer parameter for a first TRP, and PUSCH-PowerControl2 is a higher layer parameter for a second TRP), may configure multiple sri-PUSCH-MappingToAddModList (e.g., sri-PUSCH-MappingToAddModList is a higher layer parameter for a first TRP, and sri-PUSCH-MappingToAddModList2 is a higher layer parameter for a second TRP) in PUSCH-PowerControl, or may configure SRI-PUSCH-PowerControl, etc. corresponding to each of multiple SRS resource sets, for the terminal. In the following embodiment, for convenience of description, it is assumed that PUSCH-PowerControl for a first TRP and PUSCH-PowerControl2 for a second TRP are configured.

If all SRI fields in the DCI do not exist, and an open-loop power control parameter set indication field (e.g., 1 bit) value is configured to 1, the terminal may calculate a value of $P_{O\_UE\_PUSCH,b,f,c}(j)$ for each of the first TRP and second TRP or the first timing point and second timing point by using a first p0-PUSCH value in p0-List of P0-PUSCH-Set having lowest p0-PUSCH-SetID configured in higher layer parameters of p0-PUSCH-SetList1-r16 and p0-PUSCH-SetList2-r16, as follows:
 (1) The first p0-PUSCH value in p0-List of P0-PUSCH-Set having lowest p0-PUSCH-SetID of p0-PUSCH-SetList1-r16 may be used to calculate $P_{O\_UE\_PUSCH,b,f,c}(j)$ at the first TRP or the first timing point; and
 (2) The first p0-PUSCH value in p0-List of P0-PUSCH-Set having lowest p0-PUSCH-SetID of p0-PUSCH-SetList2-r16 may be used to calculate $P_{O\_UE\_PUSCH,b,f,c}(j)$ at the second TRP or the second timing point.

If all SRI fields in the DCI do not exist, and the open-loop power control parameter set indication field (e.g., 1 bit) value is configured to 0, the terminal may calculate $P_{O\_UE\_PUSCH,b,f,c}(j)$ for each TRP via the following methods:
 (1) A p0 value of first P0-PUSCH-AlphaSet in p0-AlphaSets in PUSCH-PowerControl may be used to calculate $P_{O\_UE\_PUSCH,b,f,c}(j)$ at the first TRP or the first timing point; and
 (2) A p0 value of first P0-PUSCH-AlphaSet in p0-AlphaSets in PUSCH-PowerControl2 may be used to calculate $P_{O\_UE\_PUSCH,b,f,c}(j)$ at the second TRP or the second timing point.

If all SRI fields in the DCI do not exist, and the open-loop power control parameter set indication field (e.g., 2 bits) value is configured to 01, the terminal may calculate a value of $P_{O\_UE\_PUSCH,b,f,c}(j)$ for each of the first TRP and second TRP or the first timing point and second timing point by using a first p0-PUSCH value in p0-List of P0-PUSCH-Set having lowest p0-PUSCH-SetID configured in higher layer parameters of p0-PUSCH-SetList1-r16 and p0-PUSCH-SetList2-r16, as follows:
 (1) The first p0-PUSCH value in p0-List of P0-PUSCH-Set having lowest p0-PUSCH-SetID of p0-PUSCH-SetList1-r16 may be used to calculate $P_{O\_UE\_PUSCH,b,f,c}(j)$ of the first TRP or first timing point; and
 (2) The first p0-PUSCH value in p0-List of P0-PUSCH-Set having lowest p0-PUSCH-SetID of p0-PUSCH-SetList2-r16 may be used to calculate $P_{O\_UEPUSCH,b,f,c}(j)$ at the second TRP or the second timing point.

If all SRI fields in the DCI do not exist, and the open-loop power control parameter set indication field (e.g., 2 bits) value is configured to 10, the terminal may calculate a value of $P_{O\_UE\_PUSCH,b,f,c}(j)$ for each of the first TRP and second TRP or the first timing point and second timing point by using a second p0-PUSCH value in p0-List of P0-PUSCH-Set having lowest p0-PUSCH-SetID configured in higher layer parameters of p0-PUSCH-SetList1-r16 and p0-PUSCH-SetList2-r16, as follows:
 (1) The second p0-PUSCH value in p0-List of P0-PUSCH-Set having lowest p0-PUSCH-SetID of p0-PUSCH-SetList1-r16 may be used to calculate $P_{O\_UE\_PUSCH,b,f,c}(j)$ at the first TRP or the first timing point; and
 (2) The second p0-PUSCH value in p0-List of P0-PUSCH-Set having lowest p0-PUSCH-SetID of p0-PUSCH-SetList2-r16 may be used to calculate $P_{O\_UE\_PUSCH,b,f,c}(j)$ at the second TRP or the second timing point.

If all SRI fields in the DCI do not exist, and the open-loop power control parameter set indication field (e.g., 2 bits) value is configured to 00, the terminal may calculate $P_{O\_UE\_PUSCH,b,f,c}(j)$ for each TRP via the following methods:
 (1) A p0 value of first P0-PUSCH-AlphaSet in p0-AlphaSets in PUSCH-PowerControl may be used to calculate $P_{O\_UE\_PUSCH,b,f,c}(j)$ at the first TRP or first timing point; and
 (2) A p0 value of first P0-PUSCH-AlphaSet in p0-AlphaSets in PUSCH-PowerControl2 may be used to calculate $P_{O\_UE\_PUSCH,b,f,c}(j)$ at the second TRP or the second timing point.

In NR Release 16, a case in which an open-loop power control parameter set indication field (e.g., 2 bits) value in DCI is configured to 11 is not used. However, in NR Release 17, when repeated PUSCH transmission in consideration of multiple TRPs is performed, a more diverse p0 selection combination may be supported using a code point in which a value of an open-loop power control parameter set indication field is 11. As an example, if the open-loop power control parameter set indication field value is indicated as 11, the terminal may select a combination of a first p0-PUSCH value and a second p0-PUSCH value of p0-PUSCHSetList (p0-PUSCH-SetList1-r16 and p0-PUSCH-SetList2-r16) for TRP 1 and TRP 2, respectively, according to a new higher layer parameter configuration.

As a more specific example, if a new higher layer parameter (e.g., OPLCOrder) is configured to "0," all SRI fields in the DCI do not exist, and the open-loop power control parameter set indication field value is indicated as 11, a first p0-PUSCH value in p0-List of P0-PUSCH-Set having lowest p0-PUSCH-SetID of p0-PUSCH-SetList1-r16 may be used for TRP 1, to calculate $P_{O\_UE\_PUSCH,b,f,c}(j)$ at the first TRP or the first timing point, and a second p0-PUSCH value of p0-List of P0-PUSCH-Set having lowest p0-PUSCH-SetID of p0-PUSCH-SetList2-r16 may be used for TRP 2, to calculate $P_{O\_UE\_PUscH,b,f,c}(j)$ at the second TRP or the second timing point. If the new higher layer parameter (e.g., OPLCOrder) is configured to "1," all SRI fields in the DCI do not exist, and the open-loop power control parameter set indication field value is indicated as 11, a second p0-PUSCH value in p0-List of P0-PUSCH-Set having lowest p0-PUSCH-SetID of p0-PUSCH-SetList1-r16 may be used for TRP 1, to calculate $P_{O\_UE\_PUSCH,b,f,c}(j)$ at the first TRP or the first timing point, and a first p0-PUSCH value of p0-List of P0-PUSCH-Set having lowest p0-PUSCH-SetID of p0-PUSCH-SetList2-r16 may be used for TRP 2, to calculate $P_{O\_UE\_PUSCH,b,f,c}(j)$ at the second TRP or the second timing point. The base station and the terminal may define and support one of the aforementioned two methods in advance without additionally configuring a new higher layer parameter (e.g., OPLCOrder).

As another example, if all SRI fields in the DCI do not exist and the open-loop power control parameter set indication field value is indicated as 11, the p0 value for TRP 1 may be selected based on PUSCH-PowerControl, and the p0 value for TRP 2 may be selected based on p0-PUSCHSetList2-r16 according to a new higher layer parameter configuration (or according to a method defined in advance by the base station and the terminal). Alternatively, the p0 value for TRP 1 may be selected based on p0-PUSCHSetList1-r16 and p0 for TRP 2 may be selected based on PUSCH-PowerControl2.

As a more specific method, if a new higher layer parameter (e.g., TRPSelectionForOPLC) is configured to "0," all SRI fields in the DCI do not exist, and the open-loop power control parameter set indication field value is indicated as 11, a p0 value of first P0-PUSCH-AlphaSet in p0-AlphaSets in PUSCH-PowerControl may be used for TRP 1, to calculate $P_{O\_UE\_PUSCH,b,f,c}(j)$ at the first TRP or the first timing point, and a first p0-PUSCH in p0-List of P0-PUSCH-Set having lowest p0-PUSCH-SetID of p0-PUSCH-SetList2-r16 may be used for TRP 2, to calculate $P_{O\_UE\_PUSCH,b,f,c}(j)$ at the second TRP or the second timing point.

If the new higher layer parameter (e.g., TRPSelectionForOPLC) is configured to "1," a first p0-PUSCH value in p0-List of P0-PUSCH-Set having lowest p0-PUSCH-SetID of p0-PUSCH-SetList1-r16 may be used for TRP 1, to calculate $P_{O\_UE\_PUSCH,b,f,c}(j)$ at the first TRP or the first timing point, and a p0 value of first P0-PUSCH-AlphaSet in p0-AlphaSets in PUSCH-PowerControl2 may be used for TRP 2, to calculate $P_{O\_UE\_PUSCH,b,f,c}(j)$ at the second TRP or the second timing point.

The aforementioned methods are an example of a case in which all SRI fields in the DCI do not exist and an open-loop power control parameter set indication field value is indicated as 11, and other similar combinations (e.g., a second p0-PUSCH value in p0-List, etc.) may be used.

This operation may be supported as an optional operation when the terminal reports UE capability that the terminal may additionally support the operation separately from the aforementioned operations (operations of the case in which the open-loop power control parameter set indication field value is configured to 00, 01, or 10).

In this case, based on the UE capability for reporting of whether the terminal supports the corresponding operation, the base station may configure the aforementioned new higher layer parameter (e.g., OPLCOrder or TRPSelectionForOPLC) or may configure a new higher layer parameter (e.g., enableDiffOLPC), which is to indicate whether the corresponding operation is supported, to a value, such as "enable," so as to support an operation of a case in which the open-loop power control parameter set indication field value is indicated as 11.

If the base station does not configure, for the terminal, a higher layer parameter (e.g., OPLCOrder or TRPSelectionForOPLC) for an operation of a case in which the open-loop power control parameter set indication field value is indicated as 11, and does not configure a higher layer parameter (e.g., enableDiffOLPC), which is to indicate whether the operation is supported, for the terminal or configures the same to a value, such as "disable," so as to indicate that the corresponding operation is not supported, the base station may not configure the open-loop power control parameter set indication field value to 11, and the terminal does not perform the operation of the case in which the open-loop power control parameter set indication field value is configured to 11 (alternatively, the terminal does not expect the operation of the case in which the open-loop power control parameter set indication field value is configured to 11).

Ninth Embodiment: Method of, when Only One of Two SRI Fields Exists in DCI, Performing Open-Loop Power Control in Consideration of Multiple TRPs, Based on a Higher Layer Parameter Configuration for Each TRP The seventh embodiment or eighth embodiment describes operations for the case of including two or more SRI fields in DCI to transmit PUSCH to multiple TRPs and the case of not including all SRI fields. This refers to a case in which the numbers of SRS resources for two SRS resource sets configured to transmit PUSCH in multiple TRPs are the same. However, if the numbers of SRS resources for two SRS resource sets are not configured to be the same via a higher layer parameter configuration, only one SRI field of the two SRI fields in DCI may exist and the other SRI field may not exist. For example, when codebook-based repeated PUSCH transmission in consideration of multiple TRPs is performed, it may be assumed that the number of SRS resources in an SRS resource set associated with a first TRP is 2, but the number of SRS resources in an SRS resource set associated with a second TRP is 1.

In this case, the number of bits of a first SRI field included in the DCI is 1, while the number of bits of a second SRI field is 0, and thus only one SRI field may exist. Similarly, depending on the number of SRS resources of the SRS resource set based on a higher layer parameter, there may be a case in which only the second SRI field exists. As such, if only one of two SRI fields is included in DCI, and an open-loop power control parameter set indicator is indicated by the DCI, a p0 value of each TRP may be determined depending on whether the SRI field exist in the DCI.

The following specific example describes a case in which one SRI field and an open-loop power control parameter set indicator exist in DCI. In this case, it is assumed that the base station configures, for the terminal, p0-PUSCH-SetList1-r16 and PUSCH-PowerControl to determine a power transmission parameter for TRP 1 and configures p0-PUSCH- SetList2-r16 and PUSCH-PowerControl2 to determine a power transmission parameter for TRP 2.

If only the SRI field for TRP 1 exists in the DCI (i.e., referring to a case in which the number of SRS resources in the SRS resource set for TRP 1 is greater than 1, and the number of SRS resources in the SRS resource set for TRP 2 is 1), and the open-loop power control parameter set indicator indicates 1, a p0 value for each TRP may be determined as follows:

(1) A first p0-PUSCH value in p0-List of P0-PUSCH-Set having p0-PUSCH-SetID equal to a value indicated by the SRI field for TRP 1 in p0-PUSCH-SetList1-r16 may be used to calculate $P_{O\_UE\_PUSCH,b,f,c}(j)$ at the first TRP or the first timing point; and (2) The first p0-PUSCH value in p0-List of P0-PUSCH-Set having lowest p0-PUSCH-SetID of p0-PUSCH-SetList2-r16 may be used to calculate $P_{O\_UE\_PUSCH,b,f,c}(j)$ at the second TRP or the second timing point.

If only the SRI field for TRP 1 exists in the DCI (i.e., referring to a case in which the number of SRS resources in the SRS resource set for TRP 1 is greater than 1, and the number of SRS resources in the SRS resource set for TRP 2 is 1), and the open-loop power control parameter set indicator indicates 0, a p0 value for each TRP may be determined as follows:

(1) A p0 value of P0-PUSCH-AlphaSet indicated by p0-PUSCH-ApphaSetId configured in SRI-PUSCH-PowerContol configured with sri-PUSCH-PowerControlId equal to a value of the SRI field for TRP 1 indicated by DCI in PUSCH-PowerControl may be used to calculate $P_{O\_UE\_PUSCH,b,f,c}(j)$ at the first TRP or the first timing point; and (2) A p0 value of first P0-PUSCH-AlphaSet in p0-AlphaSets in PUSCH-PowerControl2 may be used to calculate $P_{O\_UE\_PUSCH,b,f,c}(j)$ at the second TRP or the second timing point.

If only the SRI field for TRP 2 exists in the DCI (i.e., referring to a case in which the number of SRS resources in the SRS resource set for TRP 2 is greater than 1, and the number of SRS resources in the SRS resource set for TRP 1 is 1), and the open-loop power control parameter set indicator indicates 1, a p0 value for each TRP may be determined as follows:

(1) A first p0-PUSCH value in p0-List of P0-PUSCH-Set having lowest p0-PUSCH-SetID of p0-PUSCH-SetList1-r16 may be used to calculate $P_{O\_UE\_PUSCH,b,f,c}(j)$ at the first TRP or the first timing point; and (2) A first p0-PUSCH value in p0-List of P0-PUSCH-Set having p0-PUSCH-SetID equal to a value indicated by the SRI field for TRP 2 in p0-PUSCH-SetList2-r16 may be used to calculate $P_{O\_UE\_PUSCH,b,f,c}(j)$ at the second TRP or the second timing point.

If only the SRI field for TRP 2 exists in the DCI (i.e., a case in which the number of SRS resources in the SRS resource set for TRP 2 is greater than 1, and the number of SRS resources in the SRS resource set for TRP 1 is 1), and the open-loop power control parameter set indicator indicates 0, a p0 value for each TRP may be determined as follows:

(1) A p0 value of first P0-PUSCH-AlphaSet in p0-AlphaSets in PUSCH-PowerControl may be used to calculate $P_{O\_UE\_PUSCH,b,f,c}(j)$ at the first TRP or the first timing point; and (2) A p0 value of P0-PUSCH-AlphaSet indicated by p0-PUSCH-ApphaSetId configured in SRI-PUSCH-PowerContol configured with sri-PUSCH-PowerControlId equal to a value of the SRI field for TRP 2 indicated by DCI in PUSCH-PowerControl2 may be used to calculate $P_{O\_UE\_PUSCH,b,f,c}(j)$ at the second TRP or the second TRP timing point.

As an example of another operation, in addition to the aforementioned method, in order to further simplify the operation, if only one SRI field exists in DCI, regardless of a value indicated by an SRI, p0 values for two TRPs may be determined according to an open-loop power control parameter set indicator value by assuming that all SRIs are absent, as described in the eighth embodiment.

Figure 22:
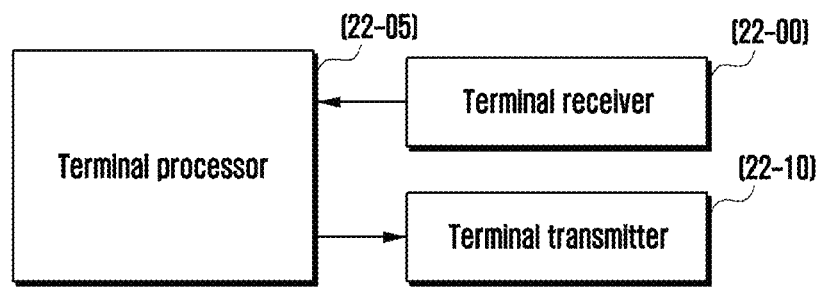
FIG. 22 illustrates a terminal structure in the wireless communication system according to an embodiment of the present disclosure.

FIG. 22 is a diagram illustrating a structure of a terminal in a wireless communication system according to an embodiment of the present disclosure.

Referring to FIG. 22, a terminal may include a transceiver 22-00, a memory 22-05, and a processor 22-10. According to the aforementioned communication method of the terminal, the transceiver 22-00 and the processor 22-10 of the terminal may operate. However, the elements of the terminal are not limited to the aforementioned examples. For example, the terminal may include more or fewer elements compared to the aforementioned elements. In addition, the transceiver 22-00, the memory 22-05, and the processor 22-10 may be implemented in the form of a single chip.

The transceivers 22-00 may transmit a signal to or receive a signal from a base station. Here, the signal may include control information and data. To this end, the transceiver 22-00 may include an RF transmitter configured to perform up-conversion and amplification of a frequency of a transmitted signal, an RF receiver configured to perform low-noise amplification of a received signal and perform down-conversion of a frequency, and the like. However, this is merely an embodiment of the transceiver 22-00, and elements of the transceiver 22-00 are not limited to the RF transmitter and the RF receiver.

Further, the transceiver 22-00 may receive a signal via a wireless channel, may output the signal to the processor 22-10, and may transmit, through the wireless channel, a signal output from the processor 22-10.

The memory 22-05 may store programs and data necessary for an operation of the terminal. The memory 22-05 may store control information or data included in a signal transmitted or received by the terminal. The memory 22-05 may include a storage medium or a combination of storage media, such as a ROM, a RAM, a hard disk, a CD-ROM, and a DVD. There may be multiple memories 22-05.

The processor 22-10 may control a series of procedures so that the terminal operates according to the aforementioned embodiments. For example, the processor 22-10 may receive DCI including two layers and control the elements of the terminal so as to concurrently receive multiple PDSCHs. There may be multiple processors 22-10, and the processor 22-10 may control the elements of the terminal by executing a program stored in the memory 22-05.

Figure 23:
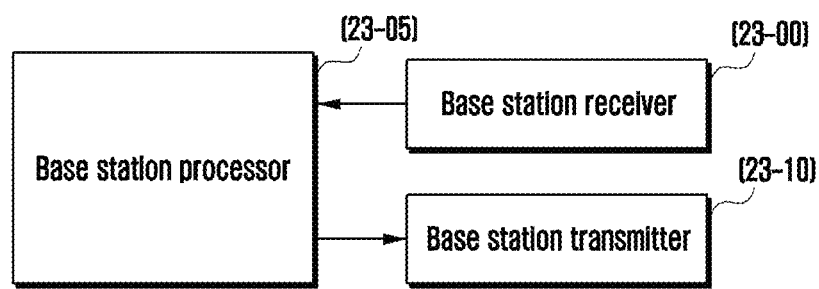
FIG. 23 illustrates a base station structure in the wireless communication system according to an embodiment of the present disclosure.

FIG. 23 is a diagram illustrating a structure of a base station in the wireless communication system according to an embodiment of the present disclosure.

Referring to FIG. 23, a base station may include a transceiver 23-00, a memory 23-05, and a processor 23-10. According to the aforementioned communication method of the base station, the transceivers 23-00 and the processor 23-10 of the base station may operate. However, the elements of the base station are not limited to the above examples. For example, the base station may include more or fewer elements compared to the aforementioned elements. In addition, the transceiver 23-00, the memory 23-05, and the processor 23-10 may be implemented in the form of a single chip.

The transceivers 23-00 may transmit a signal to or receive a signal from a terminal. Here, the signal may include control information and data. To this end, the transceiver 23-00 may include an RF transmitter configured to perform up-conversion and amplification of a frequency of a transmitted signal, an RF receiver configured to perform low-noise amplification of a received signal and perform down-conversion of a frequency, and the like. However, this is merely an embodiment of the transceiver 23-00, and elements of the transceiver 23-00 are not limited to the RF transmitter and the RF receiver.

Further, the transceiver 23-00 may receive a signal via a wireless channel, may output the signal to the processor 23-10, and may transmit, through the wireless channel, a signal output from the processor 23-10.

The memory 23-05 may store programs and data necessary for an operation of the base station. The memory 23-05 may store control information or data included in a signal transmitted or received by the base station. The memory 23-05 may include a storage medium or a combination of storage media, such as a ROM, a RAM, a hard disk, a CD-ROM, and a DVD. There may be multiple memories 23-05.

The processor 23-10 may control a series of procedures so that the base station operates according to the aforementioned embodiment of the disclosure. For example, the processor 23-10 may configure DCI of two layers including allocation information for multiple PDSCHs, and may control each element of the base station to transmit the same. There may be multiple processors 23-10, and the processor 23-10 may control the elements of the base station by executing a program stored in the memory 23-05.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been described based on FDD LTE systems, other variants based on the technical idea of the embodiments may also be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be combined without departing from the essential spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving, from a base station, a radio resource control (RRC) message including physical uplink shared channel (PUSCH) power control configurations, a first P0-PUSCH set list, and a second P0-PUSCH set list;
   receiving, from the base station, downlink control information (DCI) including a transmission power control (TPC) command value and an open-loop power control parameter set indicator;
   in case that the DCI includes two sounding reference signal (SRS) resource indicators (SRIs) and the open-loop power control parameter set indicator is configured to 1;
      determining a first transmission power associated with a first transmission reception point (TRP) based on a first PUSCH power control configuration corresponding to a first SRI, the TPC command value, and a first value of a P0-PUSCH set corresponding to the first SRI, the P0-PUSCH set corresponding to the first SRI being included in the first P0-PUSCH set list, and determining a second transmission power associated with a second TRP based on a second PUSCH power control configuration corresponding to a second SRI, the TPC command value, and a first value of a P0-PUSCH set corresponding to the second SRI, the P0-PUSCH set corresponding to the second SRI being included in the second P0-PUSCH set list;

transmitting, to the first TRP, a PUSCH based on the first transmission power; and transmitting, to the second TRP, the PUSCH based on the second transmission power.

2. The method of claim 1, wherein in case that the DCI includes the two SRIs and the open-loop power control parameter set indicator is configured to 0, the first transmission power is determined based on the first PUSCH power control configuration corresponding to the first SRI, and the second transmission power is determined based on the second PUSCH power control configuration corresponding to the second SRI.

3. The method of claim 1, wherein determining the first transmission power further comprises:

in case that the DCI does not include an SRI and the open-loop power control parameter set indicator is configured to 0 or 00, determining the first transmission power and the second transmission power based on P0-AlphaSets included in the RRC message;

in case that the DCI does not include the SRI and the open-loop power control parameter set indicator is configured to 1 or 01, determining the first transmission power based on a first value of a P0-PUSCH set with a lowest index included in the first P0-PUSCH set list and determining the second transmission power based on the first value of a P0-PUSCH set with the lowest index included in the second P0-PUSCH set list; and in case that the DCI does not include the SRI and the open-loop power control parameter set indicator is configured to 10 or 11, determining the first transmission power based on a second value of the P0-PUSCH set with the lowest index included in the first P0-PUSCH set list and determining the second transmission power based on the second value of the P0-PUSCH set with the lowest index included in the second P0-PUSCH set list.

4. The method of claim 1, wherein the RRC message further includes information indicating whether the DCI includes a second TPC command value, in case that the DCI does not include the second TPC command value, the TPC command value is applied to PUSCH transmissions for the first TRP and the second TRP, and in case that the DCI includes the second TPC command value, the TPC command value is applied to the first TRP and the second TPC command value is applied to the second TRP.

5. A method performed by a base station in a communication system, the method comprising:

transmitting, to a terminal, a radio resource control (RRC) message including physical uplink shared channel (PUSCH) power control configurations, a first P0-PUSCH set list, and a second P0-PUSCH set list;

transmitting, to the terminal, downlink control information (DCI) including a transmission power control (TPC) command value and an open-loop power control parameter set indicator; and receiving, from the terminal, a PUSCH based on the DCI, wherein in case that the DCI includes two sounding reference signal (SRS) resource indicators (SRIs) and the open-loop power control parameter set indicator is configured to 1;

a first transmission power of the PUSCH associated with a first transmission reception point (TRP) is determined based on a first PUSCH power control configuration corresponding to a first SRI, the TPC command value, and a first value of a P0-PUSCH set corresponding to the first SRI, the P0-PUSCH set corresponding to the first SRI being included in the first P0-PUSCH set list, and a second transmission power of the PUSCH associated with a second TRP is determined based on a second PUSCH power control configuration corresponding to a second SRI, the TPC command value, and a first value of a P0-PUSCH set corresponding to the second SRI, the P0-PUSCH set corresponding to the second SRI being included in the second P0-PUSCH set list.

6. The method of claim 5, wherein in case that the DCI includes the two SRIs and the open-loop power control parameter set indicator is configured to 0, the first transmission power is determined based on the first PUSCH power control configuration corresponding to the first SRI, and the second transmission power is determined based on the second PUSCH power control configuration corresponding to the second SRI.

7. The method of claim 5, wherein:

the first transmission power and the second transmission power are determined based on P0-AlphaSets included in the RRC message in case that the DCI does not include an SRI and the open-loop power control parameter set indicator is configured to 0 or 00, the first transmission power is determined based on a first value of a P0-PUSCH set with a lowest index included in the first P0-PUSCH set list and the second transmission power is determined based on the first value of a P0-PUSCH set with the lowest index included in the second P0-PUSCH set list, in case that the DCI does not include the SRI and the open-loop power control parameter set indicator is configured to 1 or 01, and the first transmission power is determined based on a second value of a P0-PUSCH set with the lowest index included in the first P0-PUSCH set list and the second transmission power is determined based on the second value of a P0-PUSCH set with the lowest index included in the second P0-PUSCH set list, in case that the DCI does not include the SRI and the open-loop power control parameter set indicator is configured to 10 or 11.

8. The method of claim 5, wherein the RRC message further includes information indicating whether the DCI includes a second TPC command value, in case that the DCI does not include the second TPC command value, the TPC command value is applied to PUSCH transmissions for the first TRP and the second TRP, and in case that the DCI includes the second TPC command value, the TPC command value is applied to the first TRP and the second TPC command value is applied to the second TRP.

9. A terminal in a communication system, the terminal comprising:
a transceiver; and
a controller operably coupled with the transceiver and configured to:
receive, from a base station, a radio resource control (RRC) message including physical uplink shared channel (PUSCH) power control configurations, a first P0-PUSCH set list, and a second P0-PUSCH set list,
receive, from the base station, downlink control information (DCI) including a transmission power control (TPC) command value and an open-loop power control parameter set indicator,
in case that the DCI includes two sounding reference signal (SRS) resource indicators (SRIs) and the open-loop power control parameter set indicator is configured to 1;
determine a first transmission power associated with a first transmission reception point (TRP) based on a first PUSCH power control configuration corresponding to a first SRI, the TPC command value, and a first value of a P0-PUSCH set corresponding to the first SRI, the P0-PUSCH set corresponding to the first SRI being included in the first P0-PUSCH set list, and
determine a second transmission power associated with a second TRP based on a second PUSCH power control configuration corresponding to a second SRI, the TPC command value, and a first value of a P0-PUSCH set corresponding to the second SRI, the P0-PUSCH set corresponding to the second SRI being included in the second P0-PUSCH set list,
transmit, to the first TRP, a PUSCH based on the first transmission power, and
transmit, to the second TRP, the PUSCH based on the second transmission power.

10. The terminal of claim 9, wherein in case that the DCI includes the two SRIs and the open-loop power control parameter set indicator is configured to 0,
the first transmission power is determined based on the first PUSCH power control configuration corresponding to the first SRI, and
the second transmission power is determined based on the second PUSCH power control configuration corresponding to the second SRI.

11. The terminal of claim 9, wherein the controller is further configured to:
determine the first transmission power and the second transmission power based on P0-AlphaSets included in the RRC message in case that the DCI does not include an SRI and the open-loop power control parameter set indicator is configured to 0 or 00,
determine the first transmission power based on a first value of a P0-PUSCH set with a lowest index included in the first P0-PUSCH set list and determining the second transmission power based on the first value of a P0-PUSCH set with the lowest index included in the second P0-PUSCH set list in case that the DCI does not include the SRI and the open-loop power control parameter set indicator is configured to 1 or 01, and
determine the first transmission power, based on a second value of the P0-PUSCH set with the lowest index included in the first P0-PUSCH set list and determining the second transmission power based on the second value of the P0-PUSCH set with the lowest index included in the second P0-PUSCH set list in case that the DCI does not include the SRI and the open-loop power control parameter set indicator is configured to 10 or 11.

12. The terminal of claim 9, wherein the RRC message further includes information indicating whether the DCI includes a second TPC command value,
In case that the DCI does not include the second TPC command value, the TPC command value is applied to PUSCH transmissions for the first TRP and the second TRP, and
in case that the DCI includes the second TPC command value, the TPC command value is applied to the first TRP, and the second TPC command value is applied to the second TRP.

13. A base station in a communication system, the base station comprising:
a transceiver; and
a controller operably coupled with the transceiver and configured to:
transmit, to a terminal, a radio resource control (RRC) message including physical uplink shared channel (PUSCH) power control configurations, a first P0-PUSCH set list, and a second P0-PUSCH set list,
transmit, to the terminal, downlink control information (DCI) including a transmission power control (TPC) command value and an open-loop power control parameter set indicator, and
receive, from the terminal, a PUSCH, based on the DCI,
wherein in case that the DCI includes two sounding reference signal (SRS) resource indicators (SRIs) and the open-loop power control parameter set indicator is configured to 1;
a first transmission power of the PUSCH associated with a first transmission reception point (TRP) is determined based on a first PUSCH power control configuration corresponding to a first SRI, the TPC command value, and a first value of a P0-PUSCH set corresponding to the first SRI, the P0-PUSCH set corresponding to the first SRI being included in the first P0-PUSCH set list, and
a second transmission power of the PUSCH associated with a second TRP is determined based on a second PUSCH power control configuration corresponding to a second SRI, the TPC command value, and a first value of a P0-PUSCH set corresponding to the second SRI, the P0-PUSCH set corresponding to the second SRI being included in the second P0-PUSCH set list.

14. The base station of claim 13, wherein:
in case that the DCI includes the two SRIs and the open-loop power control parameter set indicator is configured to 0,
the first transmission power is determined based on the first PUSCH power control configuration corresponding to the first SRI, and
the second transmission power is determined based on the second PUSCH power control configuration corresponding to the second SRI.

15. The base station of claim 13, wherein:
the first transmission power and the second transmission power are determined based on P0-AlphaSets included in the RRC message in case that the DCI does not include an SRI and the open-loop power control parameter set indicator is configured to 0 or 00, the first transmission power is determined based on a first value of a P0-PUSCH set with a lowest index included in the first P0-PUSCH set list and the second transmission power is determined based on the first value of a P0-PUSCH set with the lowest index included in the second P0-PUSCH set list, in case that the DCI does not include the SRI and the open-loop power control parameter set indicator is configured to 1 or 01, and the first transmission power is determined based on a second value of a P0-PUSCH set with the lowest index included in the first P0-PUSCH set list and the second transmission power is determined based on the second value of a P0-PUSCH set with the lowest index included in the second P0-PUSCH set list, in case that the DCI does not include the SRI and the open-loop power control parameter set indicator is configured to 10 or 11.

16. The base station of claim 13, wherein the RRC message further includes information indicating whether the DCI includes a second TPC command value, in case that the DCI does not include the second TPC command value, the TPC command value is applied to PUSCH transmissions for the first TRP and the second TRP, and in case that the DCI includes the second TPC command value, the TPC command value is applied to the first TRP, and the second TPC command value is applied to the second TRP.

* * * * *